United States Patent
Lino et al.

(10) Patent No.: US 11,989,824 B2
(45) Date of Patent: *May 21, 2024

(54) GENERATING ENRICHED LIGHT SOURCES BASED ON SURFACE-CENTRIC REPRESENTATIONS

(71) Applicant: Adobe Inc., San Jose, CA (US)

(72) Inventors: Christophe Lino, Savigny-sur-orge (FR); Tamy Boubekeur, Paris (FR); Anthony Salvi, Paris (FR); Sébastien Deguy, Paris (FR)

(73) Assignee: Adobe Inc., San Jose, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/809,364

(22) Filed: Jun. 28, 2022

(65) Prior Publication Data

US 2022/0335683 A1   Oct. 20, 2022

Related U.S. Application Data

(63) Continuation of application No. 16/953,708, filed on Nov. 20, 2020, now Pat. No. 11,423,607.

(51) Int. Cl.
*G06T 15/50*   (2011.01)
(52) U.S. Cl.
CPC .................................. *G06T 15/506* (2013.01)
(58) Field of Classification Search
CPC .............................. G06T 15/50; G06T 15/506
See application file for complete search history.

(56) References Cited

U.S. PATENT DOCUMENTS

| | | |
|---|---|---|
| 4,698,664 A | 10/1987 | Nichols et al. |
| 5,919,249 A | 7/1999 | Herbstman et al. |
| 6,083,168 A | 7/2000 | Hossack et al. |
| 6,300,955 B1 | 10/2001 | Zamir |
| 6,549,203 B2 | 4/2003 | Randel |
| 7,006,090 B2 | 2/2006 | Mittring |

(Continued)

OTHER PUBLICATIONS

U.S. Appl. No. 17/091,313, Nov. 21, 2022, Notice of Allowance.

(Continued)

*Primary Examiner* — Ryan McCulley
(74) *Attorney, Agent, or Firm* — Keller Preece PLLC

(57) ABSTRACT

Methods, systems, and non-transitory computer readable storage media are disclosed for generating enriched light sources by utilizing surface-centric representations of three-dimensional surfaces. Specifically, the disclosed system utilizes a surface-centric re-parameterization that combines geometric and algebraic components of a sphere to model different light source types in a continuous range of lighting configurations. The disclosed systems utilize a set of intuitive parameters to determine a shape and emission parameters for generating an enriched light source. Additionally, the disclosed system provides a set of interactive light source controls to modify a position, orientation, shape, emittance, and lighting attenuation over distance of a light source within a three-dimensional environment. The disclosed system determines the light source controls based on sets of three-dimensional interaction primitives to control one or more parameters of the light source. The disclosed system provides the light source controls for consistently modifying various light source types within the three-dimensional environment.

20 Claims, 18 Drawing Sheets

(56) References Cited

U.S. PATENT DOCUMENTS

| | | | |
|---|---|---|---|
| 9,299,188 B2 | 3/2016 | Karsch et al. |
| 9,367,203 B1 | 6/2016 | Costello |
| 9,536,345 B2 | 1/2017 | Krig |
| 10,817,745 B2 | 10/2020 | Harrison et al. |
| 11,068,155 B1 | 7/2021 | Dalmia et al. |
| 2010/0302245 A1 | 12/2010 | Best |
| 2012/0092357 A1 | 4/2012 | Wang et al. |
| 2012/0120277 A1 | 5/2012 | Tsai |
| 2012/0154277 A1 | 6/2012 | Bar-Zeev et al. |
| 2012/0209828 A1 | 8/2012 | Takenaka et al. |
| 2014/0343699 A1 | 11/2014 | Engelen et al. |
| 2016/0071304 A1 | 3/2016 | Jang et al. |
| 2016/0267710 A1 | 9/2016 | Huang et al. |
| 2017/0098330 A1 | 4/2017 | Inomata |
| 2018/0239515 A1 | 8/2018 | Cooper et al. |
| 2018/0247458 A1 | 8/2018 | Wilson et al. |
| 2019/0340306 A1 | 11/2019 | Harrison et al. |
| 2021/0065440 A1 | 3/2021 | Sunkavalli et al. |
| 2021/0209828 A1 | 7/2021 | Li et al. |

OTHER PUBLICATIONS

U.S. Appl. No. 17/108,250, Sep. 8, 2022, Notice of Allowance.

D. R. Baum, H. E. Rushmeier, and J. M. Winget. 1989. Improving Radiosity Solutions Through the Use of Analytically Determined Form-factors. SIGGRAPH Comput. Graph. 23, 3 (Jul. 1989), 325-334. https://doi.org/10.1145/74334 .74367.

James F. Blinn. 1977. Models of Light Reflection for Computer Synthesized Pictures. SIGGRAPH Comput. Graph. 11, 2 (Jul. 1977), 192-198. https://doi.org/10.1145/965141.563893.

James F. Blinn and Martin E. Newell. 1976. Texture and Reflection in Computer Generated Images. Commun. ACM 19, 10 (Oct. 1976), 542-547. https://doi.org/10.1145/360349.360353.

Brent Burley. 2012. Physically Based Shading at Disney. Siggraph Course (2012). https://blog.selfshadow.com/publications/s2012-shading-course/.

R. L. Cook and K. E. Torrance. 1982. A Reflectance Model for Computer Graphics. ACM Trans. Graph. 1, 1 (Jan. 1982), 7-24. https://doi .org/10.1145/357290.357293.

P. Debevec. 2003. HDRI and Image-Based Lighting. Siggraph Course (2003). https://www.siggraph.org/s2003/conference/courses/debevec.html.

Paul Debevec. 2005. A Median Cut Algorithm for Light Probe Sampling. In ACM SIGGRAPH 2005 Posters (SIGGRAPH '05). ACM, New York, NY, USA,Article66. https://doi.org/10.1145/1186954.1187029.

Jonathan Dupuy, Eric Heitz, and Laurent Belcour. 2017. A Spherical Cap Preserving Parameterization for Spherical Distributions. ACM Trans. Graph. 36, 4, Article 139 (Jul. 2017), 12 pages. https://doi.org/10.1145/3072959.3073694.

Cindy M. Goral, Kenneth E. Torrance, Donald P. Greenberg, and Bennett Battaile. 1984. Modeling the Interaction of Light Between Diffuse Surfaces. SIGGRAPH Comput. Graph. 18, 3 (Jan. 1984), 213-222. https://doi.org/10.1145/ 964965.808601.

Eric Heitz. 2017. Analytical calculation of the solid angle subtended by an arbitrarily positioned ellipsoid to a point source. Nuclear Instruments and Methods in Physics Research Section A: Accelerators, Spectrometers, Detectors and Associated Equipment 852 (2017), 10-14. https://doi.org/10.1016/j.nima.2017.02.004.

Eric Heitz, Jonathan Dupuy, Stephen Hill, and David Neubelt. 2016. Real-time Polygonal-light Shading with Linearly Transformed Cosines. ACM Trans. Graph. 35, 4, Article 41 (Jul. 2016), 8 pages. https://doi.org/10.1145/ 2897824.2925895.

Eric Heitz, Stephen Hill, and Morgan McGuire. 2018. Combining Analytic Direct Illumination and Stochastic Shadows. In Proceedings of the ACM SIGGRAPH Symposium on Interactive 3D Graphics and Games (I3D '18). ACM, New York, NY, USA, Article 2, 11 pages. https://doi.org/10.1145/3190834.3190852.

James T. Kajiya. 1986. The Rendering Equation. SIGGRAPH Comput. Graph. 20, 4 (Aug. 1986), 143-150. https://doi.org/10.1145/15886 .15902.

Jan Kautz, Pere-Pau Vázquez, Wolfgang Heidrich, and Hans-Peter Seidel. 2000. A Unified Approach to Prefiltered Environment Maps. In Rendering Techniques 2000, Bernard Péroche and Holly Rushmeier (Eds.). Springer Vienna, Vienna, 185-196.

P. Lecocq, A. Dufay, G. Sourimant, and J. E. Marvie. 2017. Analytic Approximations for Real-Time Area Light Shading. IEEE Transactions on Visualization and Computer Graphics PP, 99 (2017), 1-1. https://doi.org/10.1109/TVCG.2017 .2656889.

Oleg Mazonka. 2012. Solid Angle of Conical Surfaces, Polyhedral Cones, and Intersecting Spherical Caps. Article arXiv:1205.1396 (May 2012), arXiv:1205.1396 pages. arXiv:math.MG/1205.1396.

Namco. 1993. System 16—Namco Magic Edge Hornet Simulator Hardware (Namco). https://www.system16.com. (1993).

Matt Pharr, Wenzel Jakob, and Greg Humphreys. 2016. Physically based rendering: From theory to implementation. Morgan Kaufmann.

Bui Tuong Phong. 1975. Illumination for Computer Generated Pictures. Commun. ACM 18, 6 (Jun. 1975), 311-317. https://doi.org/10.1145/ 360825.360839.

Peter-Pike Sloan, Jan Kautz, and John Snyder. 2002. Precomputed Radiance Transfer for Real-time Rendering in Dynamic, Low-frequency Lighting Environments.ACM Trans. Graph.21, 3 (Jul. 2002), 527-536.https://doi.org/10.1145/566654.566612.

Federspiel, Alex. "Equation of a Sphere, Plus Center and Radius." Retrieved from www.expii.com/t/equation-of-a-sphere-1321 on Sep. 28, 2021. (Year: 2015).

SolidWorks (Dassault Systems, "SolidWorks Fundamentals > Selecting Over Geometry, What's New in Solidworks 2018", published at https://help.solidworks.conn/2018/EnglishNVhatsNewit select over geornetry.htrn and archived at archive.org as of at Oct. 16, 2017) (Year: 2017).

U.S. Appl. No. 17/091,313, Oct. 22, 2021, Office Action.
U.S. Appl. No. 17/091,313, Mar. 28, 2022, Office Action.
U.S. Appl. No. 17/091,313, Jul. 22, 2022, Office Action.
U.S. Appl. No. 16/953,708, Oct. 1, 2021, Office Action.
U.S. Appl. No. 16/953,708, Mar. 16, 2022, Notice of Allowance.
U.S. Appl. No. 17/108,250, Dec. 22, 2021, Preinterview 1st Office Action.
U.S. Appl. No. 17/108,250, Feb. 1, 2022, 1st Action Office Action.
U.S. Appl. No. 17/108,250, Jun. 2, 2022, Office Action.

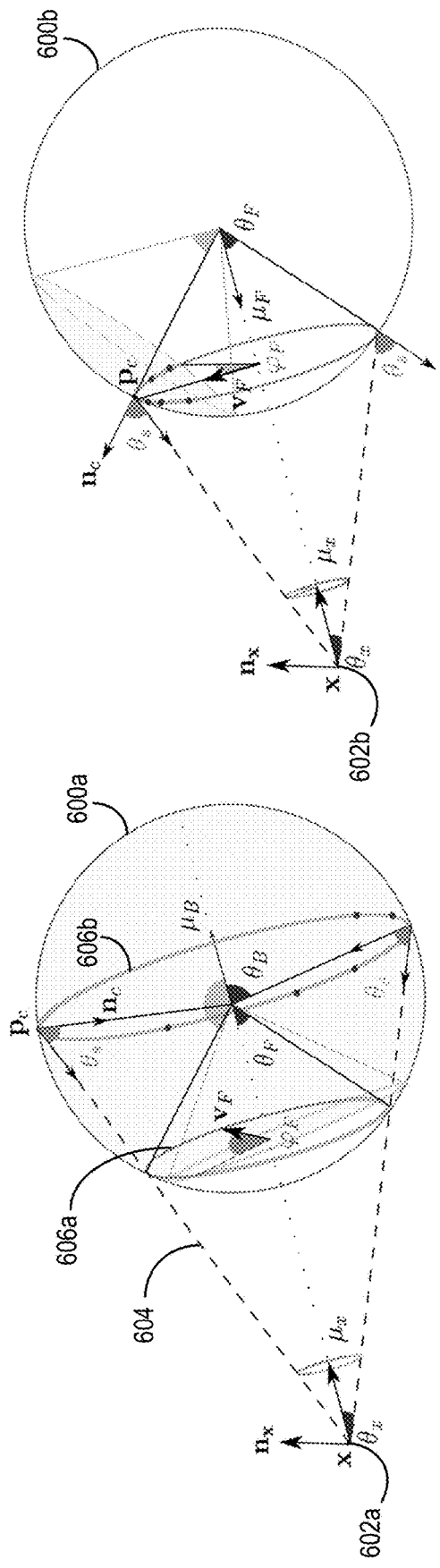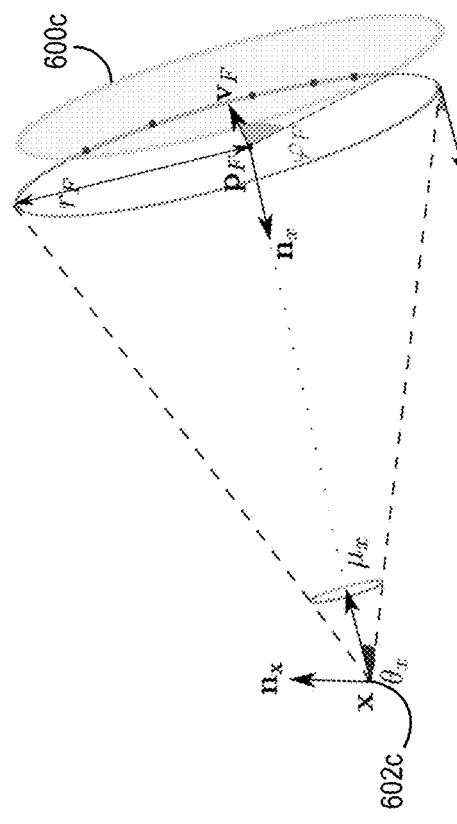
Fig. 6A
Fig. 6B
Fig. 6C

GENERATING ENRICHED LIGHT SOURCES BASED ON SURFACE-CENTRIC REPRESENTATIONS

CROSS-REFERENCE TO RELATED APPLICATIONS

The present application is a continuation of U.S. application Ser. No. 16/953,708, filed on Nov. 20, 2020. The aforementioned application is hereby incorporated by reference in its entirety.

BACKGROUND

Improvements to computer processing technologies have led to significant advancements in the field of digital image processing and rendering. Specifically, computer processing speeds and resources have provided many different types of systems the ability to process and render three-dimensional environments. For example, systems use image processing and real-time lighting simulations to render three-dimensional environments including three-dimensional models and digital light sources. In many cases, providing a number of different, customizable lighting parameters improves accuracy in approximating real-world scenarios and lighting effects. Unfortunately, designing the lighting for a digital three-dimensional environment remains a creative and technical task that typically is an iterative process based on trial-and-error. In particular, designer attempt to properly control lighting effects (e.g., shadows and highlights) by manipulating various virtual light source parameters (source type, placement, direction, size, color, intensity). Unfortunately, different lighting sources rely upon different sets of parameters. Consequently, when a designer changes to a different light source, any prior work done to tune parameters of the prior light source is at least partially, if not entirely, lost.

SUMMARY

This disclosure describes one or more embodiments of methods, non-transitory computer readable media, and systems that utilize enriched light sources that unifies models for different lighting sources, thereby defining a continuous light source space that a designer can explore to determine desired lighting effects. Furthermore, such enriched light sources utilize a small and intuitive set of parameters. Accordingly, the disclosed systems provide a flexible, efficient tool that allows for easy and quick modifications to a light source within a three-dimensional environment while tuning lighting parameters across a plurality of different light source types.

In one or more embodiments, the enriched light sources utilize surface-centric representations of three-dimensional shapes, as explained in greater detail below. For instance, the disclosed systems determine a surface-centric re-parameterization that combines geometric and algebraic components of a sphere. Additionally, the disclosed systems determine a shape of the surface-centric representation and a set of emission parameters based on a set of input parameters that indicate a surface position, a direction, and a curvature factor of the surface-centric representation to determine boundaries on the sphere and emissive properties on the surface. The disclosed systems then generate an enriched light source by bounding an emissive region onto a geometric structure according to the shape of the surface-centric representation and the set of emission parameters.

In one or more embodiments, the disclosed systems also provide a set of dedicated, interactive light controls for controlling the position, orientation, shape, and emittance of a light source within a digital three-dimensional environment. Specifically, the disclosed systems generate a plurality of sets of three-dimensional interaction primitives that correspond to a plurality of available light source controls for modifying parameters of virtual light sources. Furthermore, the disclosed systems provide three-dimensional visual representations within a graphical user interface for the sets of three-dimensional interaction primitives. In response to interactions with the three-dimensional visual representations, the disclosed systems modify the properties of the virtual light sources according to the corresponding sets of three-dimensional interactive primitives. Thus, the disclosed systems provide intuitive interface controls for changing many different properties of virtual light sources within three-dimensional environments.

BRIEF DESCRIPTION OF THE DRAWINGS

The detailed description refers to the drawings briefly described below.

FIGS. 6A-6C illustrate diagrams of the enriched light source system determining light from enriched light sources that include a cone of direction from a shaded point of a three-dimensional surface in accordance with one or more implementations.

DETAILED DESCRIPTION

Figure 1:
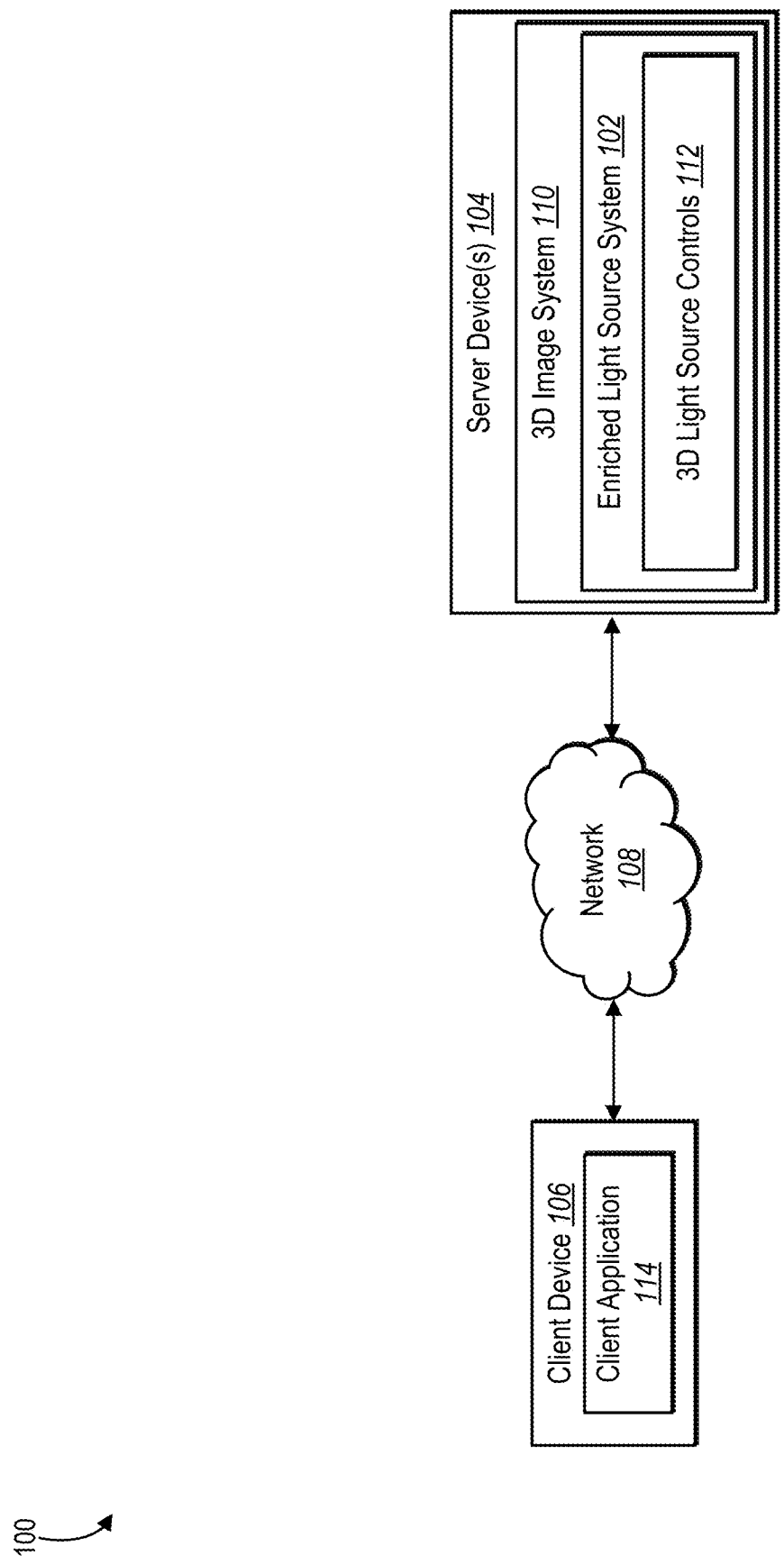
FIG. 1 illustrates a block diagram of a system environment in which an enriched light source system can operate in accordance with one or more implementations.

One or more embodiments of the present disclosure include an enriched light source system that utilizes surface-centric representations to generate enriched light sources in digital three-dimensional environments. Specifically, the enriched light source system unifies lighting models by re-parameterizing an algebraic sphere to obtain a surface-centric representation that combines geometric and algebraic components of a three-dimensional structure. The enriched light source system receives input parameters indicating properties of the surface-centric representation and determines a shape and a surface area (e.g., boundaries of an emitting surface) of the surface-centric representation based on the input parameters. Additionally, the enriched light source system determines a set of emission parameters from the input parameters, for example, in response to receiving input parameters indicating emission properties for a surface of a light source. The enriched light source system then generates an enriched light source by encoding lighting properties onto a geometric structure (e.g., a point or surface) based on the shape of the surface-centric representation and the emission parameters. Accordingly, the enriched light source system provides a continuous light source space via a limited, intuitive set of parameters that allows users to generate enriched light sources with a variety of different geometric and lighting properties.

The enriched light source system provides a single, unified light source model that can transition continuously from one light type to another. Indeed, the unified light source model encodes common light sources (e.g., point light, spotlight, directional light, cap light, sphere light, disk light) and allows transition between the light sources. Furthermore, as the unified light source model is continuous, the enriched light source system allows for the generation of new light sources types (i.e., interpolations between common light sources or extrapolations outside of common light source models such as parabolic light sources). Thus, the enriched light source system provides increased flexibility and increased efficiency in the exploration of possible lighting.

As mentioned, in one or more embodiments, the enriched light source system utilizes a surface-centric representation to generate enriched light sources. More specifically, the enriched light source system re-parameterizes an algebraic sphere to obtain a surface-centric representation that incorporates geometric and algebraic properties of a sphere. For example, the enriched light source system re-parameterizes an algebraic sphere to determine parameters based on a three-dimensional surface position, a three-dimensional direction, and a surface curvature factor. The enriched light source system then generates the surface-centric representation based on the re-parameterization. The enriched light source system thus provides a general model of generating enriched light sources via the surface-centric representation.

In one or more additional embodiments, the enriched light source system utilizes input parameters for the surface-centric representation to determine properties of the surface-centric representation. To illustrate, the enriched light source system receives surface-centric parameters indicating the three-dimensional surface position, the three-dimensional direction, the surface curvature factor, and the surface boundaries of the surface-centric representation via one or more user inputs. The enriched light source system uses the received parameters to determine a shape and a surface area of the surface-centric representation by determining algebraic parameters (e.g., algebraic coefficients) of a corresponding algebraic sphere and then converting the resulting algebraic sphere to a geometric structure. For example, the enriched light source system utilizes the surface curvature factor to determine whether the resulting geometric structure includes a sphere (or spherical cap), a plane, or a point. Additionally, the enriched light source system utilizes the parameters to determine a location, a direction, and a size of the surface-centric representation.

Furthermore, in one or more embodiments, the enriched light source system determines a set of emission parameters based on the input parameters. For instance, the enriched light source system utilizes the input parameters to determine an emittance distribution and power for an enriched light source. In one or more embodiments the enriched light source system provides input parameters indicating the emittance distribution and power for the enriched light source in addition to input parameters for determining the surface-centric representation. To illustrate, the enriched light source system determines, from the input parameters, a core emittance indicating a distribution of light flux over a surface of the surface-centric representation. The enriched light source system also determines a surface emittance indicating a re-distribution of the core emittance in a cone of directions from each surface point on the surface of the surface-centric representation.

In one or more embodiments, in response to determining a shape of a surface-centric representation and a set of emission parameters, the enriched light source system generates an enriched light source. Specifically, the enriched light source system generates the enriched light source to include the shape of the surface-centric representation. Additionally, the enriched light source system bounds an emissive region onto the surface of the enriched light source and encodes a lighting power of the enriched light source based on the set of emission parameters. The resulting enriched light source thus includes geometric and light emission properties based on input parameters and according to a re-parameterization of an algebraic sphere via a surface-centric representation.

Additionally, in one or more embodiments, the enriched light source system utilizes an importance-sampling process to determine shading of points within a three-dimensional environment due to an enriched light source. In particular, the enriched light source system samples points of a set of rings in cones of direction from a given shaded point of a three-dimensional surface to determine portions of the cones of direction that intersect with the enriched light source. The enriched light source system determines rings that contribute by pruning portions of the rings that do not intersect with the surface of the enriched light source and portions for which the emittance cone from the enriched light source are back-facing the shaded point. The enriched light source system then samples points, according to a sampling budget, along the remaining portions of the rings to estimate the total light (e.g., the bidirectional reflectance distribution function) from the enriched light source to the shaded point.

In one or more additional embodiments, the enriched light source system provides interactive light controls for modifying light sources within three-dimensional environments.

In particular, the enriched light source system generates sets of three-dimensional interaction primitives for a variety of light source controls. For instance, the enriched light source system generates each set of interaction primitives to control one or more specific properties of a light source. The enriched light source system also provides three-dimensional visual representations for the corresponding interaction primitives within a graphical user interface. In response to user interactions with the visual representations, the enriched light source system adjusts parameters of light sources associated with the corresponding interaction primitives. Thus, the enriched light source system provides tools for users to easily preview changes to a light source's position, orientation, shape, or emittance within a three-dimensional environment.

More specifically, in one or more embodiments, the enriched light source system generates sets of three-dimensional interaction primitives for a plurality of light source controls. For example, the enriched light source system determines a plurality of modifiable parameters associated with a virtual light source. The enriched light source system then generates a plurality of three-dimensional interaction primitives that represent control metaphors for controlling the modifiable parameters.

After generating the interaction primitives, the enriched light source system provides visual representations for the interaction primitives. For instance, the enriched light source system provides a visual representation of a corresponding set of three-dimensional interaction primitives for the selected light source control. To illustrate, the enriched light source system provides visual representations including one or more three-dimensional elements for display within a graphical user interface in response to a selection of a particular light source control.

By providing visual elements including three-dimensional elements within a graphical user interface, the enriched light source system provides user interface controls that users can view and with which the users can interact to modify properties of the light source. In particular, the enriched light source system detects an interaction with a visual representation for a corresponding set of three-dimensional interaction primitives. The enriched light source system then modifies the light source by adjusting one or more parameters associated with the set of interaction primitives based on the detected interaction with the visual representation.

In one or more embodiments, the enriched light source system provides light source controls for a variety of different properties of a light control. For instance, the enriched light source system provides one or more light controls for setting a focus point of the light source onto a specific point of an object within a three-dimensional scene and modifying the position of the light source (e.g., via translation along axes or along a surface of a sphere) while maintaining the focus point. In additional embodiments, the enriched light source system provides a light control for modifying a position of a light source through a stack of surfaces in a view direction without discontinuity in the interaction. In further embodiments, the enriched light source system provides one or more light controls to modify a flux of a light source by adjusting an emission distribution across a surface of the light source or by modifying intrinsic parameters of the light source based on manually specified scene illumination settings. In one or more additional embodiments, the enriched light source system provides a light control to modify a size and/or shape of an enriched light source (e.g., based on the three-dimensional surface position, a three-dimensional direction and/or a surface curvature factor of a surface-centric representation, as described above).

Some conventional systems that provide virtual light sources within three-dimensional environments allow users to insert light sources by manually selecting a light source from a plurality of discrete light source types. For example, such conventional systems allow users to select from point light sources, sphere light sources, directional light sources, spotlight sources, and area light sources to cover a range of possible lighting scenarios. Additionally, the conventional systems allow users to configure a light source by manually inputting the light source parameters based on rigid parameter settings that vary according to the specific light source. When conventional systems transition from one light source type to another, the resulting light source often has different lighting properties that a user must then re-configure according to the parameter settings of the new light source type, which can take a significant amount of time.

Additionally, some conventional systems provide more advanced light emitters using geometric objects with emittance maps to simulate complex lighting conditions. Manually attaching emittance maps to geometric objects using the conventional systems, however, results in light sources that are more difficult to integrate in rendering pipelines, particularly when performing real-time visualization. Furthermore, manually generating the geometric objects using the existing systems is also often a difficult and tedious task. Also, modifying light sources including manually generated geometric objects with emittance maps requires manually changing the three-dimensional mesh of the geometric objects or the parameters of the emittance maps.

The disclosed enriched light source system provides a number of advantages over existing systems. For example, the enriched light source system improves the efficiency and flexibility of computing systems that generate light sources within digital three-dimensional environments. To illustrate, while some existing systems provide a variety of virtual light sources for inserting into three-dimensional environments, the enriched light source system provides a variable, enriched light source that a user can easily modify to cover a wide range of different light source types using a single, continuously variable set of intuitive parameters. Specifically, by generating an enriched light source based on a surface-centric re-parameterization of an algebraic sphere, the enriched light source system unifies a plurality of different light source types into a single light source model that is capable of reproducing lighting properties of a plurality of conventionally distinct light source models. Indeed, the enriched light source system provides greater flexibility compared to conventional lighting systems by providing a single, unified light source model that allows seamless transition between different light source types (e.g., point light, spotlight, directional light, cap light, sphere light, disk light).

Furthermore, the enriched light source system provides for increased capability compared to conventional lighting systems. For example, the enriched light source system allows for the generation of new light sources types not feasible with conventional lighting models. Specifically, by providing a unified and continuous light source model, the enriched light source system allows for interpolations between common light source types. As such, the enriched light source system allows for countless lighting sources types utilizing a single model, a stark contrast to conventional systems that typically provide a single light source type per lighting model.

Additionally, by utilizing a uniform light source model to generate enriched light sources based on a surface-centric representation of an algebraic sphere, the enriched light source system provides a dedicated integration of a plurality of light source types that unifies the lighting models of the different light source types. By unifying the lighting models of different light source types, the enriched light source system is able to maintain the lighting parameters when transitioning from one light source type to another type. Thus, the enriched light source system is able to change a light source from one type to another without requiring a user to manually adjust the lighting parameters.

In addition to the foregoing, the enriched light source system also provides for increased efficiency in the rendering a digital three-dimensional environment lit by an enriched light source. Specifically, the enriched light source system provides a compact yet expressive set of parameters that allows for a reduction in the complexity of shading computations. Indeed, the enriched light source system can trigger cases where shading computations can be avoided by utilizing a set of simple formulas. Additionally, the enriched light source system leverages the enriched light source model to reformulate the rendering equations, resulting in smarter, unbiased sampling. Indeed, by providing a custom sampling mechanism, the enriched light source system allows for seamless integration into a standard Monte Carlo renderer (e.g., ray tracer, path tracer). As such, the enriched light source system is able to provide increased flexibility and lighting capability without a corresponding increase (or with negligible increase) in shading/rendering computations or requiring a dedicated renderer.

Furthermore, the enriched light source system improves the ease-of-use of light sources within a digital three-dimensional environment. In particular, the enriched light source system provides a set of dedicated, interactive controllers based on three-dimensional interaction primitives for controlling a range of properties of light sources. By providing a plurality of controllers with three-dimensional visual representations for modifying parameters of a light source (e.g., enriched light source or conventional light source), the enriched light source system provides a consistent light customization experience for a number of different light controls and light source types.

Turning now to the figures, FIG. 1 illustrates a schematic diagram of a system environment 100 in which an enriched light source system 102 operates. In particular, the system environment 100 includes server device(s) 104 and a client device 106 in communication via a network 108. Moreover, as shown, the server device(s) 104 include a three-dimensional image system ("3D image system 110"), which includes the enriched light source system 102. Additionally, the enriched light source system 102 includes three-dimensional light source controls ("3D light source controls 112"). Furthermore, the client device 106 includes a client application 114 (e.g., a digital three-dimensional editing application).

As shown in FIG. 1, the server device(s) 104 includes or hosts the 3D image system 110. In one or more embodiments, the 3D image system 110 includes, or is part of, one or more systems that implement the management of three-dimensional digital environments for storing, creating, modifying, or displaying three-dimensional objects/environments for one or more users of the 3D image system 110. For example, the 3D image system 110 provides tools for generating, editing, or otherwise interacting with three-dimensional environments using one or more graphical user interface tools via the client application 114 on the client device 106. In some embodiments, the 3D image system 110 provides a graphical user interface (e.g., within a standalone client or a web browser) to the client device 106 for a user to interact with three-dimensional environments via the client application 114 on the client device 106.

As mentioned, the 3D image system 110 provides tools for generating, editing, or otherwise interacting with three-dimensional environments. In one or more embodiments, the 3D image system 110 provides tools for generating three-dimensional models (e.g., including one or more three-dimensional objects) in a three-dimensional environment. Additionally, the 3D image system 110 provides tools for generating light sources within a three-dimensional environment. The 3D image system 110 also provides tools for rendering the three-dimensional environments with lighting according to light sources inserted into the three-dimensional environments. The 3D image system 110 thus provides three-dimensional images or video for use in a variety of applications including, but not limited to, three-dimensional digital media applications, databases of three-dimensional images/video, or video game applications.

In connection with generating, editing, or interacting with three-dimensional environments, the 3D image system 110 includes the enriched light source system 102 to generate enriched light sources. In one or more embodiments, an enriched light source includes a digital light source generated based on a surface-centric representation of a three-dimensional surface or structure. To illustrate, the enriched light source system 102 utilizes input parameters (e.g., received from the client device 106) for a surface-centric re-parameterization to generate an enriched light source within a three-dimensional environment. In one or more embodiments, a surface-centric representation includes a re-parameterization of an algebraic sphere by converting the algebraic representation to a representation that includes both geometric and algebraic properties of a geometric structure. For example, the surface-centric representation includes parameters indicating a three-dimensional surface position, a three-dimensional direction (e.g., corresponding to a surface point), and a surface curvature factor.

In one or more embodiments, the enriched light source system 102 utilizes input parameters (e.g., values for the surface position, direction, and surface curvature factor) corresponding to the surface-centric representation to determine a shape of the surface-centric representation and a set of emission parameters. For example, the enriched light source system 102 obtains a plurality of algebraic parameters for the algebraic sphere based on the input parameters and then converts the resulting algebraic sphere to a geometric representation. Furthermore, in one or more embodiments, the enriched light source system 102 generates the enriched light source within a three-dimensional environment to include the geometric structure (e.g., a point light source, a plane light source, or a sphere/spherical cap light source) corresponding to the shape. The enriched light source system 102 also generates the enriched light source to include emissive properties based on the set of emission parameters.

Furthermore, in one or more embodiments, the enriched light source system 102 uses a shape and emission parameters of an enriched light source to determine three-dimensional lighting on a three-dimensional object within a three-dimensional environment. For instance, the enriched light source system 102 utilizes an importance-sampling process to sample light from an enriched light source onto a shaded point of the three-dimensional object. Specifically, the enriched light source system 102 samples a plurality of points (e.g., using Monte-Carlo ray-tracing according to a sampling budget to simulate light paths) along rings from cones of direction from the shaded point that intersect with a surface of a light source. In one or more embodiments, the enriched light source system 102 determines the rings and portions of rings from which to sample points by pruning rings or portions of rings that are occluded with respect to the shaded point. The enriched light source system 102 thus efficiently renders three-dimensional environments by quickly parameterizing the enriched light sources prior to rendering for interactively previewing rendering results in real-time.

Additionally, as illustrated in FIG. 1, the enriched light source system 102 includes 3D light source controls 112 to modify light sources within three-dimensional environments. In one or more embodiments, the enriched light source system 102 provides light source controls with visual representations for modifying parameters of a light source based on corresponding sets of three-dimensional interaction primitives. For example, the enriched light source system 102 provides the visual representations for display within a graphical user interface of a display device (e.g., of the client device 106). The enriched light source system 102 receives inputs associated with the 3D light source controls 112 and modifies the corresponding lighting parameters associated with the light source. According to various embodiments, the enriched light source system 102 provides the 3D light source controls 112 for controlling enriched light sources or conventional light sources (e.g., discrete light source models).

In addition, as shown in FIG. 1, the system environment 100 includes the client device 106. In one or more embodiments, the client device 106 includes, but is not limited to, a mobile device (e.g., smartphone or tablet), a laptop, or a desktop, including those explained below with reference to FIG. 14. Furthermore, although not shown in FIG. 1, in one or more embodiments, the client device 106 is operated by a user (e.g., a user included in, or associated with, the system environment 100) to perform a variety of functions. In particular, the client device 106 performs functions, such as, but not limited to, accessing, viewing, and interacting with three-dimensional environments (e.g., via the client application 114). Additionally, in some embodiments, the client device 106 performs functions for generating and editing three-dimensional environments to provide to the 3D image system 110 or another system via the network 108. Although FIG. 1 illustrates the system environment 100 with a single client device 106, in some embodiments, the system environment 100 includes a different number of client devices.

In one or more embodiments, the server device(s) 104 include a variety of computing devices, including those described below with reference to FIG. 14. For example, the server device(s) 104 includes one or more servers for storing and processing data associated with digital content items (e.g., three-dimensional scenes) associated with a plurality of users of the enriched light source system 102. In some embodiments, the server device(s) 104 also include a plurality of computing devices in communication with each other, such as in a distributed storage environment. In some embodiments, the server device(s) 104 comprise a content server for storing three-dimensional images, videos, or scenes. In additional embodiments, the server device(s) 104 also comprises an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 may include the Internet or World Wide Web. Additionally, in some embodiments, the network 108 includes various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, in one or more embodiments, the server device(s) 104 and the client device 106 communicate via the network using a variety of communication platforms and technologies suitable for transporting data and/or communication signals, including any known communication technologies, devices, media, and protocols supportive of data communications, examples of which are described with reference to FIG. 14.

Although FIG. 1 illustrates the server device(s) 104 and the client device 106 communicating via the network 108, in one or more embodiments, the various components of the system environment 100 communicate and/or interact via other methods (e.g., the server device(s) 104 and the client device 106 communicate directly). Furthermore, although FIG. 1 illustrates the enriched light source system 102 being implemented by a particular component and/or device within the system environment 100, in one or more embodiments, the enriched light source system 102 is implemented, in whole or in part, by other computing devices and/or components in the system environment 100 (e.g., the client device 106). For example, rather than the 3D image system 110 and enriched light source system 102 being hosted on the server device(s) 104 and supporting the client application 114, the 3D image system 110 and enriched light source system 102 can be resident and run directly on the client device 106.

Figure 2:
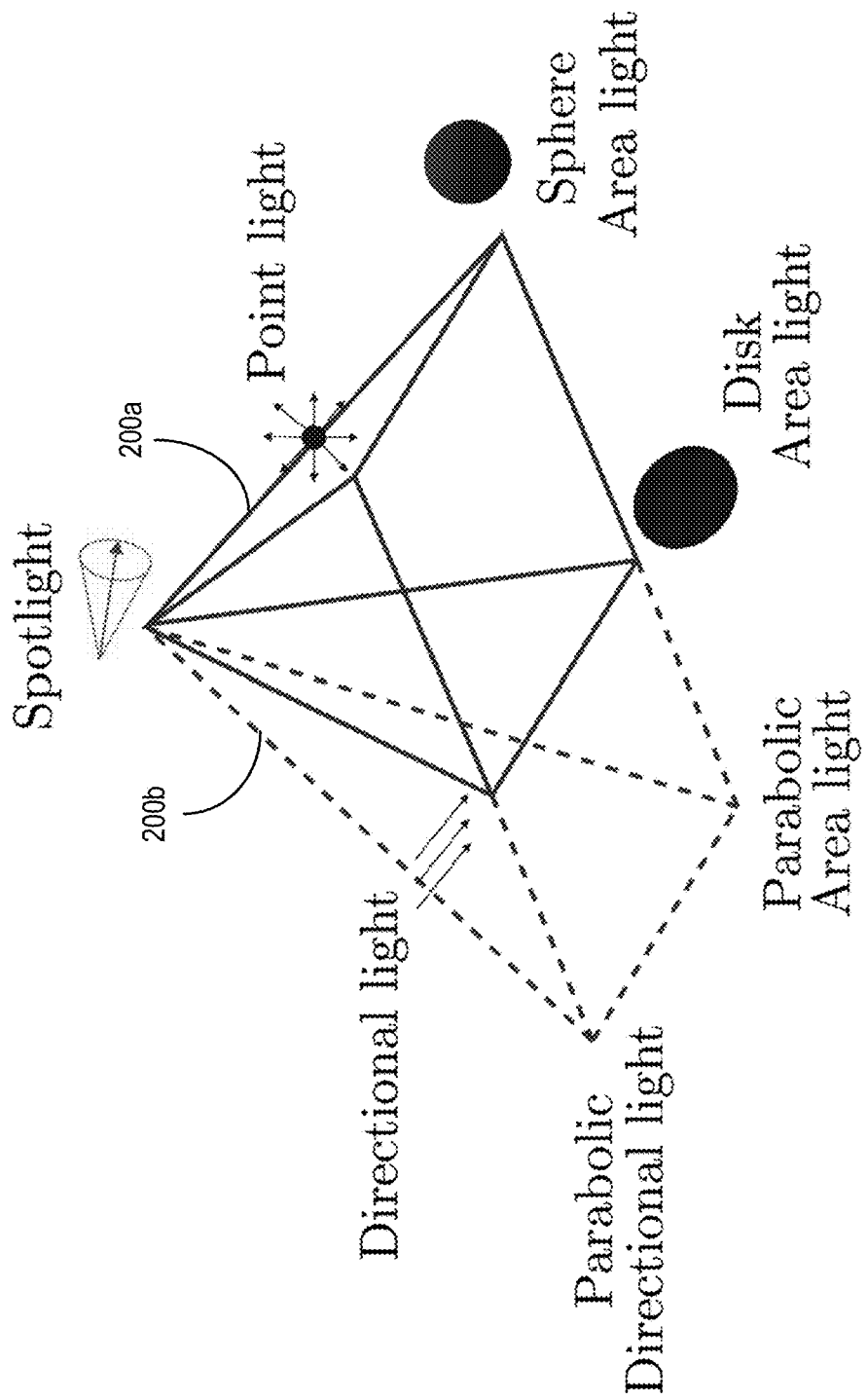
FIG. 2 illustrates a diagram of an abstract view of a range of light source types and a subset of allowed transitions between light source types in accordance with one or more implementations.

As mentioned above, the enriched light source system 102 generates enriched light sources by providing a lighting model that unifies a plurality of different light source types or categories. FIG. 2 illustrates an abstract view of one or more embodiments of a possible range of light source types and a sub-space of allowed transitions between light source types that an enriched light source can represent within a three-dimensional environment. In particular, in one or more embodiments, the enriched light source system 102 generates an enriched light source to include one of a plurality of different light source types based on a plurality of parameters defining a surface-centric representation. To illustrate, the enriched light source system 102 generates an enriched light source to represent a point light source, a spotlight light source, an area light source, or a directional light source.

As shown in FIG. 2, the enriched light source system 102 generates enriched light sources within a first range of light source types 200a (represented by the tetrahedron with the solid line). In one or more embodiments, the first range of light source types 200a includes light sources typically included in discrete light source types of conventional systems. For example, the first range of light source types 200a includes spotlight light sources, point light sources, sphere area light sources, disk area light sources, and directional light sources.

Additionally, FIG. 2 illustrates that the enriched light source system 102 generates enriched light sources within a second range of light source types 200b (represented by the tetrahedron with the dotted line). For example, the second range of light source types 200b includes light sources not typically included in discrete light source types of conventional systems. To illustrate, the second range of light source types 200*b* includes parabolic area light sources and parabolic directional lights.

In addition to including the light source types at each corner of the ranges illustrated in FIG. 2, by generating enriched light sources based on a re-parameterization of an algebraic sphere, the enriched light source system 102 is also capable of generating light sources at any location within the first range of light source types 200*a* or the second range of light source types 200*b*. For instance, enriched light sources include spherical cap light sources, which lies between disk area lights and sphere area lights. In particular, spherical cap light sources include partial spheres (e.g., a three-dimensional surface that corresponds to only a portion of the surface of a sphere.

Indeed, as mentioned above, the enriched light source system provides a single, unified light source model that can transition continuously from one light source type to another light source type or to a new or unconventional light source type. Indeed, as shown by FIG. 2, the enriched light source system allows for transition between the common light sources types (those at corners or intersections of the solid and dotted tetrahedrons). Furthermore, the enriched light source system allows for the generation of new light sources types (any position within the solid and dotted tetrahedrons not at the corners or intersections). Thus, the enriched light source system provides increased flexibility and increased efficiency in the exploration of possible lighting of a three-dimensional environment.

Figure 3:
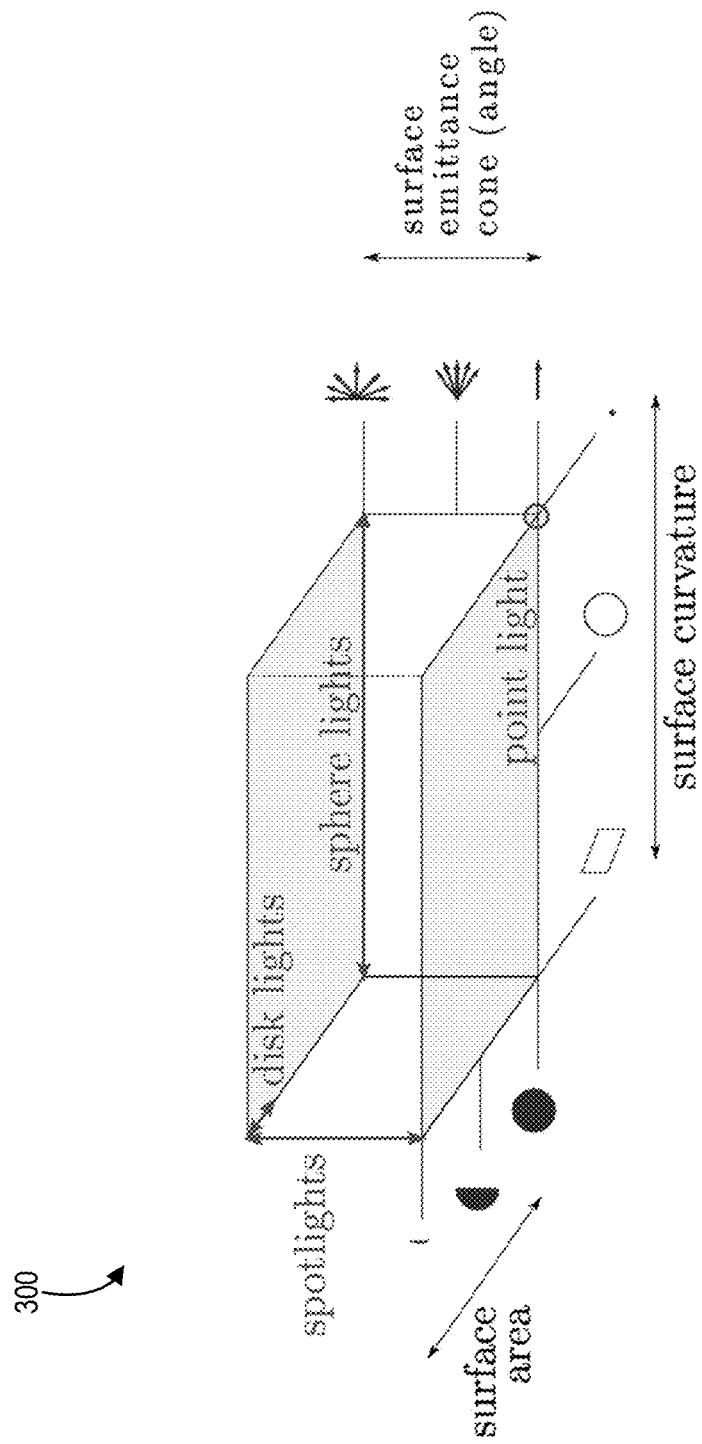
FIG. 3 illustrates a diagram of an abstract view of a sub-space of lighting configurations from a set of primary virtual light sources in accordance with one or more implementations.

As mentioned, the enriched light source system 102 generates enriched light sources based on a surface-centric representation of an algebraic sphere. In particular, to generate an enriched light source, the enriched light source system 102 utilizes a plurality of parameters that determine characteristics of the surface-centric representation. FIG. 3 illustrates an abstract view of one or more embodiments of a sub-space of possible lighting configurations or light source types 300 along three axes. In particular, the FIG. 3 illustrates that the three axes are sphere curvature, the amount of surface area emitting light, and the surface emittance from the light source. The enriched light source system 102 utilizes these parameters to determine the type of light source to generate by determining a plurality of algebraic parameters for the algebraic sphere and then converting the resulting algebraic sphere to a geometric representation.

Specifically, FIG. 3 illustrates that the enriched light source system 102 generates enriched light sources as one of a plurality of light source types in the space of light source types 300 according to parameters that determine the shape and size of the enriched light source. FIG. 3 illustrates that the enriched light source system modifies a surface area of a surface-centric representation that emits light (i.e., depth axis), a surface emittance from a light source surface (e.g., based on an emittance cone) to change a spread of emitted light (i.e., height axis), and/or a surface curvature of the light source surface (i.e., width axis). Although FIG. 3 illustrates a space of light source types 300 with a quadratic distance attenuation and a positive curvature, in one or more additional embodiments, the enriched light source system 102 further utilizes a space of light source types including negative curvatures (e.g., parabolic light spreads). Furthermore, in some embodiments, the enriched light source system 102 utilizes a space that includes directional light sources along a fourth axis with decreasing distance attenuation power (e.g., linear attenuation or no attenuation). In additional embodiments, the enriched light source system extends the fourth axis in the other direction to obtain distance attenuations greater than quadratic-power.

As mentioned, the enriched light source system 102 generates enriched light sources based on input parameters for a surface-centric representation of an algebraic sphere. In particular, the enriched light source system 102 receives input parameters to generate or modify an enriched light source within a three-dimensional environment. As shown in FIG. 3, the enriched light source system 102 generates enriched light sources from the space of light source types 300 (or from the extended space including parabolic light sources or directional light sources). Additionally, the enriched light source system 102 utilizes the input parameters to determine one or more additional lighting properties of the enriched light source.

Figure 4:
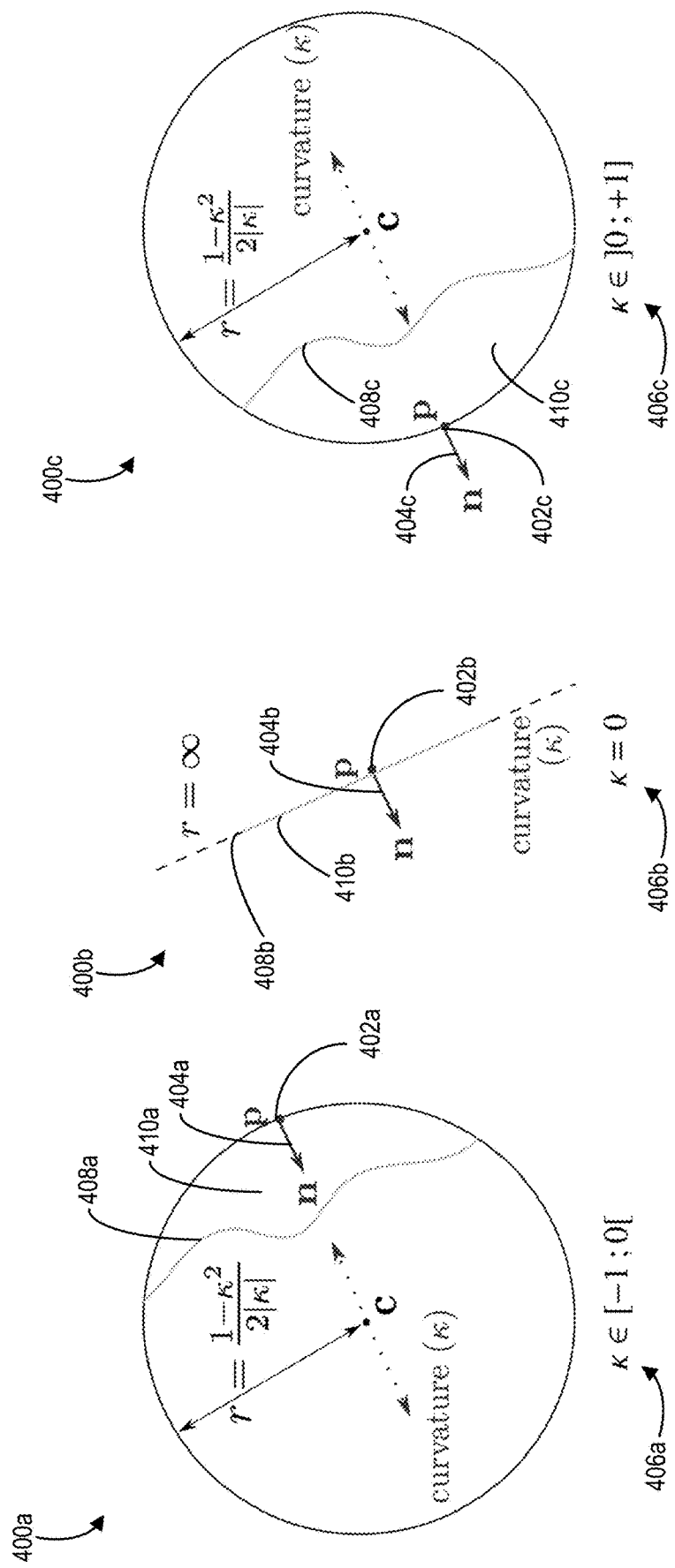
FIGS. 4A-4C illustrate diagrams of surface-centric representations of three-dimensional surfaces in accordance with one or more implementations.

FIGS. 4A-4C illustrate the enriched light source system 102 generating a plurality of different light source types based on different input parameters. Specifically, the enriched light source system 102 generates enriched light sources from a variety of different light source configurations corresponding to a plurality of different light source types. For example, the enriched light source system 102 generates an enriched light source to have a light source type in response to receiving input parameters defining a surface-centric representation. To illustrate, FIGS. 4A-4C illustrate different surface-centric representations corresponding to different light source types based on different input parameters.

As mentioned, the enriched light source system 102 generates enriched light sources based on a surface-centric representation of an algebraic sphere. The enriched light source system 102 utilizes the surface-centric representation to integrate geometric and algebraic components into a lighting model to obtain the flexibility and customizability of an algebraic representation while maintaining the intuitive parameterization of a geometric representation. In particular, a geometric sphere has a parameterization that includes a center point and a radius, which further allows for encoding a single point by setting the radius to zero. A geometric sphere is not easily encoded into a plane, however, as both the center point and the radius would be set to infinity for a geometric sphere parameterization.

According to one or more embodiments, to encode a sphere (or partial sphere), a plane, or a point with a single lighting model, the enriched light source system 102 leverages an algebraic sphere formulated based on a plurality of algebraic parameters. Adjusting the algebraic parameters of an algebraic sphere results in a variety of different shapes. Because adjusting algebraic parameters to obtain a specific geometric shape output is difficult and unintuitive, the enriched light source system 102 utilizes a surface-centric representation with a set of simplified parameters with geometric and algebraic properties by re-parameterizing the algebraic sphere to obtain a function. Specifically, in one or more embodiments, the surface-centric representation is based on a three-dimensional surface point on a surface of a three-dimensional structure, a three-dimensional direction for a light emission relative to the surface, and a surface curvature factor linked to the mean curvature of the algebraic sphere.

Additionally, in one or more embodiments, the enriched light source system 102 determines one or more of the parameters for the surface-centric representation based on one or more other parameters. To illustrate, the enriched light source system 102 determines the three-dimensional direction based on the three-dimensional surface point and the surface curvature factor. In particular, in some embodiments, the three-dimensional direction represents the normal at the three-dimensional surface point pointing in a direction based on a value of the surface curvature factor (e.g., based on where the surface curvature factor falls in a range of values).

For instance, based on a surface curvature factor with a negative value, the enriched light source system 102 generates a spherical cap with an interior surface having emissive properties. Alternatively, based on a surface curvature factor with a positive value, the enriched light source system 102 generates a spherical cap with an external surface having emissive properties. Additionally, the enriched light source system 102 generates a plane with an emissive surface based on a surface curvature factor of 0. In one or more embodiments, the enriched light source system 102 generates a point with emissive properties based on a surface curvature factor of 1 or −1.

As mentioned, in one or more embodiments, the enriched light source system 102 generates a surface-centric representation based on a re-parameterization of an algebraic sphere. In particular, an algebraic sphere provides a quadratic equation with five coefficients ($a_0$ to $a_4$), satisfied for any point $x(x,y,z)$ on its surface $a_0(x^2+y^2+z^2)+a_1x+a_2y+a_3z+a_4=0$, which is equivalent to $a_0x^2+m\cdot x+a_4=0$ with $m=-2a_0c$, and $a_4=a_0(c^2-r^2)$ in which c is the sphere center point. To encode a plane, the enriched light source system 102 sets $a_0=0$. Specifically, the algebraic sphere becomes a plane equation $n\cdot x+a_4=0$, where $n(x_n, y_n, z_n)$ is the plane normal of unit length. Given a point $p(x_p, y_p, z_p)$ in the plane, the plane equation becomes $a_4=-n\cdot p$. Additionally, when the sphere radius converges to 0, the enriched light source system 102 obtains a single point p, in which case the enriched light source system 102 substitutes the sphere center point c by point p, resulting in $m=-2a_0p$ and $a_4=a_0p^2$.

Directly manipulating the five coefficients ($a_0$ to $a_4$) of an algebraic sphere is not intuitive. The enriched light source system 102 utilizes an alternative re-parameterization that leverages advantages of both algebraic and geometric properties. As used herein, the re-parameterization that leverages advantages of both algebraic and geometric properties is referred to as a surface-centric representation. The enriched light source system 102 determines a surface-centric representation by determining a three-dimensional surface position p, a three-dimensional direction n (which is the normal at point p), and a surface curvature factor κ linked to the sphere mean curvature. The enriched light source system 102 determines $κ=a_0$ and then utilizes each of the three parameters above to determine the remaining coefficients ($a_1$ to $a_4$) of the algebraic sphere. By determining the algebraic coefficients in such a manner, the enriched light source system 102 can generate any kind of sphere (degenerate or non-degenerate). For example, FIGS. 4A-4C illustrate examples of the enriched light source system 102 can generating surface-centric representations utilizing the re-parametrization described above.

Algebraic spheres allow redundancy (i.e., multiple different equations correspond to the same sphere). The enriched light source system 102 prevents redundancy from the algebraic sphere equation by restricting κ (i.e., $a_0$) to [−1; +1] such that κ=0 for a plane, |κ|=1 for a point and 0<|κ|<1 for non-degenerate spheres. Based on the input parameters, the enriched light source system 102 determines vector m and factor $a_4$ as $m=(1-κ^2)n-2κp$ and $a_4=(1-κ^2)(-n\cdot p)+κp^2$. Additionally, the enriched light source system 102 can switch between the surface-centric representation and a geometric representation utilizing $$r = \frac{1-κ^2}{2|κ|}$$

and c=p−rn. For instance, the enriched light source system 102 applies a translation or scaling transformation to a light source and then switches back to the surface-centric representation by computing the new surface curvature factor $κ'=\text{sign}(κ)[-r+\sqrt{r^2+1}]$ while enforcing the sign of the previous surface curvature factor κ.

Additionally, in one or more embodiments, the enriched light source system 102 distinguishes between two cases based on the sign of the surface curvature factor. When the surface curvature factor κ is positive, the direction n points outside the sphere. When the surface curvature factor κ is negative, the direction n points to the inside of the sphere (i.e., toward c).

In response to receiving input parameters, the enriched light source system 102 determines the surface-centric representation for generating an enriched light source. For example, FIG. 4A illustrates a first surface-centric representation 400a based on a re-parameterization of an algebraic sphere. As shown, the first surface-centric representation 400a includes a spherical cap with a parabolic emissive region. In particular, in response to determining that a surface curvature factor falls within a first range of values (e.g., negative values), the enriched light source system 102 generates the first surface-centric representation 400a with a parabolic emissive region. Additionally, the enriched light source system 102 determines a size (e.g., a surface area) and shape of the first surface-centric representation 400a based on the input parameters (e.g., based on a surface point 402a, a direction 404a, a surface curvature factor 406a, and a surface boundary 408a).

FIG. 4B illustrates a second surface-centric representation 400b based on a re-parameterization of an algebraic sphere. FIG. 4B illustrates that the second surface-centric representation 400b includes a plane with an emissive region on a surface of the plane. For example, in response to determining that a surface curvature factor is equal to a specific value (e.g., a 0 value), the enriched light source system 102 determines the second surface-centric representation 400b with a plane emissive region. In one or more embodiments, the enriched light source system 102 sets a threshold value to 0 to transition the surface-centric representation to a plane for any set of input parameters (e.g., a surface point 402b, a direction 404b, a surface curvature factor 406b, and a plane boundary 408b) including the surface curvature factor equal to the threshold value.

FIG. 4C illustrates a third surface-centric representation 400c based on a re-parameterization of an algebraic sphere. In one or more embodiments, the enriched light source system 102 determines the third surface-centric representation 400c to include a spherical cap with an emissive region on an external surface of the spherical cap in response to determining that a surface curvature factor falls within a specific range of values (e.g., positive values). The enriched light source system 102 also determines a size and shape of the third surface-centric representation 400c based on the input parameters (e.g., a surface point 402c, a direction 404c, a surface curvature factor 406c, and a surface boundary 408c).

The enriched light source system 102 defines an enriched light source as a bonded region of the sphere surface (referred to herein as a source surface). As examples, FIGS. 4A-4C illustrate the source surfaces 410a, 410b, and 410c.

Once the source surface for an enriched light source is determined, the enriched light source system 102 defines the emission as a two-step distribution of the emittant flux.

To parametrize the shape of the enriched light source, the enriched light source system 102 uses mean surface curvature values between −1 and 1 and a set of values to bound the source surface (e.g., a spherical polygon). These values allow the enriched light source system 102 to fully determine the source surface. Specifically, in one or more embodiments, the enriched light source system 102 determines a surface-centric representation to include a point with emissive properties in response to determining that a surface curvature factor is equal to 1 or −1. Specifically, according to one or more embodiments, the enriched light source system 102 establishes upper and lower ends of possible values for a surface curvature factor to prevent redundancy in algebraic spheres corresponding to surface-centric representations. For instance, the enriched light source system 102 restricts the surface curvature factor to values in [−1; 1]. Accordingly, for surface curvature factors equal to −1 or 1, the enriched light source system 102 transitions a surface-centric representation to a point structure.

As described above, surface curvature factors equal to specific values (e.g., −1, 0, 1) result in degenerate spheres, while surface curvature factors between specific ranges (e.g., between −1 and 0, and between 0 and 1) result in non-degenerate spheres. By establishing specific values of surface curvature factors for transitioning between light source types, the enriched light source system 102 provides a flexible lighting model that is easily modified to generate enriched light sources of different light source types. Furthermore, the enriched light source system 102 utilizes the surface curvature factor with one or more additional parameters of a surface-centric representation to determine geometric and lighting properties of each enriched light source.

To generate an enriched light source, the enriched light source system 102 generates or determines a shape for the enriched light source. The shape of the enriched light source comprises the surface curvature and surface area of the enriched light source. As shown by FIG. 3, in one or more embodiments, the surface curvature and surface area together (i.e., shape) with the surface emittance cone define the enhanced light source. After describing how the enriched light source 102 determines the shape of the enriched light source, a description of determining the surface emittance cone will follow.

The shape of the enriched light source defines the source surface or light emitting surface of the enhanced light source. The source surface is also referred to herein as the geometric structure corresponding to the shape of the surface-centric representation. To determine the shape of the enriched light source, the enriched light source system 102 determines or defines a bounded region of the sphere surface (i.e., the source surface). To determine the source surface, the enriched light source system 102 determines a compact subset of locations $p_c$ on the sphere. In so doing, the enriched light source system 102 utilizes a spherical cap $\Omega_c$ of axis n and half-angle $\lambda_c$. The enriched light source system 102 determines the half-angle $\lambda_c$ as described below. Furthermore, $n_c \in S^2$ is the continuous set of directions and $n_c$ is also the sphere normal at location $p_c$ according to:

$$n_c = n + \frac{2\kappa}{(1-\kappa^2)}(p_c - p)$$

and symmetrically $$p_c = p + \frac{(1-\kappa^2)}{2\kappa}(n_c - n)$$

The enriched light source system 102 determines that location $p_c$ belongs to the source surface, or in other words, the surface emitting light by determining that $n \cdot n_c \geq \cos(\lambda_c)$.

The enriched light source system 102 determines the implicit value or half angle $\lambda_c$ from the surface curvature factor and the surface area of the light source. For non-degenerate spheres, the enriched light source system 102 determines $\lambda_c$ for the surface as $s=2\pi r^2(1-\cos(\lambda_c))$. As the radius of the sphere converges to a disk of radius ρ, the enriched light source system 102 determines that the surface converges to $s=\pi\rho^2$ (or symmetrically $\rho=\sqrt{s/\pi}$).

In the planar case, the enriched light source system 102 establishes that $p_c$ belongs to the source surface if $\|p_c-p\|\leq\rho$. In other cases, the enriched light source system 102 defines the spherical cap as:

$$\lambda_c = \begin{cases} \pi & \text{if } |\kappa|\rho - (1-\kappa^2) \geq 0 \\ 2\arcsin\left[\frac{|\kappa|\rho}{1-\kappa^2}\right] & \text{otherwise} \end{cases}$$

which ensures that the surface area of the resulting sphere is not greater than the whole sphere area (i.e., $4\pi r^2$).

Furthermore, in one or more embodiments, the enriched light source system 102 ensures numerical stability at the neighborhood of a planar surface by determining that the source surface is sufficiently flat when $\lambda_c$ is below a threshold $\epsilon_c$. The condition flat(κ, s) is met when $2\kappa^2 s - \pi(1-\cos(\epsilon_c))[1-\kappa^2]^2 < 0$. In one or more embodiments, the enriched light source system 102 sets the threshold $\epsilon_c$ to π/1800 (i.e., 0.1°) to avoid artifacts and sudden jumps in lighting effects.

Figure 5:
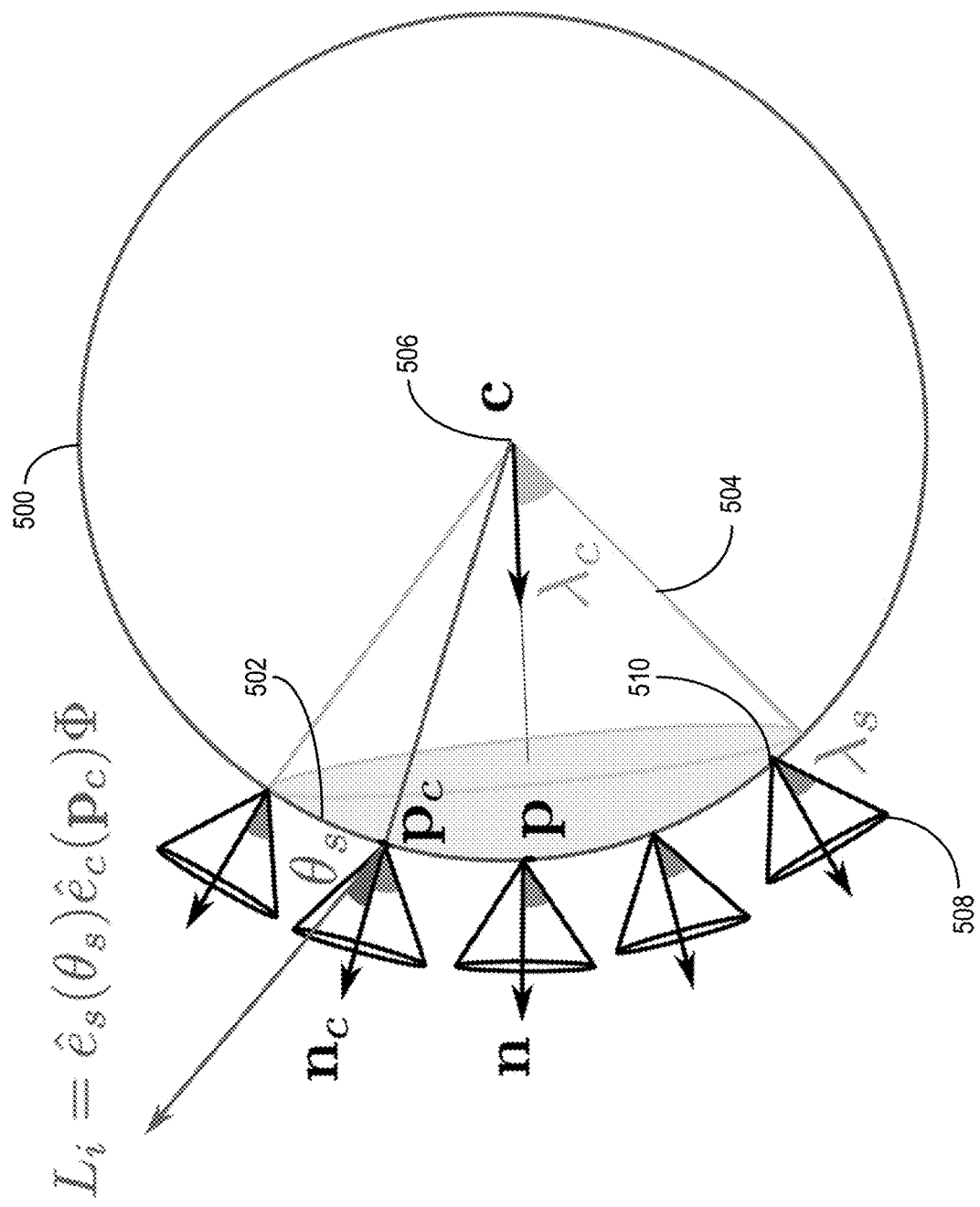
FIG. 5 illustrates a diagram of light emittance associated with an enriched light source in accordance with one or more implementations.

After, or otherwise in connection with, determining a shape of the surface-centric representation (e.g., as a sphere/spherical cap, a plane, or a point), the enriched light source system 102 also determines emission parameters for the enriched light source. FIG. 5 illustrates an enriched light source 500. As shown, the enhanced light source 500 is defined by the geometric structure or source surface 502 defined by the shape of the surface-centric representation (i.e., the surface curvature and surface area). In the embodiment of FIG. 5, the geometric structure 502 of the enhanced light source 500 comprises a spherical cap surface (i.e., the shaded region). As shown, the enhanced light source 500 also includes or is defined by a core emittance 504 and surface emittance 508. The core emittance 504 is the distribution $\hat{e}_c$ of emittant flux Φ over the geometric structure 502. The surface emittance 508 is the $\hat{e}_s$ of emittance at a surface point in the emittance cone. Thus, the enriched light source system 102 determines a power and spread of emitted light to apply to a geometric structure of the enriched light source 500. In particular, the enriched light source system 102 determines a core emittance 504 from a center point 506 corresponding to the enriched light source 500. FIG. 5 illustrates that the core emittance 504 is represented as a cone of light flux emitting from the center point 506. In one or more embodiments, the enriched light source system 102 utilizes emittance distribution functions similar to a falloff function described below, for example, as used in a spotlight light source.

According to one or more embodiments, the enriched light source system 102 determines the distribution of the flux over the surface 502 by utilizing a radial falloff function based on an edge size of the geometric structure 502 and a falloff power. In at least some embodiments, the enriched light source system 102 determines a core emittance 504 with a uniform distribution across the geometric structure 502 (e.g., with a null edge size). In alternative embodiments, the enriched light source system 102 determines a core emittance 504 with a greater intensity toward a center of the geometric structure 502 and lower intensity toward an edge of the geometric structure 502 (e.g., with a non-null edge size).

Furthermore, in one or more embodiments, the enriched light source system 102 provides consistent total emittance for an enriched light source. For instance, the enriched light source system 102 determines the core emittance 504 by utilizing a normalized radial falloff function. Normalizing the radial falloff function results in a constant total emittance (e.g., based on integrating the emittance across the geometric structure 502). Thus, changes in the core emittance 504 maintain a total amount of light flux produced by the enriched light source.

More specifically, the enriched light source system 102 determines lighting parameters associated with an enriched light source by first determining a radial falloff function $e_c$ with an edge size $\eta_c \in [0; 1]$ and falloff power $\gamma_c$. As previously noted, when $\eta_c$ is null, the enriched light source system 102 provides a uniform distribution, while non-null values of $\eta_c$ define a warm spot on the surface of the enriched light source. As a result, in the case of a spherical cap $$e_c(p_c) = \begin{cases} 0 & \text{if } n_c \cdot n \leq \cos(\theta_c^{out}) \\ 1 & \text{if } n_c \cdot n \geq \cos(\theta_c^{in}) \\ \left(\dfrac{n_c \cdot n - \cos(\lambda_c^{out})}{\cos(\lambda_c^{in}) - \cos(\lambda_c^{out})}\right) & \text{otherwise} \end{cases}$$

where $\lambda_c^{out} = \lambda_c$ and $\lambda_c^{in} = (1-\eta_c)\lambda_c$ is the half angle of the inner cap for which core emittance is maximum.

Furthermore, in the case of a flat surface, the enriched light source system 102 substitutes this falloff function by its limit when $\kappa$ converges to 0:

$$e_c(p_c) = \begin{cases} 0 & \text{if } \|p_c \cdot p\| \leq \rho^{out} \\ 1 & \text{if } \|p_c \cdot p\| \geq \rho^{in} \\ \left(\dfrac{n_c \cdot n - \cos(\lambda_c^{out})}{\cos(\lambda_c^{in}) - \cos(\lambda_c^{out})}\right) & \text{otherwise} \end{cases}$$

where $\rho^{out} = \rho$, and $\rho^{in} = (1-\eta_c)\rho$ is the radius of an inner disk onto which core emittance is maximum.

In one or more embodiments, the enriched light source system 102 defines a warm spot with sharpness factor $\lambda_c$ onto the surface of the enriched light source. In such embodiments, the warm spot imitates a light bulb placed behind a hessian, which provides improved highlighting of a roundness of lit objects by creating a lighting gradient.

In one or more embodiments, the enriched light source system 102 applies the falloff by ensuring that the integral of a core emittance $L_e(p_c) = e_c(p_c)\Phi$ at location $p_c$ is set to 1. Specifically, the enriched light source system 102 computes the integral of the falloff function as $$E_c = \int_{p_c} e_c(p_c) dp_c$$

The enriched light source system 102 also provides a normalized falloff function $\hat{e}_c(p_c) = e_c(p_c)/E_c$, which the enriched light source system 102 uses as the core emittance distribution. In one or more embodiments, the enriched light source system 102 utilizes the core emittance distribution at render time.

As mentioned above, the enriched light source system 102 determines a second type of emittance that represents a re-distribution of the core emittance 504 across the geometric structure 502 of the enriched light source 500. Specifically, the enriched light source system 102 determines a surface emittance 508 at a surface point 510 on the geometric structure 502. For instance, FIG. 5 illustrates that the surface emittance 508 is represented as a cone of light flux emitting from the surface point 510. Furthermore, FIG. 5 illustrates surface emittance distributions for a plurality of points along the geometric structure 502 of the enriched light source 500. In one or more embodiments, the enriched light source system 102 determines a single surface emittance that applies to each surface point along the geometric structure 502.

In one or more embodiments, the enriched light source system 102 determines the surface emittance 508 to include an emittance cone with an angle of emission based on the type of light point. For example, the surface emittance 508 includes a narrow emittance cone (e.g., below a maximum value) for punctual light sources (e.g., point light sources, spotlight light sources, directional light sources). In another example, the surface emittance 508 includes a wide emittance cone (e.g., 180 degree value) for radiating light sources such as area lights, which have a uniform surface emittance distribution in all directions across the geometric structure 502.

According to one or more embodiments, the enriched light source system 102 determines the surface emittance 508 by utilizing an additional radial falloff function based on an opening angle, an edge size of the surface 502, and a falloff power. Thus, the enriched light source system 102 determines surface emittance cones with different angles based on the light source type of an enriched light source 500. Additionally, in some embodiments, the enriched light source system 102 determines more than one surface emittance cone for a light source type. For example, the enriched light source system 102 determines two surface emittance cones for spotlight light sources with different angles, and thus, different emittance values.

Specifically, at any surface location $p_c$, the core emittance is non-uniformly distributed inside the emittance cone. The enriched light source system 102 parameterizes the core emittance by utilizing another radial falloff function $e_s$, an opening angle (e.g., the half angle $\lambda_s \in [0; \pi/2]$, an edge size $\eta_s \in [0; 1]$, and a falloff power $\gamma_s$. For a spotlight light source, the enriched light source system 102 defines two cones: an outer cone of half angle $\lambda_s$ and an inner cone of half angle $(1-\eta_s)\lambda_s$. In one or more embodiments, the emittance value is maximum in the inner cone and radially decreases to zero at the edge of the outer cone.

Additionally, in at least some embodiments, the enriched light source system 102 determines the radial falloff function from the angle $\theta_s$ formed by an outgoing light ray and the normal $n_c$:

$$e_c(p_c) = \begin{cases} 0 & \text{if } \cos(\theta_s) \leq \cos(\lambda_s^{out}) \\ 1 & \text{if } \cos(\theta_s) \geq \cos(\lambda_s^{in}) \\ \left(\dfrac{\cos(\theta_s) - \cos(\lambda_s^{out})}{\cos(\lambda_c^{in}) - \cos(\lambda_s^{out})}\right) & \text{otherwise} \end{cases}$$

where $\lambda_s^{out}=\lambda_s$, $\lambda_s^{in}=(1-\eta)\lambda_s^{out}$ is the half angle of an inner cone for which surface emittance is maximum. In one or more embodiments, the enriched light source system 102 then determines the integral of the radial falloff function ($E_s$) and utilize the surface emittance distribution as $\hat{e}_s(\theta_s)=e_s(\theta_s)/E_s$.

After determining a shape and emittance properties for a surface-centric parameterization, the enriched light source system 102 generates an enriched light source 500 to insert into a three-dimensional environment. Specifically, the enriched light source system 102 bounds the determined emissive properties to a geometric structure corresponding to the surface-centric representation. For instance, in response to determining that the surface-centric representation corresponds to a sphere/spherical cap, a point, or a plane, the enriched light source system 102 generates an enriched light source of the determined geometric structure. The enriched light source system 102 further encodes the enriched light source with the emissive properties by bounding the emission parameters onto the sphere/spherical cap, point, or plane.

In one or more embodiments, the enriched light source system 102 (or another system such as the 3D image system 110 of FIG. 1) renders a three-dimensional environment including an enriched light source. Additionally, the three-dimensional environment can include one or more additional objects with the enriched light source. Because the enriched light source includes a unified lighting model based on a surface-centric representation of an algebraic sphere, the enriched light source system 102 utilizes a sampling process that includes sampling based on the curvature of the enriched light source. FIGS. 6A-6C, FIG. 7, and FIG. 8 illustrate the enriched light source system 102 using a shading and sampling process on a plurality of different enriched light sources for a shaded point on a surface of a three-dimensional object.

As previously described, the enriched light source system 102 also determines a contribution of an enriched light source onto a shaded point x with a normal of $n_x$ in a three-dimensional scene. Specifically, the enriched light source system 102 first determines cases for which x cannot receive light from the enriched light source. For example, a first case includes an enriched light source with light emitted outside the source surface ($\kappa>0$). In particular, points located inside the supporting sphere do not receive light. To illustrate, the condition inside(x) is true when $\|v(x)\|-(1-\kappa^2)<0$ where the enriched light source system 102 utilizes $v(x)=(1-\kappa^2)n-2\kappa(p-x)$ to compute the vector $2\kappa(x-c)$ without explicitly computing c. Furthermore, in some embodiments, the enriched light source system 102 reuses $v(x)$ for later computations.

In one or more embodiments, the enriched light source system 102 also determines a second case in which $\kappa=0$ for a planar enriched light source. In particular, the enriched light source system 102 does not perform shading computations if x is behind the light source—i.e., if the light direction n is back-facing x. This holds true when $n \cdot (x-p) \leq 0$.

The enriched light source system 102 also determines a third case in which light is emitted from inside the source surface ($\kappa<0$). To illustrate, the enriched light source system 102 avoids shading computations when x is outside the supporting sphere and located behind the enriched light source's bounding disk. Additionally, the enriched light source system 102 can re-use the inequations for the above two cases by replacing p in the second case with $p_{cap}$, which represents a spherical cap location, as described in more detail further below.

FIGS. 6A-6C illustrate enriched light sources of a plurality of different light source types. Specifically, FIG. 6A illustrates a first enriched light source 600a including a parabolic light source in which an emissive region is on an interior surface of the first enriched light source 600a. FIG. 6B illustrates a second enriched light source 600b including a spherical cap in which an emissive region is on an exterior surface of the second enriched light source 600b. Additionally, FIG. 6C illustrates a third enriched light source 600c including a plane in which an emissive region is on one side of the plane. Although FIGS. 6A-6C illustrate specific embodiments of enriched light sources, an enriched light source can include any shape as determined from a surface-centric representation based on an algebraic sphere.

In one or more embodiments, the enriched light source system 102 determines an amount of emitted light from an enriched light source (e.g., the first enriched light source 600a, the second enriched light source 600b, or the third enriched light source 600c) that hits a shaded point of an object surface within a three-dimensional environment. Specifically, the enriched light source system 102 first determines cases for which a shaded point (e.g., a first shaded point 602a, a second shaded point 602b, or a third enriched light source 602c) cannot receive light from the enriched light source. In one or more embodiments, the enriched light source system 102 then randomly samples arcs/rings in cones of direction intersecting a surface of the enriched light source.

To illustrate, as shown in FIG. 6A, the enriched light source system 102 identifies a plurality of rings along a cone of direction 604 from the first shaded point 602a that intersect with the first enriched light source 600a. For example, the enriched light source system 102 selects the cone of direction 604 originating from the first shaded point 602a (i.e., the first shaded point 602a forms an apex of the cone of direction 604). Additionally, in some embodiments, the cone of direction 604 includes a randomly selected angle such that the cone of direction 604 at least partially intersects the first enriched light source 600a.

In one or more embodiments, the enriched light source system 102 also determines that intersections between the cone of direction 604 and the first enriched light source 600a form rings. For instance, the enriched light source system 102 first categorizes rings on the cone of direction 604 by classifying the rings as front rings (e.g., a first ring 606a in FIG. 6A) or back rings (e.g., a second ring 606b in FIG. 6B). Depending on the shape of the enriched light source, the enriched light source system 102 determines that only front rings or back rings contribute to lighting of a shaded point. To illustrate, for the parabolic shape of the first enriched light source 600a of FIG. 6B having a negative surface curvature factor, only back rings contribute to the lighting of the first shaded point 602a, while a front ring may partially or fully occlude a back ring. Conversely, for the second enriched light source 600b of FIG. 6B having a positive surface curvature factor, only front rings contribute to the lighting of the second shaded point 602b. Thus, the enriched light source system 102 determines a subset of intersecting rings to sample for determining lighting on a shaded point.

After classifying rings along a cone of direction, in one or more embodiments, the enriched light source system 102 determines rings (and portions of rings) that do not intersect with the enriched light source from the sampling process. For example, the enriched light source system 102 determines whether each ring in a set of rings intersects the enriched light source. Specifically, the enriched light source system 102 determines whether rings or portions of rings partially or fully intersect the surface of the enriched light source based on whether the rings or portions of rings are partially or fully occluded from the emitting surface of the enriched light source.

Figure 7:
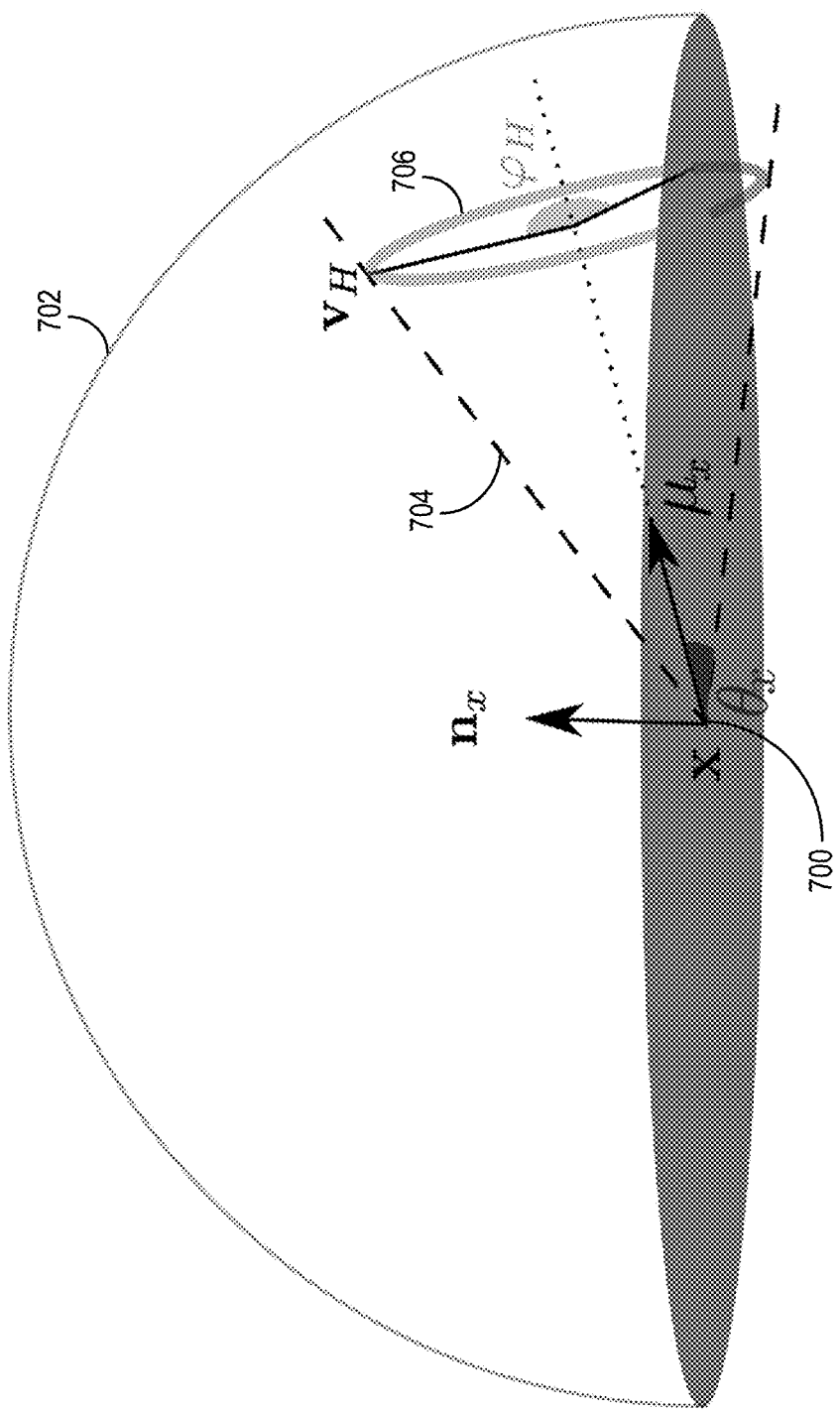
FIG. 7 illustrates a diagram of the enriched light source system determining light that intersects a hemisphere of a shaded point of a three-dimensional surface in accordance with one or more implementations.

In addition to determining whether rings along a cone of direction intersect with an enriched light source, in one or more embodiments, the enriched light source system 102 also prunes rings (or portions of rings) along the cone of direction that do not intersect with a hemisphere associated with a shaded point. For example, FIG. 7 illustrates a shaded point 700 on a surface of a three-dimensional object and a hemisphere 702 associated with the shaded point 700. In one or more embodiments, the enriched light source system 102 determines whether rings along a cone of direction 704 with the shaded point 700 as the apex intersect at least partially or fully with the hemisphere 702. FIG. 7 illustrates that at least a portion of a ring 706 along the cone of direction 704 intersects with the hemisphere 702. The enriched light source system 102 excludes the occluded portion(s) of the ring 706 from sampling because the occluded portion(s) are back-facing the shaded point 700.

Once the enriched light source system 102 has determined one or more rings to sample, the enriched light source system 102 samples points along the ring(s) to calculate a contribution of the ring(s) to the lighting of the shaded point. For example, the enriched light source system 102 determines the portions of the identified ring(s) that intersect with the surface of the enriched light source. Additionally, the enriched light source system 102 identifies portions of the cone of directions that intersect with the hemisphere of the shaded point. Finally, the enriched light source system 102 combines the intersecting portions to determine an intersection set including rings and portions of rings intersecting the surface of the enriched light source and the hemisphere of the shaded point.

Figure 8:
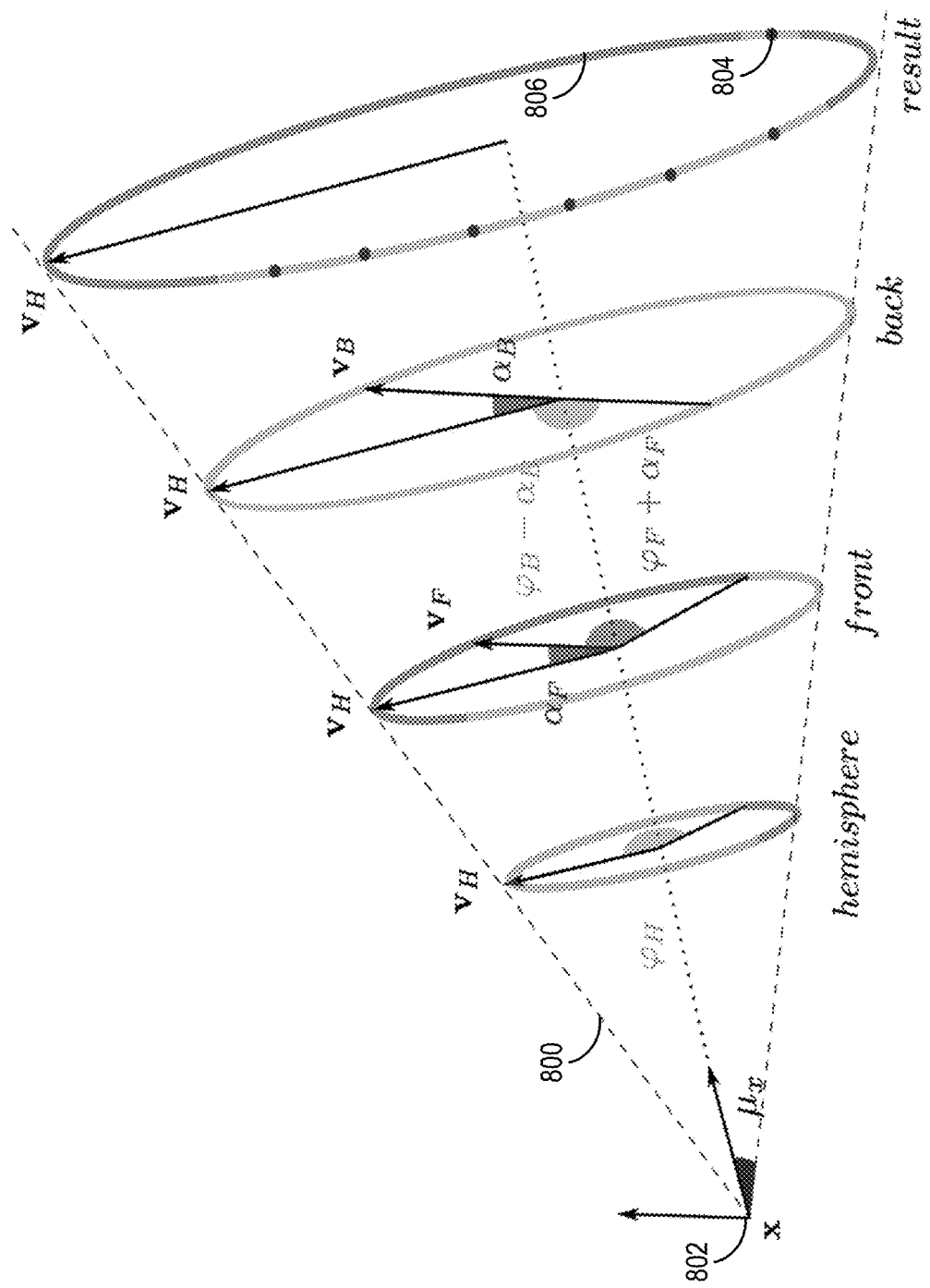
FIG. 8 illustrates a diagram of the enriched light source system determining a range of points to sample for a shaded point of a three-dimensional surface in accordance with one or more implementations.

According to one or more embodiments, the enriched light source system 102 samples points in the intersection set to determine a total light contribution by the enriched light source to the shaded point. FIG. 8 illustrates an intersection set of rings and partial rings along a cone of direction 800 from a shaded point 802 on a surface of a three-dimensional object in a three-dimensional environment. For example, the enriched light source system 102 samples points (e.g., point 804) along the rings or portions of rings (e.g., ring 806) within the intersection set and then integrates over the sampled points to determine the contribution of one or more rings (e.g., by determining a bidirectional reflectance distribution function for each ring).

In one or more embodiments, the enriched light source system 102 samples a number of rings and points according to a sampling budget. For example, the enriched light source system 102 determines the sampling budget as a number of rings and a number of sampled points per ring. In some embodiments, the enriched light source system 102 determines the sampling budget based on a selection of a number of rings and a number of points per ring. Alternatively, the enriched light source system 102 determines the sampling budget based on a selection of a rendering quality or rendering speed.

Furthermore, in some embodiments, the enriched light source system 102 samples light from an enriched light source including a directional light source by applying no attenuation of a light intensity. Specifically, the enriched light source system 102 assumes that the light received by a shaded point is invariant to the light source distance. Thus, the enriched light source system 102 determines that contributing portions of the light are as invariant as possible to the distance from the surface of the enriched light source. To achieve no attenuation of the light intensity, in one or more embodiments, the enriched light source system 102 computes the light onto the shaded point as being positioned at a set distance from the shaded point. In addition, the enriched light source system 102 can utilize a manually selected attenuation parameter to further modify the behavior of the directional light source.

The foregoing description of FIGS. 6A-8 provides an overview of the importance-sampling strategy that the enriched light source system 102 utilizes. More specific details of the importance sampling strategy will now be provided. The enriched light source system 102 utilizes a customized important sampling strategy that allows computing lighting effects with no approximation so as to be able to be implemented in ray-tracing engines. Additionally, the enriched light source system 102 utilizes a customized important sampling strategy that allows lighting designers to rapidly parametrize lights beforehand that allows for interactively previewing results.

In one or more embodiments, the enriched light source system 102 utilizes an importance-sampling process to sample light from an enriched light source that leverages properties of the enriched light source. Specifically, due to the spherical based-shape of the enriched light source, the enriched light source system 102 narrows a range of incoming light directions to a solid angle of axis $\mu_x$ and half angle $\lambda_x$ computed as $\mu_x = -\text{sign}(\kappa)v(x)$ and $$\lambda_x = \begin{cases} \pi & \text{if inside } (x) \\ \arcsin X, \text{ with } X = \frac{1-\kappa^2}{\|v(x)\|} & \text{if outside } (x) \end{cases}$$

Additionally, assuming a randomly chosen angle $\theta_x \in [0; \lambda_x]$. In one or more embodiments, the enriched light source system 102 also selects random incoming directions $\omega_i$ such that the angle $(\omega_i, \mu_x)$ equals $\theta_x$. Accordingly, the surface emittance distribution $\hat{e}_s(\theta_x)$ is invariant to the chosen direction $\omega_i$. Thus, for the importance sampling, the enriched light source system 102 utilizes on the angle $\theta_x$. This allow applies to the distances $l_F$ and $l_B$. As such, the enriched light source system 102 computes these three values once for all such directions. This is illustrated in FIGS. 6A-6C.

Furthermore, in one or more embodiments, the enriched light source system 102 uses the sets of directions to determine the edge of a cone with an apex at x. The cone intersects with the support sphere of the enriched light source to form to rings (or partial rings): a front ring and a back ring, which is a first and second intersection, respectively. The enriched light source system 102 leverages this property to solve a rendering equation in a two-step sampling process of 1) sampling contributing rings, and then 2) sampling contributing portions along them.

Prior to sampling contributing rings, in one or more embodiments, the enriched light source system 102 prunes rings that cannot contribute to the shading of x. For example, the enriched light source system 102 utilizes two pruning states: a first stage for rings not intersecting with the source surface, and then rings with a zero surface emittance in the direction of x. Once the enriched light source system 102 has sampled a ring, and prior to sampling contributing portions along the rings, the enriched light source system 102 also prunes portions of the rings that do not contribute to the lighting of the shaded point. Specifically, the enriched light source system 102 prunes portions not intersecting with the source surface—i.e., with zero emittance—and portions for which the emittance cone is back-facing x—i.e., emittance convoluted with a zero clamped-cosine value, as shown in FIG. 7.

With regard to ring sampling, in one or more embodiments, in the first sampling stage, the enriched light source system 102 narrows the set of rings likely to intersect with the source surface. In particular, the enriched light source system 102 utilizes an algorithm to determine an intersection for two spherical caps on the same sphere as described by Oleg Mazonka in "Solid angle of conical surfaces, polyhedral cones, and intersecting spherical caps," in arXiv: 1205.1396 (2015), which is herein incorporated by reference in its entirety. To illustrate, the enriched light source system 102 determines that a cone originating from x is directed toward the sphere center c. The corresponding ring is then also the edge of a spherical cap on the sphere with an axis as $\hat{\lambda}_R$ and to the half angle as $\lambda_R$ while replacing R with F for the front ring and B for the back ring. In one or more embodiments, the enriched light source system 102 samples angles $\theta_R$ ($\leq \lambda_R$) directly onto the support sphere for the enriched light source with a narrow subset of angles included in [0; $\lambda_R$] to sample.

According to one or more embodiments, the enriched light source system 102 defines the axes of two spherical caps as $\hat{\mu}_B = -\hat{\mu}_F = \hat{\mu}_x$. The enriched light source system 102 also determines the maximum angles:

$$\lambda_F = \begin{cases} 0 & \text{if inside } (x) \\ \arccos\left(\frac{1-\kappa^2}{\|v(x)\|}\right) & \text{otherwise} \end{cases}$$

and $\lambda_B = \pi - \lambda_F$. The enriched light source system 102 thus classifies the rings as front rings and back rings. As previously noted, if $\kappa < 0$, only back rings contribute, and the associated front rings may occlude the back rings (e.g., self-occlusions by front regions intersecting the source surface). Consequently, in the former case, the enriched light source system 102 samples front rings with angle $\theta_R = \theta_F$, while in the latter case, the enriched light source system 102 samples back rings with angle $\theta_R = \theta_B$.

In one or more embodiments, for a sampled random value $\theta_R \in [0; \lambda_R]$, the enriched light source system 102 determines a number of values shared across a plurality of computations related to a ring. For instance, the enriched light source system 102 determines that a cone of incoming light direction has a half angle:

$$\theta_x = \frac{\|v(x)\| - (1-\kappa^2).\text{sign}(\kappa)\cos(\theta_R)}{\sqrt{(1-\kappa^2)^2 + \|v(x)\|^2 - 2(1-\kappa^2)\|v(x)\|.\text{sign}(\kappa)\cos(\theta_R)}}$$

In such embodiments, the outgoing light rays have the same relative angle inside their respective emittance cones: $\theta_s = \theta_R + \text{sign}(\kappa)\theta_x$. Furthermore, the distance to the source surface is:

$$l_R = \frac{\sqrt{(1-\kappa^2)^2 + \|v(x)\|^2 - 2(1-\kappa^2)\|v(x)\|.\text{sign}(\kappa)\cos(\theta_R)}}{2|\kappa|}$$

In the case where $\kappa < 0$ (e.g., $\theta_R$ is $\theta_B$), the enriched light source system 102 determines the corresponding angle $\theta_F$:

$$\theta_F = \begin{cases} 0 & \text{if inside } (x) \\ \theta_s - \theta_x & \text{otherwise} \end{cases}$$

In one or more embodiments, the enriched light source system 102 prunes rings not likely to intersect with the surface of the enriched light source. Specifically, the enriched light source system 102 categorizes ranges of angles $\theta_R$ which are not intersecting ($\mathcal{I}_{\theta_R}^{none}$), partially intersecting ($\mathcal{I}_{\theta_R}^{part}$) or fully intersecting ($\mathcal{I}_{\theta_R}^{full}$) the source surface. The enriched light source system 102 utilizes three angles: the surface solid angle ($\lambda_c$), the variable solid angle associated to rings ($\lambda_R$), and the angle between both axes (n,$\mu_R$). As a result, the enriched light source system 102 narrows the sampled angles to the set $\mathcal{I}_{\theta_R} = \mathcal{I}_{\theta_R}^{full} \cup \mathcal{I}_{\theta_R}^{part}$ for two spherical caps.

Additionally, for negative surface curvature factor, the enriched light source system 102 also computes $\mathcal{I}_{\theta_F}^{full}$ (fully occluding rings) to exclude the corresponding range from $\mathcal{I}_{\theta_B}$. From an interval bound $\theta_F$, the enriched light source system 102 obtains the associated interval bound $\theta_B = \theta_F - \theta_x$, where the enriched light source system 102 determines $\theta_x$ with $\theta_R = \theta_F$ and sign($\kappa$)=1.

In further embodiments, the enriched light source system 102 prunes rings leading to incoming light directions convoluted with a zero clamped-cosine value (e.g., for a back-facing point x). For example, such rings correspond to cones of direction with half angle $\theta_x$ such that they do not intersect the hemisphere $\Omega_x$. To determine such cones, the enriched light source system 102 calculates $\mathcal{I}_{\theta_x}^{none}$ (fully back-facing) to exclude the corresponding range from $\mathcal{I}_{\theta_R}$. From an interval bound $\theta_x$, the enriched light source system 102 obtains the associated interval bound:

$$\theta_R = \arcsin\left(\frac{\|v(x)\|\sin(\theta_x)}{1-\kappa^2}\right) - \text{sign}(\kappa)\theta_x$$

According to one or more embodiments, the enriched light source system 102 prunes rings for which a surface emittance is zero in the direction of x. Specifically, the enriched light source system 102 determines that such rings correspond for which $\theta_s$ is greater than $\lambda_s$. Consequently, the enriched light source system 102 narrows $\mathcal{I}_{\theta_R}$ to rings that satisfy $\theta_R < \lambda_s - \text{sign}(\kappa)\theta_x^{max}$, with $$\theta_x^{max} = \arcsin\left(\frac{1-\kappa^2}{\|v(x)\|}\sin(\lambda_s)\right).$$

Furthermore, when the enriched light source system 102 verifies that $\kappa < 0$ and inside(x), the enriched light source system 102 keeps the set of rings that satisfies $\theta_B > \pi + \lambda_s - \theta_x^{max}$.

Once the enriched light source system 102 has sampled a ring, the enriched light source system integrates emittance on one or more portions of the ring contributing to the shading of point x. The enriched light source system 102 then prunes the portions of the ring that do not contribute prior to randomly sampling points $p_c$ onto the remaining parts.

The enriched light source system 102 determines such parts in a three-step process: 1) intersect the sampled ring with the surface of the enriched light source (including front and back rings, if appropriate), 2) intersect the associated cone of incoming light directions with the hemisphere $\Omega_x$, and 3) intelligently combining the intersections.

In one or more embodiments, the enriched light source system 102 utilizes an intersection algorithm that computes the intersecting surface area for two spherical caps. The enriched light source system 102 computes the intersection of a ring (e.g., the edge of a spherical cap $C_1$ with another spherical cap $C_2$). The axes of the spherical caps are $\mu_1$ and $\mu_2$ with half angles $\theta_1$ and $\theta_2$, respectively. The enriched light source system 102 denotes a as the angle formed by both axes. Based on such input parameters, the enriched light source system 102 determines the set of points on the ring (e.g., an arc), which belongs to $C_2$. Accordingly, the enriched light source system 102 defines the range through two components—the arc length and the arc location. The enriched light source system 102 defines the arc length as an interval $\mathcal{J}_{\varphi_1}=[-\varphi_1; +\varphi_1]$, $\varphi_1$ computed through the function:

$$\varphi(\alpha, \theta_1, \theta_2) = \arccos\left(\frac{\cos(\theta_2) - \cos(\alpha)\cos(\theta_1)}{\sin(\alpha)\sin(\theta_1)}\right)$$

In the case of $$\theta_2 > \frac{\pi}{2},$$

the enriched light source system 102 determines that $\varphi_1$ is $\pi-\varphi(\pi-\alpha, \theta_1, \pi-\theta_2)$.

Furthermore, in one or more embodiments, the enriched light source system 102 defines an arc location with an arc middle point of direction vector $v_1$ originating from the center of the disk. In practice, $v_1 = \mu_1 \times \mu_2 \times \mu_1$. As a result, on the unit sphere, the enriched light source system 102 determines all points onto the intersecting arc (from the sphere center) based on $\cos(\theta_1) \mu_1 + \sin(\theta_1) \cdot q \cdot v_1$, where q is a rotation of an angle $\varphi \in \mathcal{J}_{\varphi_1}$ around axis $\pm\mu_1$.

To determine the intersections with the source surface, for example, the enriched light source system 102 computes the intersection of a ring with the spherical cap $\Omega_s$. The enriched light source system 102 utilizes the intersection algorithm with $\theta_1 = \theta_R$, $\theta_2 = \lambda_c$, $\mu_1 = \mu_R$, and $\mu_2 = n$. In one or more embodiments, the enriched light source system 102 thus determines two intersections $(v_F, \mathcal{J}_{\varphi F})$ and $(v_B, \mathcal{J}_{\varphi B})$. FIGS. 6A-6C illustrate the enriched light source system 102 determining the intersection with the geometric structure (i.e., the source surface).

Furthermore, to determine an intersection of a cone of light directions with the hemisphere $\Omega_x$, the enriched light source system 102 also utilizes the intersection algorithm with $\theta_1 = \theta_x$, $$\theta_2 = \frac{\pi}{2},$$

$\mu_1 = \mu_x$, and $\mu_2 = n_x$. The enriched light source system 102 then determines the intersection $(v_H, \mathcal{J}_{\varphi H})$. FIGS. 6A-6C illustrate the enriched light source system 102 determining the intersection with the geometric structure (i.e., the source surface). FIG. 7 illustrates the enriched light source system 102 determining the intersection with the hemisphere.

In one or more embodiments, the enriched light source system 102 then determines the range $\mathcal{J}_{\varphi R}$ of points to sample. Additionally, in some embodiments, the enriched light source system 102 expresses the intersections in a frame orthogonal to $\mu_x$, with $\mu_R \pm \mu_x$. Accordingly, the vectors $v_F$, $v_F$, and $v_F$ are orthogonal to $\mu_x$. The enriched light source system 102 also re-expresses $\mathcal{J}_{\varphi F}$, $\mathcal{J}_{\varphi B}$, and $\mathcal{J}_H$ as a union of intervals with regards to vector $v_H$:

$$\mathcal{J}(\alpha, \varphi) = \begin{cases} [-\pi; \alpha+\varphi] \cup [\alpha-\varphi+2\pi; \pi], & \text{if } \alpha-\varphi<-\pi \\ [-\pi; \alpha+\varphi-2\pi] \cup [\alpha-\varphi; \pi], & \text{if } \alpha+\varphi>\pi \\ [\alpha-\varphi; \alpha+\varphi], & \text{otherwise} \end{cases}$$

where $\alpha$ represents the signed angle from a given orientation v to the orientation $V_H$. The enriched light source system 102 then determines the range of values $\varphi_i$ on which to integrate the bidirectional reflectance distribution function as:

$$\mathcal{J}_\varphi(\theta_R) = \begin{cases} \mathcal{J}(\alpha_H, \varphi_H) \cap \mathcal{J}(\alpha_B, \varphi_B) \mathcal{J}(\alpha_F, \varphi_F), & \text{if } \kappa<0 \\ \mathcal{J}(\alpha_H, \varphi_H) \cap \mathcal{J}(\alpha_F, \varphi_F), & \text{if } \kappa>0 \end{cases}$$

FIG. 8 illustrates the enriched light source system 102 performing the process of combining intersections.

In one or more embodiments, the enriched light source system 102 then samples points along one or more rings or partial rings as:

$$\int_{\cdot} \int_{\cdot} L_i(x,\omega_i) f_r(x,\omega_o,\omega_i) \langle n_x, \omega_i \rangle \, d\theta_R d\varphi_i$$

in which the enriched light source system 102 determines $\omega_i$ from angle $\varphi_i$, with $\mu_1 = \mu_2$ and rotation axis $\mu_x$. Additionally, $L_i$ represents the incoming light intensity, and $f_r$ is the bidirectional reflectance distribution function for an emission point x. Furthermore, the enriched light source system 102 samples directions $n_c$ in a solid angle $\Omega_c$ to re-write the above double integral as:

$$\frac{\Phi}{s} \int_{\cdot} \hat{e}_s(\theta_s) \cdot A^\perp(\theta_R) F_r(x, \omega_o, \theta_R) d\theta_R$$

where $A^\perp$ stands for the projected area of the sampled ring:

$$A^\perp(\theta_R) = \text{length}\left(\mathcal{J}_\varphi(\theta_R)\right) \cdot \sin(\theta_R) \left[\frac{\cos(\theta_s)}{l_R^2}\right]$$

and $F_r$ for the integrated bidirectional reflectance distribution function along a ring, in which the enriched light source system 102 incorporates the core emittance distribution:

$$F_r(x,\omega_o,\theta_R) = \int_{\cdot} \hat{e}_c(p_c) f_r(x,\omega_i,\omega_i) \langle n_x, \omega_i \rangle \, d\varphi_i$$

In addition, the enriched light source system 102 provides an option to users to set a sampling budget (N, M) with N sampled rings and M sampled points per rings.

Furthermore, the enriched light source system 102 handles cases of distant lights (e.g., directional lights) by determining that the light received by a point x is invariant to the light source distance. Accordingly, the enriched light source system 102 applies no attenuation to the light intensity of the light source. For example, the enriched light source system 102 replaces $\|v(x)\|$ with $\|v'(x)\|$ when narrowing $\mathcal{J}_{\theta_R}$, in which:

$$\|v'(x)\| = \begin{cases} \text{sign}(v(x) \cdot n)[1 - \kappa^2 - 2|\kappa|], & \text{if } \kappa < 0 \\ 1 - \kappa^2 + 2|\kappa|, & \text{if } \kappa > 0 \end{cases}$$

The enriched light source system 102 thus places the closest point on the light source at distance 1 from the shaded point, which ensures invariance of the contributing region with regards to distance. Additionally, in one or more embodiments, the enriched light source system 102 provides the user with an additional attenuation parameter $a \in [0; 2]$, though the formulas also function for a>2. Furthermore, the enriched light source system 102 blends $\|v'(x)\|$ (when a=0) and $\|v(x)\|$ (when a=2) with an interpolation parameter t=a/2. The enriched light source system 102 also modifies the projected area of the source surface by substituting $l_R^2$ with $l_R^a$. The enriched light source system 102 can then modulate the distance attenuation from no attenuation (e.g., a distant source with a=0) to quadratic (e.g., physically plausible with a=2) through linear attenuation (a=1).

As described utilizing the algorithms above and in relation to FIGS. 4A-4C and 5, the enriched light source system 102 performs operations for generating an enriched light source based on a re-parameterization of an algebraic sphere. The operations allow the enriched light source system 102 to accurately model a continuous range of light source types using an enriched light source model. Accordingly, the acts and operations illustrated and described above in the algorithms and in relation to FIGS. 4A-4C and 5 can provide the corresponding acts (e.g., structure) for a step for determining a shape of a surface-centric representation of a three-dimensional surface and a set of emission parameters.

In one or more embodiments, the enriched light source system 102 also accounts for shadows cast by objects within a three-dimensional environment. For example, the enriched light source system 102 utilizes a stochastic shadows process described by Eric Heitz, Stephen Hill, and Morgan McGuire in "Combining analytic direct illumination and stochastic shadows," in Proceedings of the ACM SIGGRAPH Symposium on Interactive 3D Graphics and Games (2018), which is herein incorporated by reference in its entirety. For example, the stochastic shadows process renders a high-quality unshadowed image U and then a weighting image W computed with a stochastic ray-casting method. The weighting image W encodes the shadowing dependent on a bidirectional reflectance distribution function at each pixel of the unshadowed image. The enriched light source system 102 determines the image by computing two separate images using the importance-sampling process described above, which produces an unshadowed image $W_U$ and a shadowed image $W_S$ based on sampling budgets $(N_U, M_U)$ and $(N_S, M_S)$, respectively, in which $(N_U, M_U)$ is greater than $(N_S, M_S)$. The enriched light source system 102 computes the weighting image W as a ratio of $W_S/W_U$. Furthermore, in one or more embodiments, the enriched light source system 102 determines that the sampling budget for $W_S$ and $W_U$ is the same (e.g., due to using the same ray-tracing casts), but lower than a sampling budget for rendering the high-quality unshadowed image U.

As mentioned previously, in one or more embodiments, the enriched light source system 102 also provides a plurality of light source controls for controlling various properties of light sources. For example, the enriched light source system 102 provides light source controls that modify a position or lighting characteristic of a light source according to three-dimensional interaction primitives. Additionally, in some embodiments, the enriched light source system 102 provides light source controls that modify an enriched light source, as described previously. Specifically, FIGS. 9A-9I illustrate a plurality of light source controls for modifying a light source within a three-dimensional environment.

In one or more embodiments, the enriched light source system 102 provides light source controls by first generating a set of three-dimensional interaction primitives for controlling one or more parameters associated with a light source. For example, a three-dimensional interaction primitive includes a control metaphor for one or more parameters associated with a light source. In one or more embodiments, a three-dimensional interaction primitive modifies the particular parameter(s) in response to a modification to the three-dimensional interaction primitive. Accordingly, a particular light source control that modifies a plurality of parameters associated with a light source includes one or more three-dimensional interaction primitives. Furthermore, a set of three-dimensional interaction primitives includes one or more three-dimensional interaction primitives for one or more parameters controlled by a light control.

In one or more additional embodiments, the enriched light source system 102 provides a light source control by providing a visual representation of a three-dimensional interaction primitive for the light control. For example, a visual representation includes a graphical element within a graphical user interface representing the three-dimensional interaction primitive. In some embodiments, a visual representation includes a three-dimensional graphical element within a graphical user interface of a three-dimensional environment. Additionally, in some examples, a visual representation is an interactive graphical element that a user can manipulate via one or more device input methods such as a touch screen, a stylus input, or a mouse input.

For instance, a visual representation includes a visible, graphical element overlaid on top of, or inserted into, a digital three-dimensional environment. To illustrate, as described in more detail with respect to FIGS. 9A-9I, a light source control includes one or more elements for modifying a position and orientation of a light source within a three-dimensional environment, a size (e.g., surface area) or shape of a light source, or lighting properties (e.g., flux or emittance) of a light source. Thus, the enriched light source system 102 provides a visual representation for changing the corresponding parameters of the light source (e.g., via the corresponding three-dimensional interaction primitives).

Figure 9A:
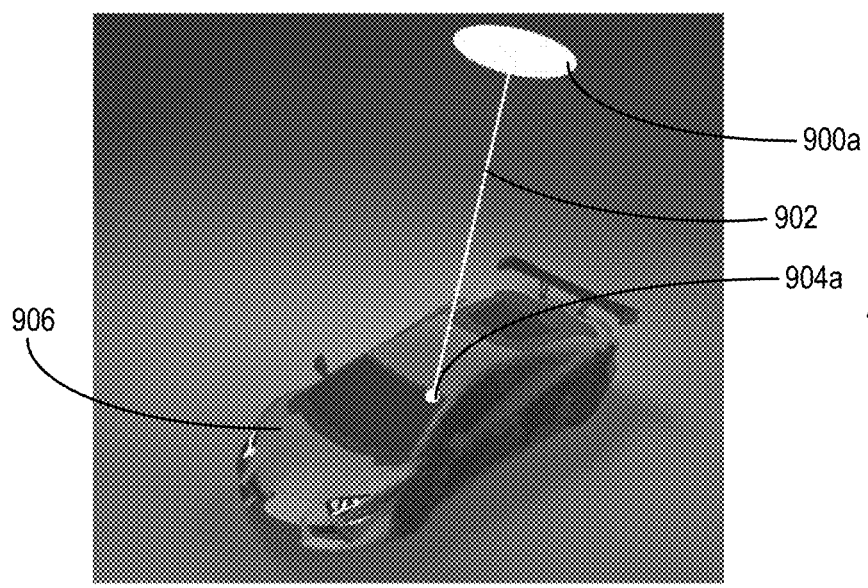
FIGS. 9A-9I illustrate diagrams of light source controls within three-dimensional environments in accordance with one or more implementations.

FIG. 9A illustrates a focus control to control a focus target for a light source 900a. In one or more embodiments, the enriched light source system 102 provides the focus control to orient the light source 900a toward a specific location. For example, the enriched light source system 102 generates a three-dimensional interaction primitive to control the direction of the light source within a three-dimensional environment. More specifically, the enriched light source system 102 generates the three-dimensional interaction primitive to modify a parameter associated with the orientation of the light source relative to a selected point.

In one or more embodiments, the enriched light source system 102 provides a visual representation for the three-dimensional interaction primitive of the focus control. To illustrate, the visual representation of FIG. 9A includes a focus vector 902 and a focus location 904a (also referred to as a "target point") within a three-dimensional environment. In one or more embodiments, the focus vector 902 and the focus location 904a form an interactive element movable within a graphical user interface via a user input. For instance, in response to a user input to change a direction of the focus vector 902 and a position of the focus location 904a, the enriched light source system 102 changes an orientation of the light source 900a. To illustrate, the enriched light source system 102 re-orients the light source 900a by rotating the light source 900a until a normal of a particular point on the surface of the light source 900a (e.g., a center point) is directed at the focus location 904a.

In one or more embodiments, the enriched light source system 102 determines the position of the focus location 904a by determining a point on a three-dimensional object 906 within the three-dimensional environment. For example, the enriched light source system 102 receives an input indicating the position of the focus location 904a. The enriched light source system 102 generates a ray originating from a view of the three-dimensional environment within a graphical user interface (e.g., from a camera view). The enriched light source system 102 then extracts a depth map of the three-dimensional environment (e.g., by leveraging a rendering phase) to determine object depths relative to the view of the three-dimensional environment.

The enriched light source system 102 then utilizes the depth map to determine a point that corresponds to the position of the focus location 904a on the three-dimensional object 906 closest to the view of the three-dimensional environment. For example, the enriched light source system 102 determines that the ray originating from the view of the three-dimensional environment intersects a geometry of the three-dimensional object 906. The enriched light source system 102 then selects the point at which the ray first intersects the geometry of the three-dimensional object 906 as the focus location 904a.

In one or more alternative embodiments, the ray originating from the view of the three-dimensional environment does not intersect with a three-dimensional object in the three-dimensional environment. For example, the enriched light source system 102 determines that the position of the focus location 904a is not on a surface of a three-dimensional object within the three-dimensional object. In one or more embodiments, the enriched light source system 102 then assumes that the focus location 904a is at the same distance from the light source 900a before and after moving the focus location 904a. Accordingly, the enriched light source system 102 orients the light source 900a toward the new position without directing the light source 900a at a three-dimensional object. To illustrate, the enriched light source system 102 selects the focus location 904a along a camera ray for which the distance to the light source 900a is the same before and after repositioning the focus location 904a (e.g., utilizing a ray-sphere intersection, when two such intersections exist, and selecting the intersection closest to the previous focus location).

In one or more alternative embodiments, the enriched light source system 102 selects a new position for the focus location 904a along the ray closest to the previous position of the focus location 904a (e.g., its orthogonal projection on the ray). In one or more additional embodiments, the enriched light source system 102 paints in image-space and the selecting, as the new position of the focus location 904a, a three-dimensional point (e.g., barycenter) located inside the convex hull of painted three-dimensional locations on three-dimensional objects.

Figure 9B:
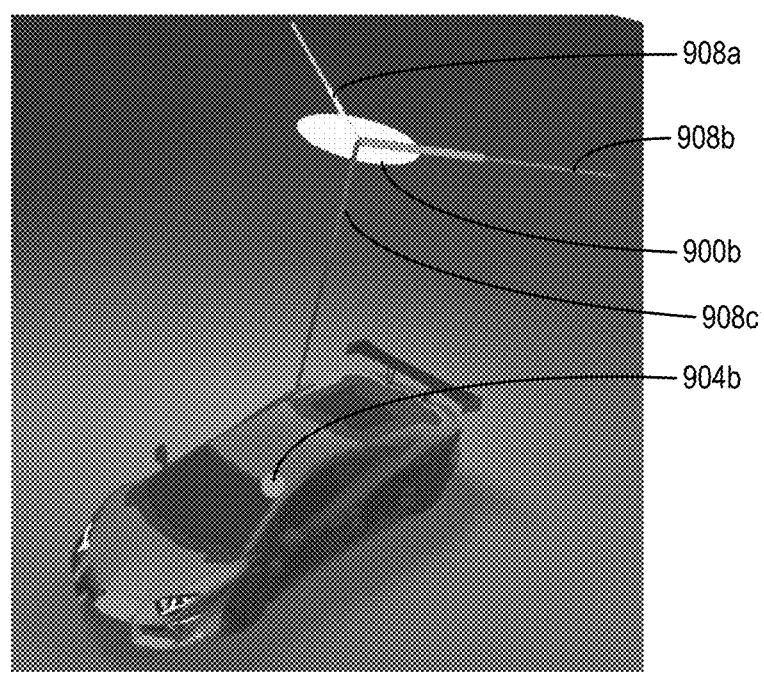

In addition to providing a focus control to change a focus location of a light source, the enriched light source system 102 also provides controls to maintain a focus location of a light source while moving the light source within the three-dimensional environment. For example, FIG. 9B illustrates a translation control for translating a light source 900b within a three-dimensional environment. In one or more embodiments, the enriched light source system 102 utilizes the translation control to translate the light source 900b along a plurality of orthogonal axes (e.g., a first axis 908a, a second axis 908b, and a third axis 908c). To illustrate, the enriched light source system 102 provides the translation control for translating the light source 900b along axes within a reference frame relative to the environment (e.g., global) or relative to the light source 900b (e.g., local). Thus, the translation axes change depending on the reference frame.

In one or more embodiments, the enriched light source system 102 generates three-dimensional interaction primitives corresponding to modifying the position of the light source 900b. For instance, the enriched light source system 102 generates a separate three-dimensional interaction primitive for modifying the position of the light source 900b in the direction of each axis. Additionally, in one or more embodiments, the enriched light source system 102 generates a three-dimensional interaction primitive corresponding to the orientation of the light source 900b.

Additionally, as shown in FIG. 9B, the enriched light source system 102 provides visual representations of the three-dimensional interaction primitives related to the axes. For instance, FIG. 9B illustrates the first axis 908a, the second axis 908b, and/or the third axis 908c within a graphical user interface. According to one or more embodiments, the enriched light source system 102 also displays a focus location 910 indicating a position within the three-dimensional environment at which the light source 900b is directed. Furthermore, if the translation control is configured to translate the light source 900b within the global reference frame, the enriched light source system 102 displays the axes within the graphical user interface along the global axes (e.g., x-axis, y-axis, z-axis). Alternatively, if the translation control is configured to translate the light source 900b within the local reference frame, the enriched light source system 102 displays the axes within the graphical user interface along axes relative to the light source 900b. For instance, the enriched light source system 102 displays the axes parallel to or orthogonal to a normal of a center point of the light source 900b in an initial position (e.g., the first axis 908a and the second axis 908b are orthogonal to the normal and the third axis 908c is parallel to the normal). Additionally, in one or more embodiments, the third axis 908c follows a path of a focus vector between the enriched light source 900b and a focus location 904b.

In one or more embodiments, the enriched light source system 102 also maintains the focus direction of the light source 900b to point the light source 900b at the focus location 910. For example, as the enriched light source system 102 translates the light source 900b, the enriched light source system 102 re-orients the light source 900b as the enriched light source system 102 translates the light source 900b along the axes. To illustrate, in response to translating the light source 900b along the first axis 908a, the enriched light source system 102 re-orients the light source 900b to be directed at the focus location 910. In some embodiments, the enriched light source system 102 configures a central portion of the translation control (e.g., the origin point) such that, in response to a hover action or drag action at the origin point, the enriched light source system 102 displays the focus location 910.

In further embodiments, the enriched light source system 102 provides an option to display the translation control at one of a plurality of locations. For instance, the enriched light source system 102 provides an option to display the translation control with an origin of the axes at 1) a surface position p, 2) a sphere center c, or 3) a spherical cap location (e.g., the center of the surface's bounding disk. To illustrate, the enriched light source system 102 computes the spherical cap location (or surface location) as:

$$p_{cap} = \begin{cases} p & \text{if flat } (\kappa, s) \\ p - \text{sign}(\kappa)(1 - \cos(\theta_L)) \cdot r \cdot n & \text{otherwise} \end{cases}$$

Figure 9C:
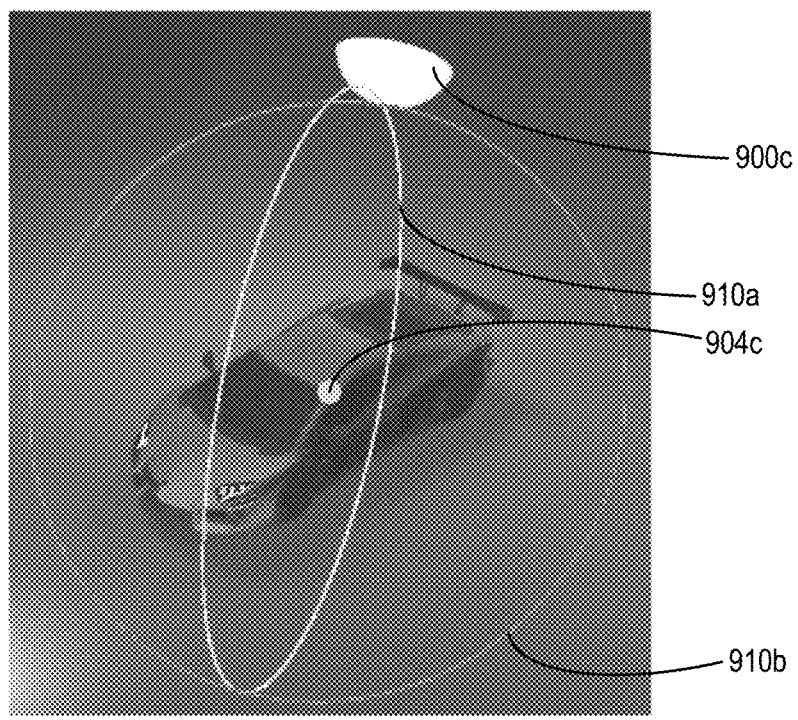

According to one or more embodiments, the enriched light source system 102 also provides controls for rotating a light source around a point within the three-dimensional environment. For example, FIG. 9C illustrates a first orbiter light control for utilizing a plurality of handles to rotate a light source 900c around a focus location. In another example, FIG. 9D illustrates a second orbiter light control for rotating a light source 900d along a stack of surfaces around a focus location.

As illustrated in FIG. 9C, the enriched light source system 102 provides an orbiter light control that includes a plurality of circular handles located around a focus location 904c at which the light source 900c is directed. Specifically, FIG. 9C illustrates a first handle 912a to modify a position of the light source 900c by orbiting the light source 900c horizontally within the three-dimensional environment relative to the focus location 904c. FIG. 9C also illustrates a second handle 912b to orbit tilt the light source 900c vertically within the three-dimensional environment relative to the focus location 904c.

Accordingly, the enriched light source system 102 generates three-dimensional interaction primitives corresponding to each rotation parameter (e.g., for rotating around a focus location) within the three-dimensional environment. For example, the enriched light source system 102 generates a first interaction primitive corresponding to a horizontal orbit direction and a second interaction primitive corresponding to a vertical orbit direction. The enriched light source system 102 also provides visual representations (e.g., the handles) of the three-dimensional interaction primitives corresponding to the orbital rotation of the light source 900c. By providing the orbital light control with handles that orbits the light source 900c horizontally or vertically around the focus location 904c, the enriched light source system 102 provides a continuous range of positions for the light source 900c along a sphere around the focus location 904c.

Figure 9D:
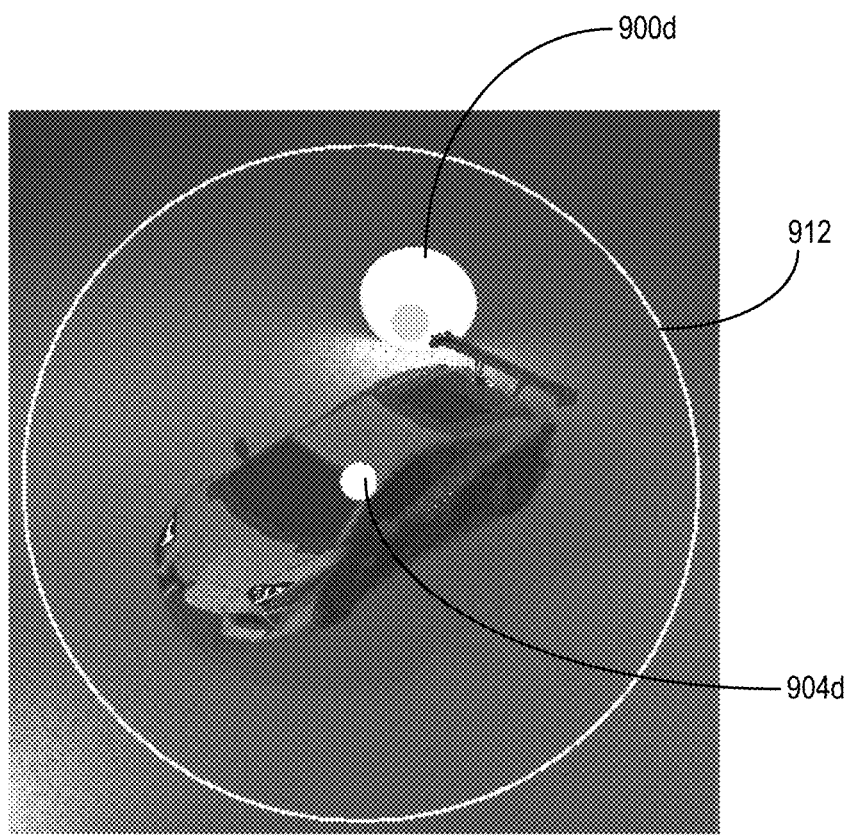

As mentioned, FIG. 9D illustrates that the enriched light source system 102 provides an orbiter light control including a stack of surfaces positioned around a focus location 904d. In one or more embodiments, the orbiter light control includes a sphere 912 (e.g., a transparent graphical element with a visible edge) positioned around the focus location 904. In particular, the enriched light source system 102 provides the sphere 912 as a continuous range of positions for the light source 900d around the focus location 904d. For example, the enriched light source system 102 determines the range of positions along a sphere (e.g., sphere 912) of radius equal to the current distance between the light source 900d and the focus location 904d. To illustrate, the enriched light source system 102 provides the orbital light control to move the light source 900d along a surface of the sphere 912 in response to an input to directly interact with the light source 900d and drag the light source 900d around the focus location 904d.

For example, the sphere 912 includes a first spherical cap and a second spherical cap (e.g., a first spherical cap with all normal pointing outside the sphere and facing the light source 900d and a second spherical cap with all normal pointing outside the sphere and back-facing the light source 900d) that make up the sphere 912. More specifically, the sphere 912 includes the first spherical cap in front of the second spherical cap relative to a view of the graphical user interface. Accordingly, in one or more embodiments, the first spherical cap and the second spherical cap are complementary spherical caps (e.g., caps with opposite directions and a sum of half-angles equal to pi) of the sphere 912 (e.g., the second spherical cap is a complementary spherical cap completely behind the first spherical cap relative to the view of the graphical user interface).

In one or more embodiments, the enriched light source system 102 determines a position of the light source 900d on the surface of the sphere 912 by first predefining a stack of surfaces using a contour computation process. The enriched light source system 102 also determines where in the stacked surfaces the position of the light source 900d transitions from one surface to the other (e.g., the edges of the surfaces). The enriched light source system 102 then determines when to maintain a position of the light source 900d on one surface (e.g., the first spherical cap) or from one surface to another (e.g., from the first spherical cap to the second spherical cap).

For example, the enriched light source system 102 determines that when a user input selecting and dragging the light source 900d across the surface of the sphere 912 stays within a containing surface of one of the spherical caps, the enriched light source system 102 keeps the position of the light source 900d on the surface of the corresponding spherical cap. In one or more embodiments, in response to determining that the user input exits the contour of the surface of the corresponding spherical cap, the enriched light source system 102 moves the light source 900d to the surface of the other spherical cap. For example, if a cursor for the user input leaves the boundary of the sphere 912 while dragging the light source 900d along the surface of the first spherical surface, the enriched light source system 102) stops moving the light source 900d and retains the light source 900b on the last identified contour position, and 2) switches the position of the light source 900d to the surface of the second spherical cap. The enriched light source system 102 then moves the position of the light source 900d along the surface of the second light source in response to determining that the user input re-enters the contour and starts moving within the contour surface of the second spherical cap. Thus, the enriched light source system 102 provides an accurate and efficient way to move a light source within a three-dimensional environment across two complementary spherical cap (e.g., a front spherical cap and a back spherical cap) of a sphere without requiring the user to change the view of the graphical user interface (e.g., by changing a camera position) and without discontinuity in the interaction.

As illustrated in FIGS. 9A-9D above, a light source can include a plurality of interaction primitives for modifying one or more size, shape, position, or direction parameters of the light source. In one or more embodiments, the enriched light source system 102 provides the interaction primitives as visible indicators within a graphical user interface. For example, the interaction points provide a surface point, a bounding disk center point, or a sphere center point that allows a user to "grab" the light source at a point of the corresponding interaction primitive within the graphical user interface. In response to an input to interact with an interaction primitive the enriched light source system 102 determines a position of the input to determine how to display a plurality of interface elements associated with the interaction. For instance, the enriched light source system 102 displays a focus vector (e.g., focus vector 902), a set of axes (e.g., axes 908a-908c), or handles (e.g., handles 910a-910b) for modifying parameter(s) of the light source with respect to the input position.

Additionally, with respect to the light source 900a in FIG. 9A, in response to a modification of the focus location 904a, the enriched light source system 102 modifies the focus vector 902 to maintain a currently grabbed position (e.g., based on the interaction input) corresponding to the light source 900a. The enriched light source system 102 then updates the direction of the light source 900a accordingly. With respect to the light source 900b of FIG. 9B (or the light sources 900c, 900d of FIGS. 9C and 9D), in response to an interaction to grab and move along an axis, the enriched light source system 102 translates the grabbed position. The enriched light source system 102 then translates the position (e.g., a surface position) of the light source 900b and re-orients the light source 900b accordingly. By thus updating the visual display based on the position of the interaction input, the enriched light source system 102 intuitively updates the grabbed position with the interaction inputs in existing software implementations. For instance, the enriched light source system 102 generally translates/rotates/scales spherical lights from a sphere center position, while translating/rotating/scaling disk or polygonal lights from a surface center position.

Figure 9E:
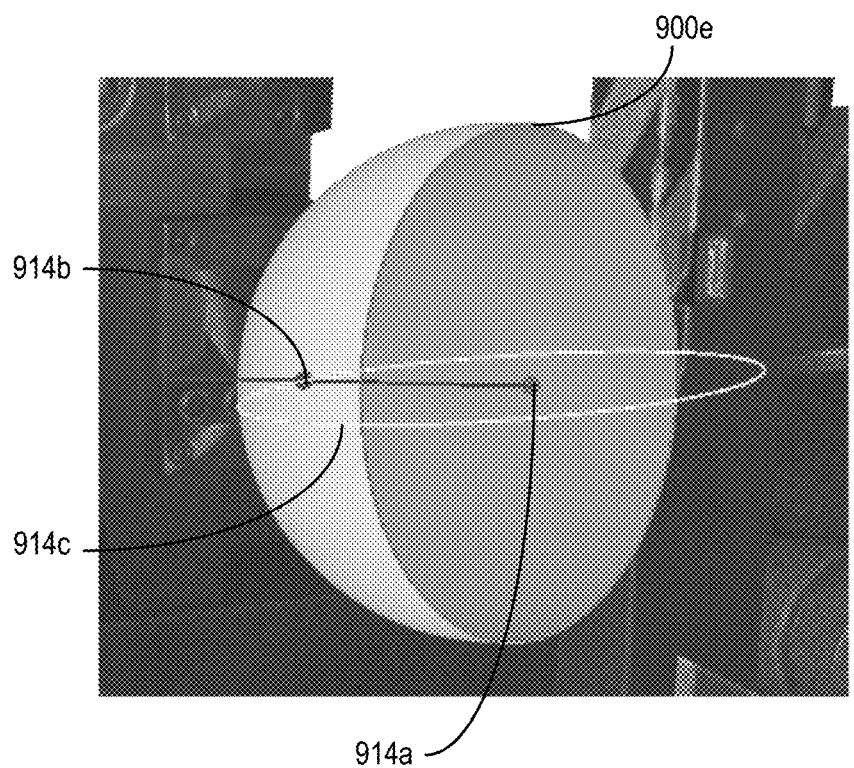

FIG. 9E illustrates that the enriched light source system 102 also provides a shape control to modify a shape of a light source 900e. In particular, FIG. 9E illustrates that the shape control provides controls to modify an enriched light source based on a surface-centric representation of an algebraic sphere. For example, the enriched light source system 102 generates a plurality of three-dimensional interaction primitives corresponding to the modifiable parameters of the light source 900e, in which the parameters are based on the surface-centric representation previously described. The enriched light source system 102 also provides visual representations of the interaction primitives including lines and/or points corresponding to the different interaction primitives (e.g., a graphical element based on the type of interaction for modifying a corresponding parameter of the light source 900e). For example, the enriched light source system 102 provides controls for changing a position of the light source 900e, a curvature of the light source 900e, and/or a surface area of the light source 900e in separate user interactions with the controls.

In one or more embodiments, the enriched light source system 102 provides a first shape element 914a for modifying a curvature and/or surface area of the light source 900e. For instance, in response to a user input to modify a position of the first shape element 914a, the enriched light source system 102 changes the curvature and the surface area of a spherical cap representing the light source 900e. To illustrate, the enriched light source system 102 modifies a shape of the spherical cap corresponding to a visible surface area of the light source 900e to maintain the same bounding disk radius of the spherical cap without translating a spherical cap center point corresponding to a second shape element 914b (e.g., without translating the light source 900e to a new position).

According to one or more alternative embodiments, the enriched light source system 102 provides the first shape element 914a (or an additional shape element) for modifying a three-dimensional position of the light source 900e (e.g., a center point of a sphere, spherical cap, plane, or point). The enriched light source system 102 thus determines a three-dimensional coordinate in a three-dimensional space corresponding to a position of the light source 900e based on a user interaction with the first shape element 914a. For example, the enriched light source system 102 translates the light source 900e within the three-dimensional environment in response to a user input interacting with (e.g., selecting) and moving the first shape element 914a within the three-dimensional environment without changing the surface area or curvature of the light source 900e.

In addition to modifying the position of the light source 900e, the enriched light source system 102 also provides the second shape element 914b for modifying a surface point on the surface (e.g., a center point of the surface) of the light source 900e. In one or more embodiments, modifying the position of the surface point on the surface of the light source 900e translates the surface point relative to a sphere center (e.g., a center point corresponding to the light source 900e). Accordingly, changing the position of the surface point modifies the curvature and the surface area of the light source 900e to maintain the bounding disk of the spherical cap without changing the position of the spherical cap center point. Thus, the second shape element 914b modifies a distance between the surface center point and the spherical cap center point to change the curvature and surface area of the light source 900e.

In one or more embodiments, the enriched light source system 102 also allows the second shape element 914b to reverse a direction of the spherical cap. For instance, in response to a user input moving a position of the second shape element 914b to the other side of a spherical cap center, the enriched light source system 102 changes the light source 900e from a spherical cap light source type to a parabolic light source type by changing the sign of the surface curvature. Additionally, when the surface center point and the spherical cap center point are at the same position (or within a threshold value), the enriched light source system 102 sets the curvature to zero to change the shape of the light source 900e to a plane light source type.

Furthermore, in one or more embodiments, the enriched light source system 102 provides a third shape element 914c (e.g., a bounding disk) to modify a radius of the light source 900e. For example, the third shape element 914c includes a bounding ring that determines a radius of the underlying sphere that the enriched light source system 102 uses to generate the light source 900e. In one or more embodiments, the enriched light source system 102 utilizes a size of the bounding ring to increase or decrease the radius of the light source 900e by directly updating the surface curvature factor of the surface-centric representation from which the enriched light source system 102 generates the light source 900e.

Additionally, in one or more embodiments, during an interaction with the third shape element 914c, the enriched light source system 102 displays a current center position of a bounding sphere for the light source 900e. In response to an interaction to grab the third shape element 914c, for example, the enriched light source system 102 changes the sphere radius of the bounding sphere while maintaining the current sphere center position and a ratio between the sphere surface area and the source surface area. Specifically, the enriched light source system 102 translates the source position (e.g., to or away from the sphere center) and then modifies the surface curvature factor according to the translation amount (e.g., from the new sphere radius) and the current source surface area (e.g., from the former ratio of surface areas). In one or more alternative embodiments, the enriched light source system 102 maintains the current surface position while virtually moving the sphere center position without translating the source surface position (e.g., a center point of the surface).

Furthermore, in one or more embodiments, each of the shape elements for the shape control jointly modify one or more parameters of the light source 900e. Specifically, the enriched light source system 102 determines a shape of the light source 900e based on the position, the orientation, the surface curvature factor, and the boundaries (on the support sphere) of the light source 900e. For instance, modifying the first shape element 914a, the second shape element 914b, and the third shape element 914c modifies a surface curvature factor of the light source 900e. Additionally, the enriched light source system 102 modifies a surface area of the light source 900e in response to an interaction with any of the shape elements. Accordingly, in some embodiments, the enriched light source system 102 modifies a surface curvature factor, a surface area, and/or a surface center point (or spherical cap center point) of the light source 900e based on an interaction with one or more of the shape elements of the shape control.

In one or more embodiments, the enriched light source system 102 determines a spherical cap depth $d_{cap}=\|p-p_{cap}\|$ and width $w_{cap}$ (the bounding disk radius) as $$(d_{cap}, w_{cap}) = \begin{cases} (0, \rho) & \text{if flat}(\kappa, s) \\ r(1-\cos(\theta_L)), \sin(\theta_L)) & \text{otherwise} \end{cases}$$

Furthermore, the enriched light source system 102 can recompute the sphere radius as:

$$r = \frac{d_{cap}^2 + w_{cap}^2}{2d_{cap}}$$

The enriched light source system 102 then updates the surface curvature factor κ to account for a potential change of sign(κ), and the source area as $s=2\pi \cdot r \cdot d_{cap}$. When $d_{cap}$ is under a threshold $\in$, the enriched light source system 102 sets the κ=0 and $s=\pi \cdot w_{cap}^2$. In one or more embodiments, the enriched light source system 102 sets the threshold at $\in=10^{-5}$, though other embodiments may utilize other threshold values above or below the previous value.

In one or more embodiments, the enriched light source system 102 also updates a surface location p on the light source 900e in response to an input to modify one or more of the shape elements. For example, the enriched light source system 102 updates the surface location as $p=p_{cap}+\text{sign}(\kappa) \cdot d_{cap} \cdot n$.

According to one or more embodiments, the enriched light source system 102 modifies the sphere radius based on an interaction with the third shape element 914c. Specifically, the enriched light source system 102 directly updates the surface curvature factor by computing a new surface area and location as $$s' = s \cdot \left(\frac{r'}{r}\right)^2$$

and $p'=p+\text{sign}(\kappa) \cdot (r'-r) \cdot n$, in which r and r' represent the sphere radius before and after updating, respectively.

Figure 9F:
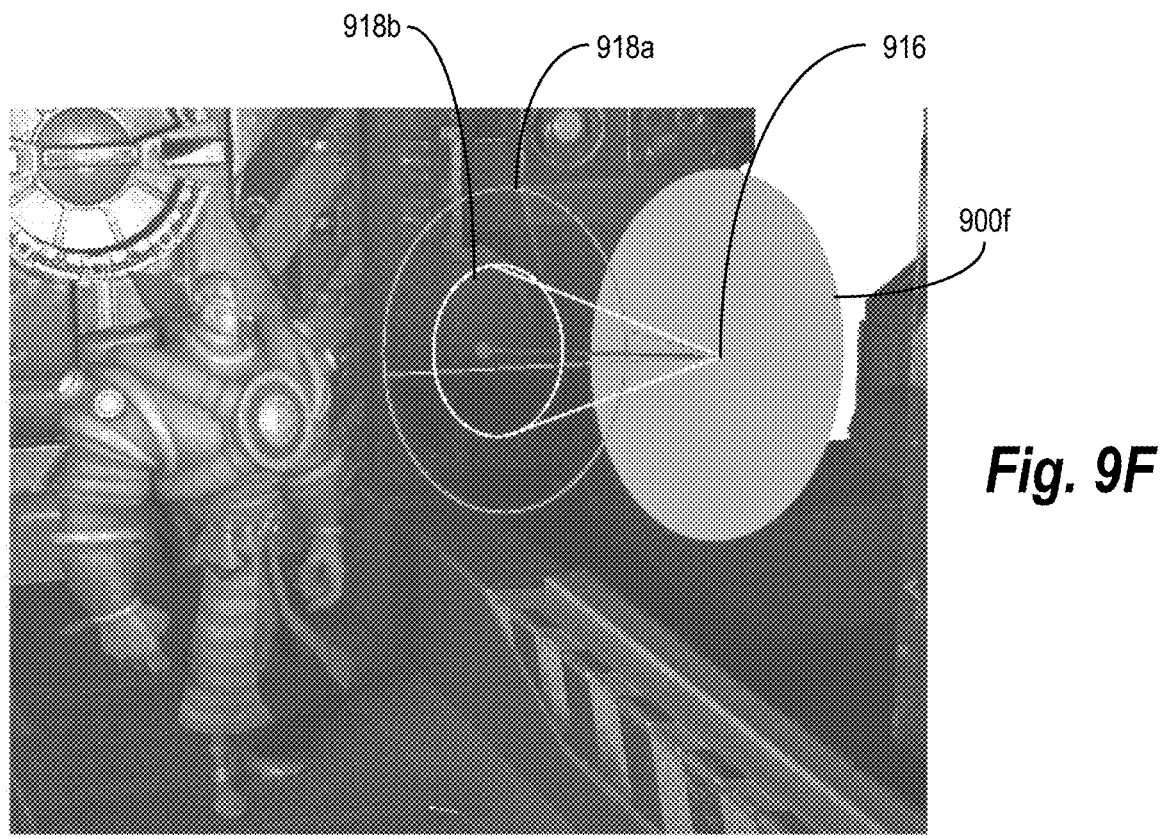
Figure 9G:
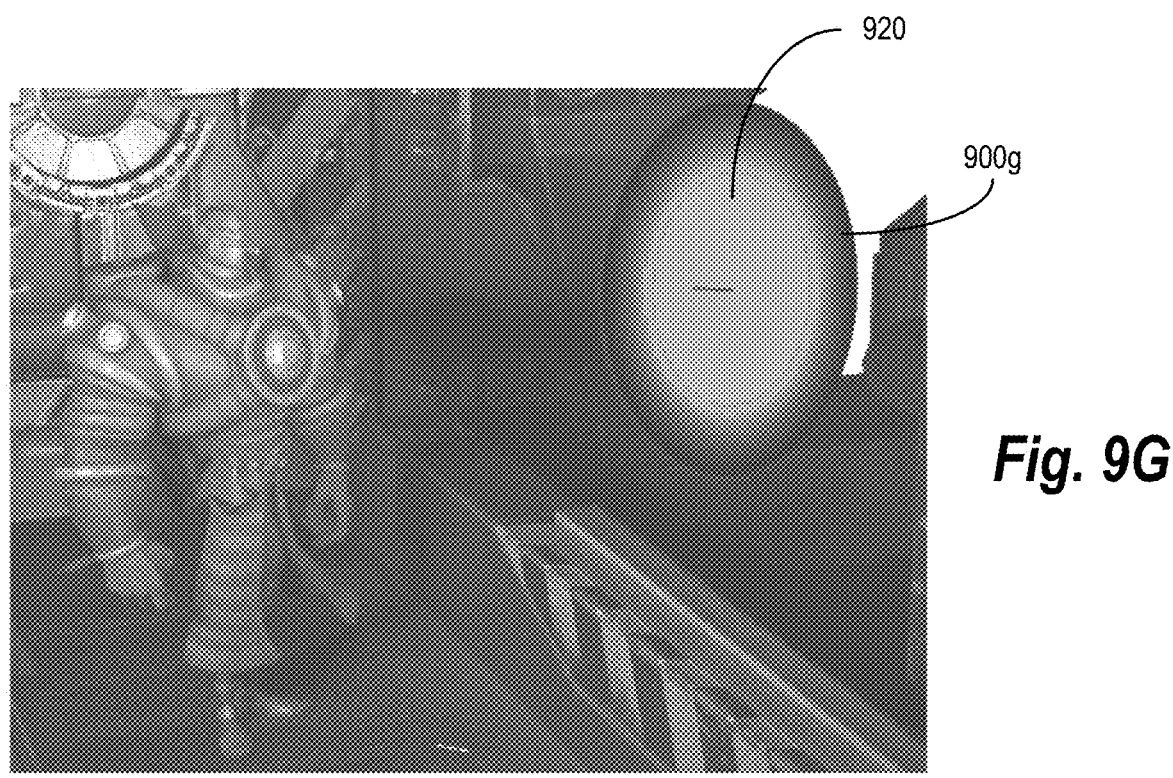

FIGS. 9F-9G illustrate that the enriched light source system 102 provides controls for modifying lighting parameters of light sources. For example, the controls for modifying the lighting parameters modify one or more emittance properties of the light sources. Specifically, FIG. 9F illustrates an emittance cone control to modify a surface emittance distribution from a point on the surface of a light source 900f. Furthermore, FIG. 9G illustrates a warm point control to modify a core emittance distribution of light across a surface of a light source 900g.

FIG. 9F illustrates that the enriched light source system 102 provides a plurality of graphical user interface elements for modifying a surface emittance at a surface location 916 of the light source 900f. In one or more embodiments, the enriched light source system 102 provides a first emittance element 918a and a second emittance element 918b with which a user can interact via a graphical user interface. For example, the first emittance element 918a directly modifies an outer emittance cone associated with a surface emittance (e.g., a re-distribution from the surface location 916 of a core emittance). To illustrate, modifying the first emittance element 916a causes the enriched light source system 102 modify the angle of emission of light emitted from the surface location 916.

Additionally, the second emittance element 918b directly modifies an inner emittance cone associated with the surface emittance. For example, in response to an input to modify a radius of the second emittance element 918b, the enriched light source system 102 increases or decreases a radius of the inner emittance cone. More specifically, modifying the inner emittance cone changes a radial falloff function associated with the surface emittance (e.g., by modifying an edge size $\xi_r$ in the radial falloff function).

Furthermore, modifying the first emittance element 918a indirectly modifies the inner emittance cone because the inner emittance cone has a radius at most as large as the outer emittance cone. In one or more embodiments, when modifying the outer emittance cone, the enriched light source system 102 modifies the inner emittance cone based on a reduction of the radius of the inner emittance cone by an amount of reduction of the radius of the outer emittance cone (e.g., a one-to-one ratio). In alternative embodiments, the enriched light source system 102 modifies the inner emittance cone to maintain a constant ratio between the radius of the outer emittance cone and the radius of the inner emittance cone.

To modify the emittance cone(s) associated with a surface emittance from the surface location 916, in one or more embodiments, the enriched light source system 102 determines a radius $d_h$ of a hemisphere centered at the surface location 916. In response to a user input to drag the first emittance element 918a or the second emittance element 918b (or in some instances a radius $r_h$ presented as a dot), the enriched light source system 102 modifies the positions of the corresponding disks along an intersection of the emittance cone(s) with the hemisphere. Accordingly, the distance of the corresponding disks from the surface location 916 is constant based on the respective intersections with the hemisphere by modifying (e.g., widening or narrowing) the angle of the surface emittance cone $\lambda_L$.

FIG. 9G illustrates that the enriched light source system 102 provides a warm point disk 920 for defining a warm point of the light source 900g. Specifically, in response to an interaction with the warm point disk 920, the enriched light source system 102 changes a radial falloff function associated with the core emittance of the light source 900g. For example, in response to a user interaction dragging the warm point disk 920 inward toward a center of the light source 900g, the enriched light source system 102 modifies the radial falloff function to reduce an area of a region corresponding to the warm point disk 920 on the surface for which all points have the maximum core emittance (i.e., all such points have an equal core emittance).

In one or more embodiments, the enriched light source system 102 generates three-dimensional interaction primitives for controlling: 1) an angle $\lambda_c^{in}$ (and, accordingly, a radius $\rho^{in}$) to define the warmer region (e.g., based on the maximum core emittance), and 2) a maximum distance $d_w^{max}$ from the surface of a sphere centered at c with radius $r_w = r + d_w^{max} \cdot e^{-r}$. For example, a user interacts with the warm point disk 920, which represents a visual representation of an edge of a spherical cap on the sphere. By utilizing the sphere to modify the warm point, the enriched light source system 102 provides easier manipulations when the radius of the sphere is small (e.g., the absolute value of the surface curvature factor is high). Conversely, if the light source 900g is a plane, the enriched light source system 102 positions the warm point disk 920 at a distance of 0 from the surface.

According to one or more embodiments, the enriched light source system 102 defines the warm point disk 920 with its center $p_w$ and radius $h_w$:

$$p_w = \begin{cases} p & \text{if flat}(\kappa, s) \\ c + r_w \cdot \cos(\lambda_c^{in}) \cdot \text{sign}(\kappa)n & \text{otherwise} \end{cases}$$

and $$h_w = \begin{cases} \rho^{in} & \text{if flat}(\kappa, s) \\ r_w \text{sign}(\lambda_c^{in}) & \text{otherwise} \end{cases}$$

Thus, in response to detecting a change in position of the warm point disk 920, the enriched light source system 102 utilizes the new position to determine a new value for the angle $(\lambda_c^{in})'$ (and respectively $(p^{in})'$). Additionally, the enriched light source system 102 updates $\eta_c$ as:

$$\eta_c' = 1 - \begin{cases} [(\rho^{in})'/\rho]^2 & \text{if flat}(\kappa, s) \\ (\lambda_c^{in})'/\lambda_c & \text{otherwise} \end{cases}$$

Figure 9H:
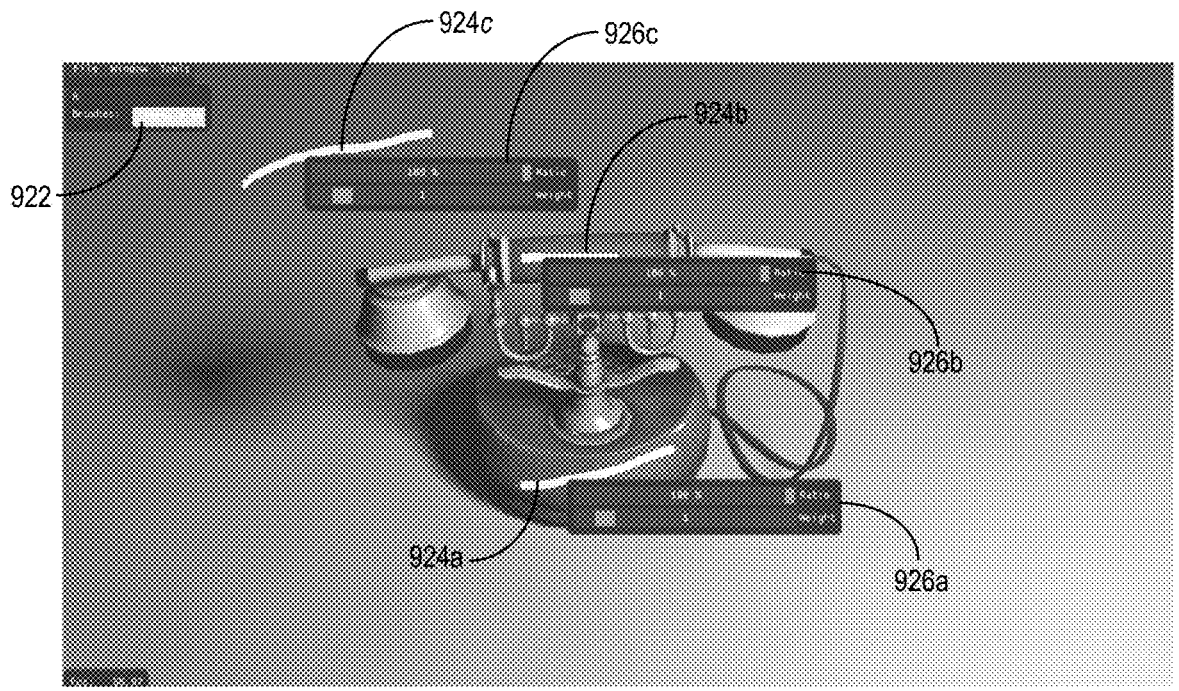
Figure 9I:
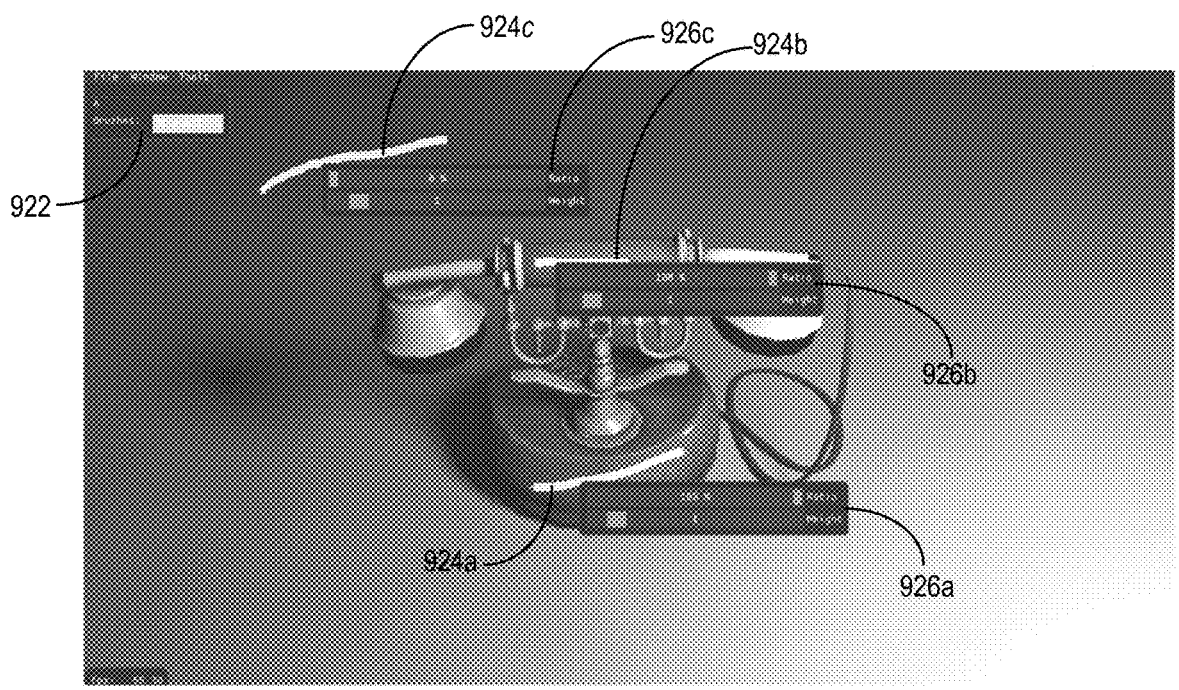

In one or more additional embodiments, the enriched light source system 102 provides controls for jointly modifying a flux and an attenuation of a light source. FIGS. 9H-9I illustrate graphical user interfaces including a flux-attenuation light control to modify the flux and attenuation of a light source within a three-dimensional environment. For example, FIG. 9H illustrates initial attenuation parameters for the light source. FIG. 9I illustrates modified attenuation parameters for the light source based on manually selected attenuation settings.

As mentioned, FIG. 9H illustrates initial attenuation parameters for the light source. For instance, the enriched light source system 102 provides a brushstroke control 922 for inserting one or more brushstrokes within a graphical user interface. In one or more embodiments, the enriched light source system 102 receives an input to insert one or more brushstrokes at one or more positions within the graphical user interface. To illustrate, FIG. 9H illustrates a first brushstroke 924a, a second brushstroke 924b, and a third brushstroke 924c within the graphical user interface based on a user input to draw the brushstrokes. As shown, the brushstrokes correspond to positions corresponding to one or more three-dimensional objects or other locations within the three-dimensional environment.

Based on one or more positions of one or more brushstrokes within the graphical user interface, the enriched light source system 102 also provides one or more attenuation controls for manually adjusting a flux attenuation associated with the light source. For example, the enriched light source system 102 modifies the light contribution (as a percentage of the initial contribution) at positions within the three-dimensional corresponding to the one or more positions of the one or more brushstrokes. To illustrate, the enriched light source system 102 displays a first attenuation control 926a corresponding to the first brushstroke 924a, a second attenuation control 926b corresponding to the second brushstroke 924b, and a light contribution control 926c corresponding to the third brushstroke 924c. In one or more embodiments, the enriched light source system 102 displays the attenuation controls near the positions of the corresponding brushstrokes within the graphical user interface.

Additionally, in one or more embodiments, the enriched light source system 102 determines how to modify the flux ($\phi$) and attenuation ($\alpha$) of a light source based on one or more specified contribution changes. Specifically, the enriched light source system 102 modifies the flux attenuation of the light source while keeping the overall lighting style of the light source (e.g., based on target geometries and light source shape) by concurrently optimizing light parameters controlling the radiant flux and the lighting attenuation over distance. For instance, as illustrated in FIG. 9H, the enriched light source system 102 provides options to modify a location weight and a target-initial lightness ratio associated with the received lighting contribution from the controlled enriched light source at each brushstroke position.

FIG. 9I illustrates updated parameter values in the light contribution control 926c corresponding to the third brushstroke 924c. In particular, FIG. 9I illustrates a modified ratio and weight for the light contribution control 926c. The enriched light source system 102 utilizes the updated parameters to determine new illumination parameters for the light source illuminating the three-dimensional environment.

In one or more embodiments, the enriched light source system 102 determines target geometries corresponding to the brushstroke positions within the three-dimensional environment. In one or more additional embodiments, the enriched light source system 102 utilizes distance information associated with the target geometries in connection with the attenuation settings to modify the light parameters of the light source. To illustrate, the enriched light source system 102 utilizes the distance information to sample the light source at scene locations corresponding to the target geometries. The enriched light source system 102 utilizes the user-specified values for the location weight and target-initial lightness ratio to modify illumination parameters of the light source to most closely match the target illumination properties of the three-dimensional environment based on the attenuation controls.

For instance, the enriched light source system 102 utilizes the user-specified parameters to solve a set of equations derived from a direct illumination equation $Y[L'_o(x_k, \omega_0)] = \lambda_k \sim Y[L_o(x_k, \omega_0)]$ at a number of scene locations $x_k$, with $L_o$ and $L'_o$ representing the radiance obtained with the initial and target flux ($\Phi$, $\alpha$) and ($\Phi'$, $\alpha'$), respectively. Additionally, Y[rgb] returns the lightness of color rgb, and each $\lambda_k$ is the user specified factor representing the target-initial lightness ratio.

In one or more embodiments, the enriched light source system 102 also samples the light source by utilizing a two-dimensional non-linear optimization problem:

$$\underset{\Phi',a'}{\operatorname{argmin}} \frac{1}{\sum w_k} \sum_k w_k \left( \lambda_k \sum_i \frac{L_{k,i}}{l_{k,i}^a} - \frac{\Phi'}{\Phi} \sum_i \frac{L_{k,i}}{l_{k,i}^{a'}} \right)^2$$

in which $L_{k,i}$ represents a constant portion in a contribution of a light point $p_i$ to the shading of scene location $x_k$ and $l_{k,i}$ is the distance between both points. Furthermore, $w_k$ represents the user-specified location weight for each selected scene location.

Additionally, in one or more embodiments, the enriched light source system 102 continually matches the target-initial lightness ratios $\lambda_k$ based on the user inputs. The enriched light source system 102 then precomputes all $L_{k,i}$ as scalar weights $L_{k,i}=Y[\chi \cdot f(x_k, \omega_0, \omega_1)]\hat{e}_c(p_i)\hat{e}_s(p_i)\langle n_i, -\omega_i \rangle$. In one or more embodiments, by sampling the light source utilizing the previously described sampling process, the enriched light source system 102 groups all points $p_i$ sampled on the same ring (e.g., for which $l_{k,i}$ and $\hat{e}_s(p_i)$ are shared). The enriched light source system 102 also computes $L_{k,i}$ as the mean value along the ring in response to an assumption that i is the index of a ring instead of a light point. Accordingly, the enriched light source system 102 reduces the cost of evaluating the fitness function without significantly degrading the estimate of its value.

In one or more embodiments, the enriched light source system 102 optimizes a non-linear fitness function by first using a particle-swarm optimization algorithm to search the parameter space. Specifically, the search process is based on the iterative evolution of a swarm of independent particles collaborating to select a solution. In some embodiments, the enriched light source system 102 casts the search into a GPU-accelerated search using a compute unified device architecture ("CUDA"). For example, in a first stage, the enriched light source system 102 allocates one thread group k to each scene location $x_k$, in which a single thread i computes the value $L_{k,i}$ onto a sampled light ring. In a second stage, the enriched light source system 102 allocates one CUDA thread to each particle to handle the evaluation of a single fitness value at each iteration with minimal synchronization between iterations. Accordingly, the enriched light source system 102 finds reasonable solutions to the optimization problem to dynamically determine scene locations $x_k$ based on brushstrokes inserted into the graphical user interface (or brushstrokes painted onto a geometry) and provide real-time feedback based on the user-selected parameters.

In addition to modifying a light source via a plurality of light source controls, as described above, in one or more embodiments, the enriched light source system 102 also provides intelligent flux adaptation while modifying a light source. For example, the enriched light source system 102 enforces a mean emittance per unit surface and per unit solid angle while modifying the light source. To illustrate, the enriched light source system 102 re-scales the flux as:

$$\Phi' = \Phi \left[ \frac{E_c'}{\sigma'}, \frac{\sigma}{E_c} \right] \left[ \frac{E_s'}{E_s} \right]$$

in which the prime values of each variable stand for values taken after manipulation. Additionally, $E_c$ and $E_s$ represent the integrated (non-normalized) emittance distribution functions, and $\sigma$ is the surface of the light source. Furthermore, the enriched light source system 102 utilizes properties of an enriched light source to determine the surface of the light source as:

$$\sigma = \begin{cases} s & \text{if flat}(\kappa, s) \\ 2\pi(1 - \cos(\lambda_c)) & \text{otherwise} \end{cases}$$

As illustrated, for a non-flat enriched light source, the enriched light source system 102 determines the core emittance distribution on the unit sphere.

Furthermore, as provided above, the enriched light source system 102 enforces the mean core emittance (e.g., over the surface of the light source) while also enforcing the mean surface emittance (e.g., inside the emittance cone). Thus, the enriched light source system 102 can provide rescaling to both emittance parameters (i.e., core emittance or surface emittance), one emittance parameter, or neither emittance parameter.

As shown by FIGS. 9A-9I, the enriched light source system 102 improves the ease-of-use of light sources within a digital three-dimensional environment. In particular, the enriched light source system 102 provides a set of dedicated, interactive controllers based on three-dimensional interaction primitives for controlling a range of properties of light sources. By providing a plurality of controllers with three-dimensional visual representations for modifying parameters of a light source (e.g., enriched light source or conventional light source), the enriched light source system 102 provides a consistent light customization experience for a number of different light controls and light source types.

Figure 10:
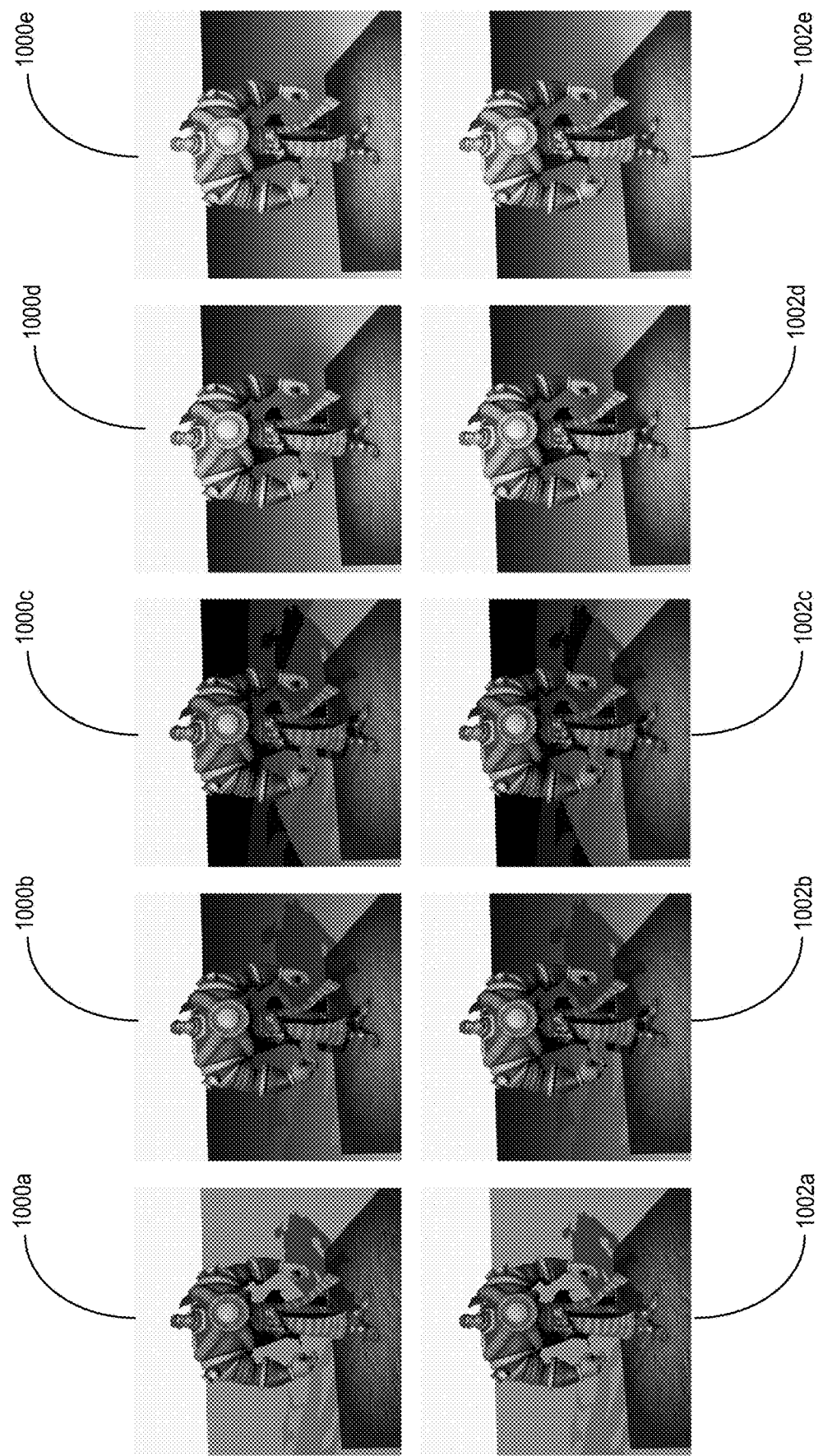
FIG. 10 illustrates diagrams of comparisons of light sources in a plurality of three-dimensional scenes in accordance with one or more implementations.

FIG. 10 illustrates a plurality of rendered images of a three-dimensional environment including different light sources. Specifically, a top row of rendered images of FIG. 10 corresponds to a set of ground-truth lighting models. Furthermore, a bottom row of rendered images of FIG. 10 corresponds to a set of enriched light source models. More specifically, the enriched light source system 102 generated a plurality of enriched light sources to simulate conventional light sources. More specifically, the enriched light sources where generated using the shading algorithms and control primitives described above within the NVidia Optix path tracing framework for GPUs, in C++ and using Nvidia Cuda.

FIG. 10 illustrates a first ground-truth image 1000a including a directional light source and a first modified image 1002a including an enriched light source model with parameters corresponding to a directional light source. In one or more embodiments, the enriched light source system 102 generates an enriched light source including a plane light source type (e.g., a disk with κ=0) and a surface area calculated from the radius of the scene's bounding sphere and a narrow emittance cone ($\lambda_s \leq 0.25°$ and an attenuation a=0). Furthermore, the enriched light source system 102 matches the exitant radiance $L_e$ of a directional light with a radiant flux equal to its integral over the disk surface such that $\Phi_e = s \cdot L_e$.

FIG. 10 also illustrates a second ground-truth image 1000b including a point light source and a second modified image 1002b including an enriched light source model with parameters corresponding to a point light source. Specifically, the enriched light source system 102 generates the enriched light source to have a small radius (e.g., κ=0.99) and a narrow emission cone (e.g., $\lambda_s = 1°$). Additionally, the enriched light source system 102 shifts the position p of the enriched light source by −rn. Furthermore, in one or more embodiments, the enriched light source system 102 generates the enriched light source to include a source surface area covering a sphere ($s=4\pi r^2$). The enriched light source system 102 also matches the intensity $\mathcal{J}$ of a point light (measured in W/sr) by using a radiant flux (measured in W) corresponding to the integration of $\mathcal{J}$ over a unit sphere $\Phi_e=4\pi\cdot\mathcal{J}$.

FIG. 10 further illustrates a third ground-truth image 1000c including a spotlight light source and a third modified image 1002c including an enriched light source model with parameters corresponding to a spotlight light source. To illustrate, the enriched light source system 102 generates an enriched light source with a small surface area (e.g., $s=10^{-3}$) and a non-normalized surface emittance distribution to match the spotlight's radial falloff function. The enriched light source system 102 also utilizes a small surface curvature factor (e.g., $\kappa=10^{-4}$) to create a flat shape, which prevents emitted light rays from diverging from the cone of directions. The enriched light source system 102 then matches the intensity $\mathcal{J} \cdot e_s(\theta_s)$ of the spotlight light source in any given direction by using a radiant flux equal to the integration of this value over the cone of directions: $\Phi_e=\int_0^{\lambda_s} 2\pi \cdot \mathcal{J} \cdot e_s(\theta_s)d\theta_s = \mathcal{J} \cdot E_s$.

FIG. 10 also illustrates a fourth ground-truth image 1000d including a disk area light source and a fourth modified image 1002d including an enriched light source model with parameters corresponding to a disk area light source. More specifically, the enriched light source system 102 generates an enriched light source by uniformly distributing the surface emittance in a hemisphere of directions (e.g., $\lambda_s=\pi/2$ and $\eta_s=0$). The enriched light source system 102 generates the enriched light source for the disk area light source with a surface area s and a zero surface curvature factor (i.e., $\kappa=0$).

Additionally, FIG. 10 illustrates a fifth ground-truth image 1000e including a sphere area light source and a fourth modified image 1002e including an enriched light source model with parameters corresponding to a sphere area light source. For instance, the enriched light source system 102 generates an enriched light source by uniformly distributing the surface emittance in a hemisphere of directions (e.g., $\lambda_s=\lambda/2$ and $\eta_s=0$). The enriched light source system 102 generates the enriched light source for the sphere area light source with a surface curvature factor that matches the sphere light radius r and with a size $s=4\pi r^2$.

For both the disk area light source and the sphere area light source, the enriched light source system 102 matches an area light $L_e$ with a radiant flux equal to the integration of the emitted irradiance (emitted flux per unit area) over the disk surface. Accordingly, the irradiance is the result of integrating the exitant radiance over a hemisphere. Thus, $\Phi_e=s(2\pi \cdot L_e)$.

The table below illustrates several comparison values between the conventional light sources in the ground-truth images and the enriched light sources. Specifically, the enriched light source system 102 evaluates the quality of shading in terms of the root mean square deviation ("RMSE"), the structural similarity ("SSIM"), and the peak signal-to-noise ratio ("PSNR").

|  | Directional Light | Point Light | Spotlight | Disk Area Light | Sphere Area Light |
| --- | --- | --- | --- | --- | --- |
| RMSE | 0.001 | 0.002 | 0.004 | 0.007 | 0.004 |
| SSIM | 1.000 | 0.999 | 0.999 | 0.998 | 0.998 |
| PSNR | 58.3 | 52.1 | 48.7 | 41.3 | 47.3 |

Figure 11:
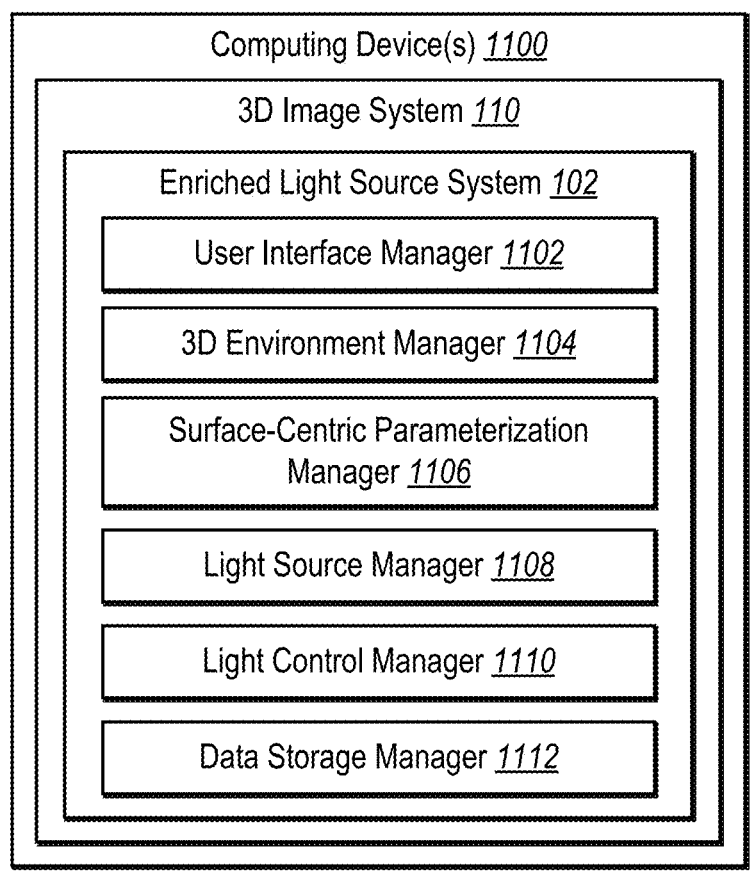
FIG. 11 illustrates an example architecture of the enriched light source system of FIG. 1 in accordance with one or more implementations.

FIG. 11 illustrates a detailed schematic diagram of an embodiment of the enriched light source system 102 described above. As shown, the enriched light source system 102 is implemented in the 3D image system 110 on computing device(s) 1100 (e.g., a client device and/or server device as described in FIG. 1, and as further described below in relation to FIG. 14). Additionally, in one or more embodiments, the enriched light source system 102 includes, but is not limited to, a user interface manager 1102, a 3D environment manager 1104, a surface-centric parameterization manager 1106, a light source manager 1108, a light control manager 1110, and a data storage manager 1112. The enriched light source system 102 can be implemented on any number of computing devices. For example, in some embodiments, the enriched light source system 102 is implemented in a distributed system of server devices for managing three-dimensional environments. In additional embodiments, the enriched light source system 102 is implemented within one or more additional systems. In alternative embodiments, the enriched light source system 102 is implemented on a single computing device such as a single client device.

In one or more embodiments, each of the components of the enriched light source system 102 is in communication with other components using any suitable communication technologies. Additionally, in some embodiments, the components of the enriched light source system 102 are in communication with one or other devices including other computing devices of a user, server devices (e.g., cloud storage devices), licensing servers, or other devices/systems. It will be recognized that although the components of the enriched light source system 102 are shown to be separate in FIG. 11, in one or more embodiments, one or more of the subcomponents are combined into fewer components, such as into a single component, or divided into more components as may serve a particular implementation. Furthermore, although the components of FIG. 11 are described in connection with the enriched light source system 102, in alternative embodiments, at least some of the components for performing operations in conjunction with the enriched light source system 102 described herein are implemented on other devices within the environment.

The components of the enriched light source system 102 can include software, hardware, or both. For example, in one or more embodiments, the components of the enriched light source system 102 include one or more instructions stored on a computer-readable storage medium and executable by processors of one or more computing devices (e.g., the computing device(s) 1100). When executed by the one or more processors, the computer-executable instructions of the enriched light source system 102 cause the computing device(s) 1100 to perform the operations described herein. Alternatively, the components of the enriched light source system 102 include hardware, such as a special purpose processing device to perform a certain function or group of functions. Additionally, or alternatively, the components of the enriched light source system 102 include a combination of computer-executable instructions and hardware.

Furthermore, the components of the enriched light source system 102 performing the functions described herein with respect to the enriched light source system 102 may, for example, be implemented as part of a stand-alone application, as a module of an application, as a plug-in for applications, as a library function or functions that may be called by other applications, and/or as a cloud-computing model. Thus, the components of the enriched light source system 102 may be implemented as part of a stand-alone application on a personal computing device or a mobile device. In some embodiments, the components of the enriched light source system 102 are implemented in an application that provides three-dimensional image editing, including, but not limited to ADOBE DIMENSION, SUBSTANCE PAINTER, SUBSTANCE DESIGNER, SUBSTANCE ALCHEMIST, MEDIUM, "ADOBE," "ADOBE DIMENSION," are either registered trademarks or trademarks of Adobe Inc. in the United States and/or other countries.

FIG. 11 illustrates that the enriched light source system 102 includes a user interface manager 1102 to manage a graphical user interface in a three-dimensional image editing application. For example, the user interface manager 1102 displays a three-dimensional environment including one or more three-dimensional objects and/or enriched light sources. Additionally, the user interface manager 1102 provides tools for interacting with the three-dimensional environment. The user interface manager 1102 also receives user inputs interacting with the three-dimensional environment based on the provided tools.

Additionally, FIG. 11 illustrates that the enriched light source system 102 includes a 3D environment manager 1104. For example, the 3D environment manager 1104 manages objects within a three-dimensional environment. To illustrate, the 3D environment manager 1104 manages object information of a three-dimensional object including vertex information and material properties. The 3D environment manager 1104 also manages information for light sources within a three-dimensional environment. For instance, the 3D environment manager 1104 manages lighting parameters, size/shape information, and position information of an enriched light source.

FIG. 11 further illustrates that the enriched light source system 102 includes a surface-centric parameterization manager 1106. Specifically, the surface-centric parameterization manager 1106 utilizes input parameters to determine a surface-centric representation according to a re-parameterization of an algebraic sphere. For example, the surface-centric parameterization manager 1106 determines a surface centric representation based on a three-dimensional surface point, a three-dimensional direction, and a surface curvature factor. The surface-centric parameterization manager 1106 also determines a light source type to which a surface-centric representation corresponds based on the input parameters.

FIG. 11 illustrates that the enriched light source system 102 includes a light source manager 1108. For example, the light source manager 1108 generates an enriched light source based on a surface-centric representation determined by the surface-centric parameterization manager 1106. To illustrate, the light source manager 1108 generates an enriched light source from a shape of the surface-centric representation and a set of emission parameters based on the input parameters corresponding to the surface-centric representation.

In one or more embodiments, the light source manager 1108 also manages rendering of a three-dimensional environment according to light provided by an enriched light source. For instance, the light source manager 1108 samples light from an enriched light source by utilizing an importance-sampling method. Thus, the light source manager 1108 renders light directed onto a shaded point by an enriched light source by sampling points along rings of a cone of direction from the shaded point that intersect with a surface of the enriched light source.

Additionally, FIG. 11 illustrates that the enriched light source system 102 includes a light control manager 1110. The light control manager 1110 provides a plurality of light source controls for modifying a position, orientation, and/or shape of a light source. Specifically, the light control manager 1110 provides light controls that can be used for modifying enriched light sources or other types of light sources. To illustrate, the light control manager 1110 generates three-dimensional interaction primitives for light controls and then provides visual representations within a graphical user interface (e.g., via the user interface manager 1102) for modifying parameters of light sources.

The enriched light source system 102 also includes a data storage manager 1112 (that comprises a non-transitory computer memory/one or more memory devices) that stores and maintains data associated with three-dimensional environments. For example, the data storage manager 1112 stores three-dimensional object data and light source data. Additionally, the data storage manager 1112 can store information related to rendering three-dimensional scenes such as a rendered image based on sampling light onto one or more three-dimensional objects from an enriched light source.

Figure 12:
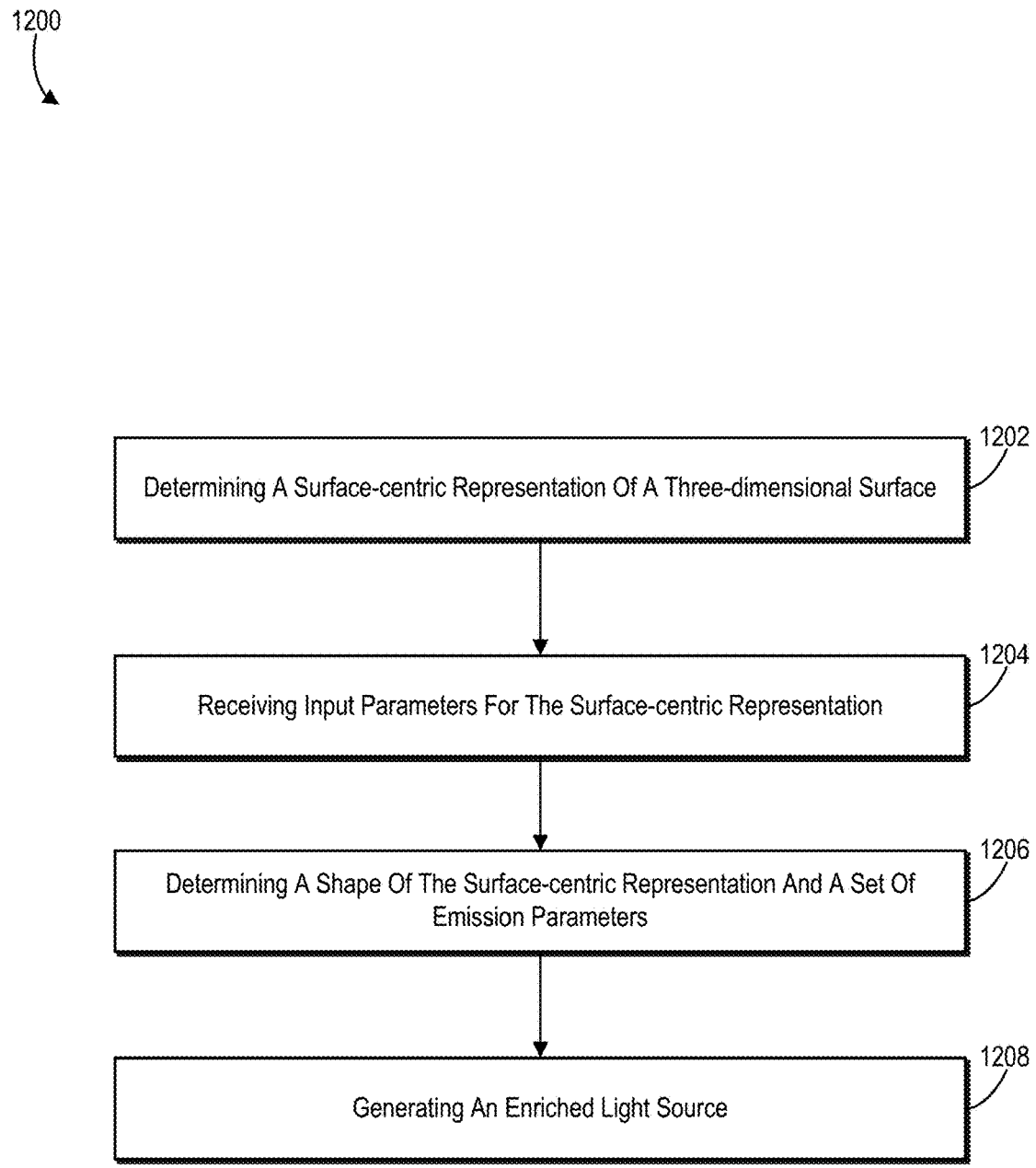
FIG. 12 illustrates a flowchart of a series of acts for generating enriched light sources based on surface-centric representations in accordance with one or more implementations.

Turning now to FIG. 12, this figure shows a flowchart of a series of acts 1200 of generating enriched light sources based on surface-centric representations. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As shown, the series of acts 1200 includes an act 1202 of determining a surface-centric representation of a three-dimensional surface. For example, act 1202 involves determining a surface-centric representation of a three-dimensional surface based on a re-parameterization of an algebraic sphere. Act 1202 can involve combining geometric properties of the three-dimensional surface with algebraic properties of the algebraic sphere into the surface-centric representation. To illustrate, act 1202 can involve determining the surface-centric representation as a representation capable of being modeled as a sphere, a spherical cap, a plane, or a point.

Additionally, the series of acts 1200 includes an act 1204 of receiving input parameters for the surface-centric representation. For example, act 1204 can involve receiving the plurality of input parameters for the surface-centric representation by receiving a first parameter indicating a three-dimensional surface position of the surface-centric representation, a second parameter indicating a three-dimensional direction of the surface-centric representation, a third parameter indicating a surface curvature factor of the surface-centric representation, and a fourth parameter indicating boundaries of a surface of the surface-centric representation. In one or more embodiments, act 1204 involves one or more parameters indicating a surface area of the surface-centric representation corresponding to a spherical cap when a surface curvature factor is non-zero or a bounding disk when the surface curvature factor is zero.

The series of acts 1200 also includes an act 1206 of determining a shape of the surface-centric representation and a set of emission parameters. For example, act 1206 involves determining, based on the plurality of input parameters and the re-parameterization of the algebraic sphere, a shape of the surface-centric representation and a set of emission parameters.

Act 1206 can involve determining, utilizing the plurality of input parameters, a plurality of algebraic coefficients corresponding to the algebraic sphere. Act 1206 can then involve determining the shape of the surface-centric representation based on the plurality of algebraic coefficients. Furthermore, act 1206 can involve determining the shape of the surface-centric representation by selecting, based on an input parameter indicating a surface curvature factor, a shape type of the surface-centric representation from a plurality of shape types.

Additionally, act 1206 can involve selecting, in response to comparing the surface curvature factor to a plurality of curvature threshold values, a shape type of the surface-centric representation from a plurality of shape types. For example, act 1206 can involve selecting the shape type of the surface-centric representation as a point in response to determining that the surface curvature factor is equal to a first curvature threshold value, selecting the shape type of the surface-centric representation as a plane in response to determining that the surface curvature factor is equal to a second curvature threshold value, or selecting the shape type of the surface-centric representation as a non-degenerate sphere in response to determining that the surface curvature factor does not meet the first curvature threshold value or the second curvature threshold value. Accordingly, act 1206 can involve generating a point light source in response to selecting the shape type as a point, generating a plane light source in response to selecting the shape type as a plane, or generating a spherical light source in response to selecting the shape type as a non-degenerate sphere.

Additionally, act 1206 can involve determining, based on the input parameters, a core emittance corresponding to a distribution of flux over a surface of the surface-centric representation. Act 1206 can then involve determining, based on the input parameters, a surface emittance corresponding to a redistribution of the core emittance within an emittance cone at a surface point. For example, act 1206 can involve determining, based on the input parameters, a curvature and a surface area of the surface-centric representation. Act 1206 can then involve determining, based on the curvature and the surface area, a distribution of flux across a surface of the surface-centric representation and a redistribution of the flux from a surface point on the surface of the surface-centric representation.

Furthermore, the series of acts 1200 includes an act 1208 of generating an enriched light source. For example, act 1208 involves generating, within the three-dimensional environment, an enriched light source comprising the set of emission parameters and a geometric structure corresponding to the shape of the surface-centric representation. Act 1208 can involve determining a light source category corresponding to the shape type of the surface-centric representation. For example, act 1208 can involve determining that the shape type of the surface-centric representation corresponds to a spherical light source, a plane light source, or a point light source. Act 1208 can then involve generating the enriched light source comprising light source properties corresponding to the light source category.

The series of acts 1200 can also include sampling a plurality of rings in cones of direction from the point of the three-dimensional object that intersect a surface of the enriched light source. The series of acts 1200 can then include sampling points along the plurality of rings to determine, based on the core emittance and the surface emittance, a total emittance contributed to the point of the three-dimensional object by the enriched light source. Additionally, the series of acts 1200 can include determining a number of rings and points per ring to sample based on a sampling budget set based on a user input.

The series of acts 1200 can also include determining a sampling budget for sampling light from the enriched light source onto the point. The series of acts 1200 can include determining a cone of direction from the point of the three-dimensional object towards the enriched light source. Additionally, the series of acts 1200 can include sampling a ring from the cone of direction that intersects a surface of the enriched light source. The series of acts 1200 can then include sampling, based on the sampling budget, a plurality of points along the ring to determine an emittance corresponding to the ring.

The series of acts 1200 can further include receiving updated input parameters corresponding to the geometric properties and the algebraic properties of the surface-centric representation. The series of acts 1200 can also include updating, utilizing the updated input parameters, the algebraic coefficients of the algebraic sphere. The series of acts 1200 can then include determining an updated shape of the surface-centric representation in response to updating the plurality of algebraic coefficients.

Figure 13:
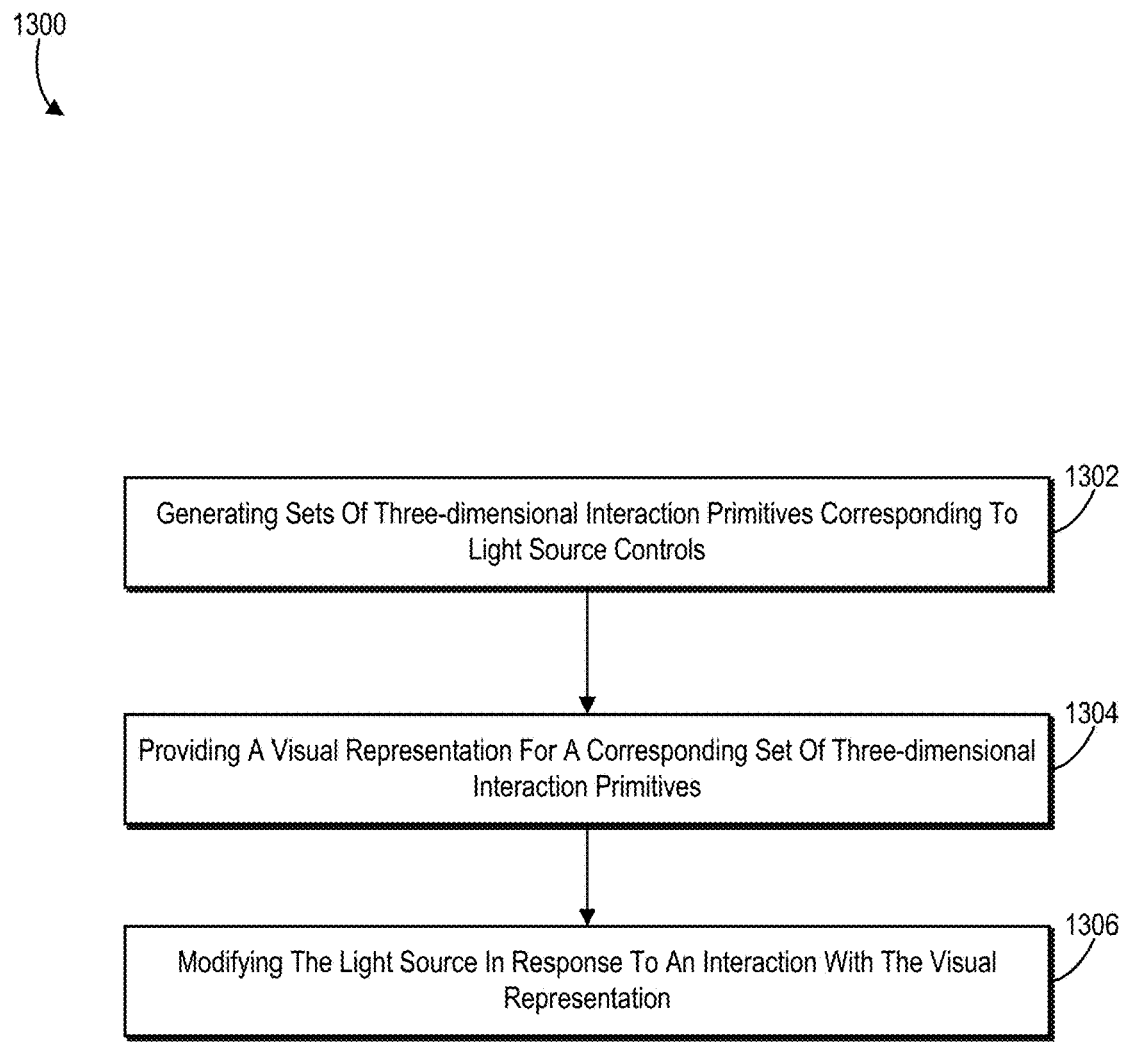
FIG. 13 illustrates a flowchart of a series of acts for modifying light sources with light source controls based on three-dimensional interaction primitives in accordance with one or more implementations.

Turning now to FIG. 13, this figure shows a flowchart of a series of acts 1300 of generating interactive light source controls for modifying parameters of light sources. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13.

As shown, the series of acts 1300 includes an act 1302 of generating sets of three-dimensional interaction primitives corresponding to light source controls. For example, act 1302 involves generating, for a light source within a digital three-dimensional environment, a plurality of sets of three-dimensional interaction primitives corresponding to a plurality of light source controls.

The series of acts 1300 also includes an act 1304 of providing a visual representation for a corresponding set of three-dimensional interaction primitives. For example, act 1304 involves providing, within a graphical user interface in response to a selection of a light source control from the plurality of light source controls, a visual representation for a corresponding set of three-dimensional interaction primitives from the plurality of sets of three-dimensional interaction primitives.

Act 1304 can provide a plurality of different controls for modifying a plurality of different parameters. Act 1304 can involve providing a selectable point indicating a direction vector from a camera in the digital three-dimensional environment. Act 1304 can involve providing translation light source controller comprising a plurality of translation axes. Act 1304 can involve providing a plurality of circular handles centered around a target point at which the light source is directed. Act 1304 can involve providing a plurality of interactive controls associated with a surface-centric representation of the light source. Act 1304 can involve providing an emittance control for modifying an emittance of the light source. Act 1304 can involve providing a brushstroke control for establishing local illumination settings within the three-dimensional environment.

Additionally, the series of acts 1300 includes an act 1306 of modifying the light source in response to an interaction with the visual representation. For example, act 1306 involves modifying, in response to an interaction with the visual representation, the light source within the digital three-dimensional environment by adjusting one or more parameters of the light source associated with the corresponding set of three-dimensional interaction primitives.

Act 1306 can involve determining a change in a position or a shape of the visual representation within the digital three-dimensional environment. Act 1306 can then involve modifying a parameter of the light source based on the change in the position or the shape of the visual representation.

In one or more embodiments, act 1306 involves determining a target point on a surface of a three-dimensional object within the three-dimensional environment indicating a lighting direction of the enriched light source. Act 1306 can also involve determining a change in position of the enriched light source within the three-dimensional environment from a first position to a second position. Act 1306 can then involve orienting the enriched light source at the second position to direct the light source at the target point.

For example, act 1306 can involve detecting, in response to an interaction with the selectable point and utilizing a depth map for the digital three-dimensional environment, a target point within the digital three-dimensional environment corresponding to the direction vector. Act 1306 can then involve orienting the light source to direct the light source at the target point.

Act 1306 can involve translating, in response to an interaction with a translation axis of the plurality of translation axes, the light source along the translation axis in a direction of the interaction from a first position to a second position. Act 1306 can also involve orienting, at the second position, the light source to direct the light source at a previous target point at which the light source was directed at the first position. Specifically, act 1306 can involve orienting, at the second position, the light source while maintaining a direction in which the light source is pointing at a target point within the three-dimensional environment.

Act 1306 can involve rotating, in response to an interaction with a circular handle of the plurality of circular handles, a position of the light source in a direction of the interaction with the circular handle. Act 1306 can then involve orienting the light source to direct the light source at the target point.

Act 1306 can also involve moving, in response to detecting an interaction with an orbital position control within a contour of a first spherical cap, a position of the light source along a containing surface of the first spherical cap. Specifically, the orbiter position control can be around a target point at which the light source is directed, wherein the orbital position control corresponds to a continuous range of positions along a sphere around the target point. Act 1306 can then involve switching, in response to detecting an interaction with the orbital position control outside of the contour of the first spherical cap, the position of the light source to a containing surface of a complementary spherical cap behind the first spherical cap relative to a view of the graphical user interface.

Additionally, act 1306 can involve adjusting, in response to an interaction with an interactive control of the plurality of interactive controls, a shape of the light source according to algebraic properties and geometric properties of the surface-centric representation. For example, act 1306 can involve modifying a surface curvature factor of the surface-centric representation. Act 1306 can further involve modifying a surface point on the surface of the surface-centric representation.

Act 1306 can involve adjusting, in response to an interaction with the emittance control, a shape or an emittance distribution of an emittance cone of the light source. For instance, act 1306 can involve adjusting a core emittance of the light source or a surface emittance of the light source corresponding to a redistribution of the core emittance of the light source.

In one or more embodiments, the series of acts 1300 includes determining, in response to a user input, a lighting constraint associated with a portion of the three-dimensional environment. The series of acts 1300 then includes adjusting, based on the lighting constraint associated with the portion of the three-dimensional environment, one or more illumination parameters of the enriched light source.

For example, act 1306 can further involve adjusting, based on one or more brushstrokes inserted into the graphical user interface presenting the three-dimensional environment, one or more illumination parameters of the light source according to one or more constraints associated with the one or more brushstrokes. For instance, act 1306 can involve modifying an attenuation of light flux associated with the light source. To illustrate, act 1306 can involve detecting a first brushstroke inserted into the graphical user interface, wherein the first brushstroke is associated with a first constraint for a first portion of the digital three-dimensional environment. Act 1306 can also involve detecting a second brushstroke inserted into the graphical user interface, wherein the second brushstroke is associated with a second constraint for a second portion of the digital three-dimensional environment. Act 1306 can then involve adjusting one or more illumination parameters of the light source based on the first constraint and the second constraint.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
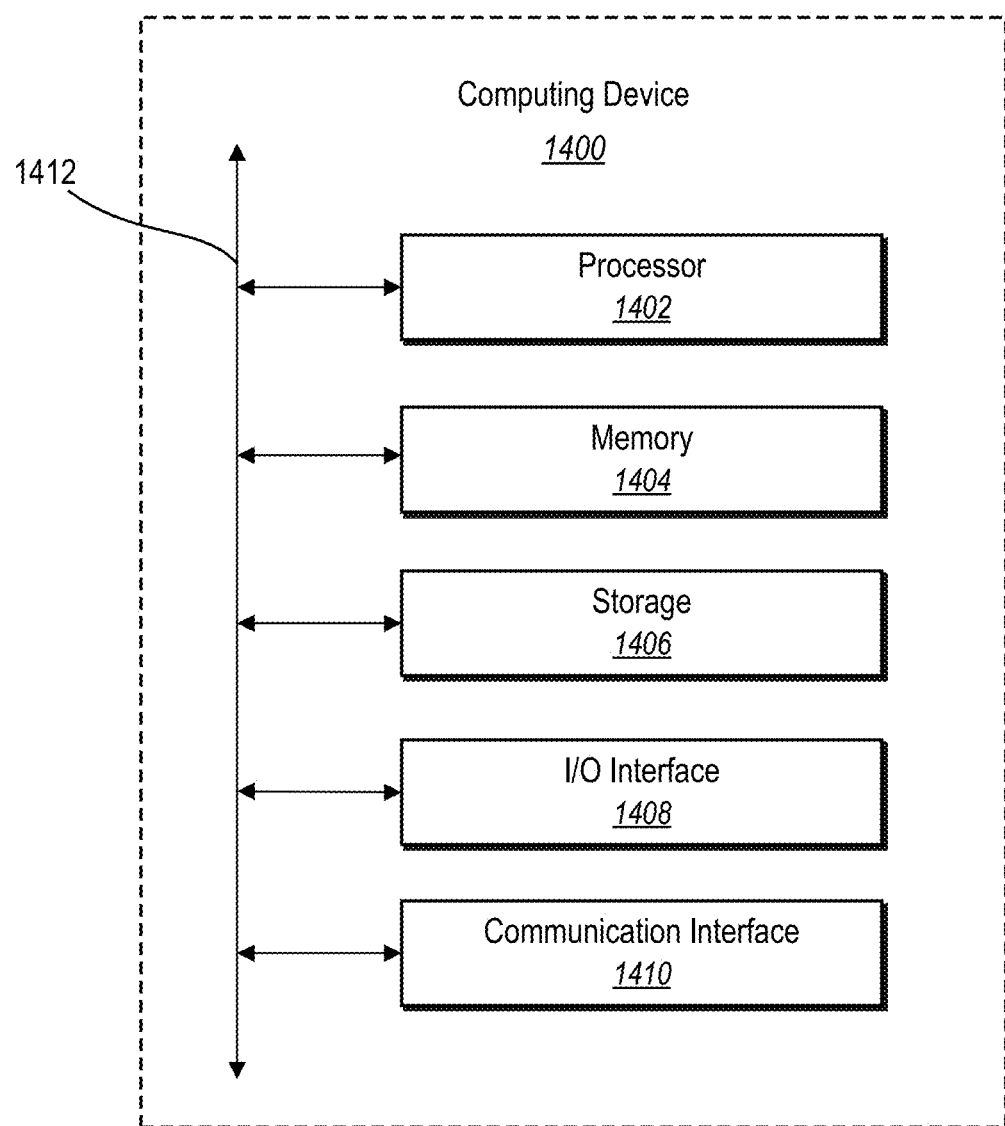
FIG. 14 illustrates a block diagram of an exemplary computing device in accordance with one or more embodiments.

FIG. 14 illustrates a block diagram of exemplary computing device 1400 that may be configured to perform one or more of the processes described above. One will appreciate that one or more computing devices such as the computing device 1400 may implement the system(s) of FIG. 1. As shown by FIG. 14, the computing device 1400 can comprise a processor 1402, a memory 1404, a storage device 1406, an I/O interface 1408, and a communication interface 1410, which may be communicatively coupled by way of a communication infrastructure 1412. In certain embodiments, the computing device 1400 can include fewer or more components than those shown in FIG. 14. Components of the computing device 1400 shown in FIG. 14 will now be described in additional detail.

In one or more embodiments, the processor 1402 includes hardware for executing instructions, such as those making up a computer program. As an example, and not by way of limitation, to execute instructions for dynamically modifying workflows, the processor 1402 may retrieve (or fetch) the instructions from an internal register, an internal cache, the memory 1404, or the storage device 1406 and decode and execute them. The memory 1404 may be a volatile or non-volatile memory used for storing data, metadata, and programs for execution by the processor(s). The storage device 1406 includes storage, such as a hard disk, flash disk drive, or other digital storage device, for storing data or instructions for performing the methods described herein.

The I/O interface 1408 allows a user to provide input to, receive output from, and otherwise transfer data to and receive data from computing device 1400. The I/O interface 1408 may include a mouse, a keypad or a keyboard, a touch screen, a camera, an optical scanner, network interface, modem, other known I/O devices or a combination of such I/O interfaces. The I/O interface 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1408 is configured to provide graphical data to a display for presentation to a user. The graphical data may be representative of one or more graphical user interfaces and/or any other graphical content as may serve a particular implementation.

The communication interface 1410 can include hardware, software, or both. In any event, the communication interface 1410 can provide one or more interfaces for communication (such as, for example, packet-based communication) between the computing device 1400 and one or more other computing devices or networks. As an example, and not by way of limitation, the communication interface 1410 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1410 may facilitate communications with various types of wired or wireless networks. The communication interface 1410 may also facilitate communications using various communication protocols. The communication infrastructure 1412 may also include hardware, software, or both that couples components of the computing device 1400 to each other. For example, the communication interface 1410 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by a processing device, cause the processing device to perform operations comprising:
   determining a surface-centric representation of a three-dimensional surface based on a re-parameterization of an algebraic sphere;
   receiving a plurality of input parameters for the surface-centric representation;
   determining, based on the plurality of input parameters and the re-parameterization of the algebraic sphere, a shape of the surface-centric representation and a set of emission parameters by selecting, based on an input parameter indicating a surface curvature factor, a shape type of the surface-centric representation from a plurality of shape types; and
   generating, within a three-dimensional environment, an enriched light source comprising the set of emission parameters and a geometric structure corresponding to the shape of the surface-centric representation.

2. The non-transitory computer readable storage medium as recited in claim 1, wherein receiving the plurality of input parameters comprises receiving a three-dimensional surface position, a three-dimensional direction, the surface curvature factor, and boundaries of the three-dimensional surface.

3. The non-transitory computer readable storage medium as recited in claim 1, wherein determining the shape of the surface-centric representation comprises:
   determining, utilizing the plurality of input parameters, a plurality of algebraic coefficients corresponding to the algebraic sphere; and
   determining the shape of the surface-centric representation based on the plurality of algebraic coefficients.

4. The non-transitory computer readable storage medium as recited in claim 1, wherein generating the enriched light source comprises:
   determining a light source category corresponding to the shape type of the surface-centric representation; and
   generating the enriched light source comprising light source properties corresponding to the light source category.

5. The non-transitory computer readable storage medium as recited in claim 4, wherein determining the light source category comprises determining that the shape type of the surface-centric representation corresponds to a spherical light source, a plane light source, or a point light source.

6. The non-transitory computer readable storage medium as recited in claim 5, wherein determining the light source category comprises determining a value of the surface curvature factor relative to one or more threshold values.

7. The non-transitory computer readable storage medium as recited in claim 1, wherein determining the set of emission parameters comprises:
   determining, based on the plurality of input parameters, a core emittance corresponding to a distribution of flux over a surface of the surface-centric representation; and
   determining, based on the plurality of input parameters, a surface emittance corresponding to a redistribution of the core emittance within an emittance cone at a surface point.

8. The non-transitory computer readable storage medium as recited in claim 7, wherein the operations comprise sampling light emitted from the enriched light source onto a point of a three-dimensional object within the three-dimensional environment by:

sampling a plurality of rings in cones of direction from a point of the three-dimensional object that intersects a surface of the enriched light source; and sampling points along the plurality of rings to determine, based on the core emittance and the surface emittance, a total emittance contributed to the point of the three-dimensional object by the enriched light source.

9. The non-transitory computer readable storage medium as recited in claim 8, wherein the operations comprise determining a number of rings and points per ring to sample based on a sampling budget set based on a user input.

10. A system comprising:
a memory component; and
a processing device coupled to the memory component, the processing device to perform operations comprising:
determining a surface-centric representation of a three-dimensional surface based on a re-parameterization of an algebraic sphere;
receiving a plurality of input parameters for the surface-centric representation;
determining, based on the plurality of input parameters and the re-parameterization of the algebraic sphere, a shape of the surface-centric representation and a set of emission parameters by:
determining, based on the plurality of input parameters, a core emittance corresponding to a distribution of flux over a surface of the surface-centric representation; and
determining, based on the plurality of input parameters, a surface emittance corresponding to a redistribution of the core emittance within an emittance cone at a surface point; and
generating, within a three-dimensional environment, an enriched light source comprising the set of emission parameters and a geometric structure corresponding to the shape of the surface-centric representation.

11. The system as recited in claim 10, wherein determining the shape of the surface-centric representation comprises determining the shape based on a first parameter indicating a three-dimensional surface position of the surface-centric representation, a second parameter indicating a three-dimensional direction of the surface-centric representation, and a third parameter indicating a surface curvature factor of the surface-centric representation.

12. The system as recited in claim 10, wherein the operations further comprise:
receiving updated input parameters corresponding to geometric properties and algebraic properties of the surface-centric representation;
updating, utilizing the updated input parameters, algebraic parameters of the algebraic sphere; and
determining an updated shape of the surface-centric representation in response to updating the algebraic parameters.

13. The system as recited in claim 10, wherein determining the shape of the surface-centric representation comprises:
determining, based on the plurality of input parameters, a surface curvature factor associated with the surface-centric representation; and
selecting, in response to comparing the surface curvature factor to a plurality of curvature threshold values, a shape type of the surface-centric representation from a plurality of shape types.

14. The system as recited in claim 13, wherein selecting the shape type of the surface-centric representation comprises:
selecting the shape type of the surface-centric representation as a point in response to determining that the surface curvature factor is equal to a first curvature threshold value;
selecting the shape type of the surface-centric representation as a plane in response to determining that the surface curvature factor is equal to a second curvature threshold value; or
selecting the shape type of the surface-centric representation as a non-degenerate sphere in response to determining that the surface curvature factor does not meet the first curvature threshold value or the second curvature threshold value.

15. The system as recited in claim 14, wherein generating the enriched light source comprises:
generating a point light source in response to selecting the shape type as a point;
generating a plane light source in response to selecting the shape type as a plane; or
generating a spherical light source in response to selecting the shape type as a non-degenerate sphere.

16. The system as recited in claim 10, wherein determining the set of emission parameters comprises:
determining, based on the plurality of input parameters, a curvature and a surface area of the surface-centric representation; and
determining, based on the curvature and the surface area, the core emittance comprising a distribution of flux across a surface of the surface-centric representation and the surface emittance comprising a redistribution of the flux from a surface point on the surface of the surface-centric representation.

17. The system as recited in claim 10, wherein the operations comprise determining an amount of light emitted from the enriched light source onto a point of a three-dimensional object within the three-dimensional environment by:
determining a sampling budget for sampling light from the enriched light source onto the point;
determining a cone of direction from the point of the three-dimensional object towards the enriched light source;
sampling a ring from the cone of direction that intersects a surface of the enriched light source; and
sampling, based on the sampling budget, a plurality of points along the ring to determine an emittance corresponding to the ring.

18. A computer-implemented method comprising:
determining a surface-centric representation of a three-dimensional surface based on a re-parameterization of an algebraic sphere;
receiving a plurality of input parameters for the surface-centric representation;
determining, based on the plurality of input parameters and the re-parameterization of the algebraic sphere, a shape of the surface-centric representation and a set of emission parameters by selecting, based on an input parameter indicating a surface curvature factor, a shape type of the surface-centric representation from a plurality of shape types; and
generating, within a three-dimensional environment, an enriched light source comprising the set of emission parameters and a geometric structure corresponding to the shape of the surface-centric representation.

19. The computer-implemented method as recited in claim 18, wherein selecting the shape type comprises selecting the shape type from a spherical light source, a plane light source, or a point light source based on the surface curvature factor.

20. The computer-implemented method as recited in claim 18, wherein determining the set of emission parameters comprises determining a core emittance and a surface emittance corresponding to the surface-centric representation.

* * * * *